United States Patent
Kimura et al.

(10) Patent No.: US 11,057,173 B2
(45) Date of Patent: *Jul. 6, 2021

(54) RECEPTION DEVICE, TRANSMISSION DEVICE, RECEPTION METHOD, TRANSMISSION METHOD, AND PROGRAM RELATED TO ALLOCATION OF PARAMETERS TO SIGNALS

(71) Applicant: Sony Corporation, Tokyo (JP)

(72) Inventors: Ryota Kimura, Tokyo (JP); Hiroaki Takano, Saitama (JP); Hiromasa Uchiyama, Tokyo (JP); Atsushi Yoshizawa, Kanagawa (JP); Yuichi Morioka, Kanagawa (JP); Ryo Sawai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/687,706

(22) Filed: Nov. 19, 2019

(65) Prior Publication Data

US 2020/0112409 A1    Apr. 9, 2020

Related U.S. Application Data

(62) Division of application No. 15/562,460, filed as application No. PCT/JP2016/001798 on Mar. 28, 2016, now Pat. No. 10,516,511.

(30) Foreign Application Priority Data

Apr. 7, 2015 (JP) .............................. JP2015-078583

(51) Int. Cl.
*H04L 5/00* (2006.01)
*H04B 7/0426* (2017.01)
(Continued)

(52) U.S. Cl.
CPC ......... *H04L 5/0037* (2013.01); *H04B 7/0426* (2013.01); *H04L 1/0009* (2013.01);
(Continued)

(58) Field of Classification Search
CPC ... H04L 5/0037; H04L 5/0091; H04L 1/0009; H04L 1/0025; H04L 1/0029;
(Continued)

(56) References Cited

U.S. PATENT DOCUMENTS

2004/0137931 A1   7/2004   Sarkar et al.
2009/0213743 A1   8/2009   Morinaga et al.
(Continued)

FOREIGN PATENT DOCUMENTS

EP   1826939 A1   8/2007
EP   2461516 A1   6/2012
(Continued)

OTHER PUBLICATIONS

Office Action issued in Japanese Application 2015-078583 dated Mar. 5, 2019.
(Continued)

*Primary Examiner* — Tejis Daya
(74) *Attorney, Agent, or Firm* — Xsensus, LLP

(57) ABSTRACT

A transmission device that: allocates at least partially shared transmission parameters to at least a subset of a plurality of signals to which resource blocks are allocated, the resource blocks having at least partially overlapping frequency resources or time resources; and controls a transmission process of the plurality of signals based on the shared transmission parameters.

14 Claims, 34 Drawing Sheets

(51) Int. Cl.
*H04W 52/26* (2009.01)
*H04L 1/00* (2006.01)

(52) U.S. Cl.
CPC .......... *H04L 1/0025* (2013.01); *H04L 1/0029* (2013.01); *H04L 5/0014* (2013.01); *H04L 5/0035* (2013.01); *H04L 5/0053* (2013.01); *H04L 5/0091* (2013.01); *H04L 5/0092* (2013.01); *H04W 52/262* (2013.01)

(58) Field of Classification Search
CPC ... H04L 5/0092; H04L 5/0014; H04L 5/0053; H04L 5/0035; H04L 1/1819; H04L 1/1861; H04W 52/262; H04B 7/0426
See application file for complete search history.

(56) References Cited

U.S. PATENT DOCUMENTS

| | | | |
|---|---|---|---|
| 2009/0262699 A1 | 10/2009 | Wengerter et al. | |
| 2010/0103901 A1 | 4/2010 | Miki et al. | |
| 2011/0014907 A1* | 1/2011 | Ringstrom | H04L 1/1812 455/422.1 |
| 2011/0299500 A1* | 12/2011 | Papasakellariou | H04B 7/0413 370/330 |
| 2012/0155412 A1 | 6/2012 | Kawamura et al. | |
| 2013/0196700 A1 | 8/2013 | Tiirola et al. | |
| 2014/0044091 A1* | 2/2014 | Kishiyama | H04L 5/0014 370/330 |
| 2014/0050148 A1 | 2/2014 | Choi | |
| 2014/0050279 A1* | 2/2014 | Kishiyama | H04B 7/24 375/285 |
| 2014/0086372 A1 | 3/2014 | Kishiyama et al. | |
| 2014/0153519 A1 | 6/2014 | Wengerter et al. | |
| 2014/0241273 A1* | 8/2014 | Kim | H04J 11/005 370/329 |
| 2015/0009925 A1 | 1/2015 | Park et al. | |
| 2015/0016361 A1 | 1/2015 | Kim et al. | |
| 2015/0139148 A1 | 5/2015 | Wang et al. | |
| 2015/0171983 A1 | 6/2015 | Kusashima | |
| 2015/0349932 A1 | 12/2015 | Onodera et al. | |
| 2016/0142193 A1 | 5/2016 | Benjebbour et al. | |
| 2016/0219529 A1 | 7/2016 | Benjebbour et al. | |
| 2016/0262175 A1* | 9/2016 | Li | H04L 5/003 |
| 2016/0269145 A1 | 9/2016 | Ji et al. | |
| 2019/0149287 A1* | 5/2019 | Cheng | H04L 5/0092 370/280 |

FOREIGN PATENT DOCUMENTS

| | | |
|---|---|---|
| EP | 2672648 A1 | 12/2013 |
| JP | 2003-078419 A | 3/2003 |
| JP | 2003-229835 A | 8/2003 |
| JP | 2009-527958 A | 7/2009 |
| JP | 2013-009290 A | 1/2013 |
| JP | 2013-247513 A | 12/2013 |
| JP | 2014-204277 A | 10/2014 |
| WO | 2014/015681 A1 | 1/2014 |
| WO | 2015/029729 A1 | 3/2015 |

OTHER PUBLICATIONS

International Search Report dated Jun. 3, 2016, in PCT/JP2016/001798 filed Mar. 28, 2016.

\* cited by examiner

RECEPTION DEVICE, TRANSMISSION DEVICE, RECEPTION METHOD, TRANSMISSION METHOD, AND PROGRAM RELATED TO ALLOCATION OF PARAMETERS TO SIGNALS

CROSS REFERENCE TO RELATED APPLICATIONS

This application is a divisional of U.S. application Ser. No. 15/562,460, filed Sep. 28, 2017, which is based on PCT filing PCT/JP2016/001798, filed Mar. 28, 2016, which claims the benefit of Japanese Priority Patent Application JP 2015-078583, filed Apr. 7, 2015, the entire contents of each are incorporated herein by reference.

TECHNICAL FIELD

The present disclosure relates to a reception device, a transmission device, a reception method, a transmission method and a program.

BACKGROUND ART

As radio access technology (RAT) of the fifth generation (5G) mobile communication systems following Long Term Evolution (LTE)/LTE-A(Advanced), non-orthogonal multiple access is being focused on. In Orthogonal Frequency-Division Multiple Access (OFDMA) and Single-Carrier Frequency-Division Multiple Access (SC-FDMA) used in LTE, radio resources (for example, resource blocks) are allocated to users in a non-overlapping manner. Such schemes may be referred to as orthogonal multiple access. On the other hand, in non-orthogonal multiple access, radio resources are allocated to users in an overlapping manner. In non-orthogonal multiple access, signals of users interfere with one another, but a signal for each user is extracted by a high-precision decoding process on a reception side. Theoretically, non-orthogonal multiple access can implement a higher cell communication capacity than orthogonal multiple access.

As one of radio access technologies classified as non-orthogonal multiple access, superposition coding (SPC) multiplexing/multiple access is exemplified. SPC is a technique in which signals to which different power is allocated are multiplexed using radio resources of at least partially overlapping frequency and time. On the reception side, in order to receive or decode signals multiplexed using the same radio resources, interference cancellation and/or repeated detection are performed.

As examples of SPC or techniques equivalent to SPC, Patent Literatures 1 and 2 disclose techniques of setting an amplitude (or power) that enables appropriate demodulation and decoding. In addition, for example, Patent Literature 3 discloses a technique of enhancing successive interference cancellation (SIC) for receiving a multiplexed signal.

CITATION LIST

Patent Literature

[PTL 1]
JP 2003-78419A
[PTL 2]
JP 2003-229835A
[PTL 3]
JP 2013-247513A

SUMMARY

Technical Problem

However, when a data signal is multiplexed using power allocation (for example, using SPC), a communication device configured to receive the data signal has difficulty appropriately decoding the data without knowing transmission parameters that are included in a multiplexed signal and used in a data signal addressed to another communication device.

Therefore, it is preferable to provide a mechanism capable of appropriately decoding a data signal when multiplexing using power allocation is performed.

Solution to Problem

According to an embodiment of the present disclosure, there is provided an electronic device that allocates at least partially shared transmission parameters to at least a subset of a plurality of signals to which resource blocks are allocated, the resource blocks having at least partially overlapping frequency resources or time resources; and controls a transmission process of the plurality of signals based on the shared transmission parameters.

According to another embodiment of the present disclosure, there is provided an electronic device that determines that at least partially shared transmission parameters are used in a signal addressed to another electronic device to which resource blocks are allocated having frequency resources or time resources that at least partially overlap with a resource block allocated to a signal addressed to the electronic device; and controls an interference cancellation process on the signal addressed to the other electronic device as a target based on a result of the determining.

According to another embodiment of the present disclosure, there is provided a transmission method performed by an electronic device, the transmission method including: allocating at least partially shared transmission parameters to at least a subset of a plurality of signals to which resource blocks are allocated, the resource blocks having at least partially overlapping frequency resources or time resources; and controlling a transmission process of the plurality of signals based on the shared transmission parameters.

According to another embodiment of the present disclosure, there is provided a reception method performed by an electronic device, the reception method including: determining that at least partially shared transmission parameters are used in a signal addressed to another electronic device to which resource blocks are allocated having frequency resources or time resources that at least partially overlap with a resource block allocated to a signal addressed to the electronic device; and controlling an interference cancellation process on the signal addressed to the other electronic device as a target based on a result of the determining.

According to another embodiment of the present disclosure, there is provided one or more computer computer-readable media, which when executed by an electronic device, cause the electronic device to: allocate at least partially shared transmission parameters to at least a subset of a plurality of signals to which resource blocks are allocated, the resource blocks having at least partially overlapping frequency resources or time resources; and control a transmission process of the plurality of signals based on the shared transmission parameters.

According to another embodiment of the present disclosure, there is provided one or more computer computer-readable media, which when executed by an electronic device, cause the electronic device to: determine that at least partially shared transmission parameters are used in a signal addressed to another electronic device to which resource blocks are allocated having frequency resources or time resources that at least partially overlap with a resource block allocated to a signal addressed to the electronic device; and control an interference cancellation process on the signal addressed to the other electronic device as a target based on a result of the determining.

Advantageous Effects of Invention

As described above, according to an embodiment of the present disclosure, it is possible to appropriately decode a data signal when multiplexing using power allocation is performed. Also, the above effects are not necessarily limited, but along with the effects or instead of the effects, any effect shown in this specification or other effects that may be understood from this specification may be achieved.

DESCRIPTION OF EMBODIMENTS

Figure 1:
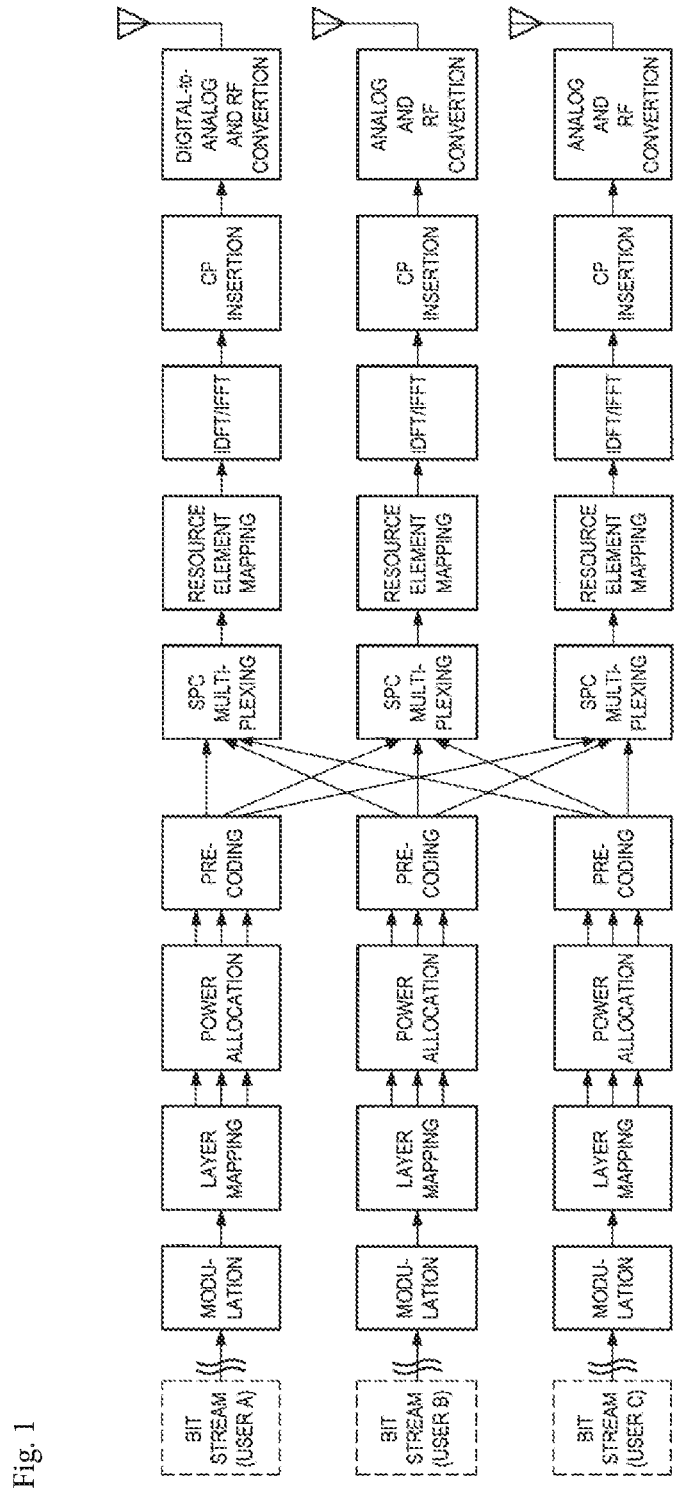
FIG. 1 is a first explanatory diagram for describing an exemplary process in a transmission device configured to support SPC.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will proceed in the following order.
1. Introduction
 1.1. SPC
 1.2. Control information 2. Schematic configuration of system
3. Configurations of devices
3.1. Configuration of base station
3.2. Configuration of terminal apparatus
4. Technical characteristics
4.1. Restrictions on transmission parameters
4.2. Allocation example of transmission parameters
4.3. Format example 1 of new DCI
4.4. Format example 2 of new DCI
5. Application example
6. Conclusion

1. Introduction

<1.1. SPC>

A process and a signal of SPC will be described with reference to FIGS. 1 to 4.

(1) Transmission and Reception Process (a) Process in Transmission Device

Figure 2:
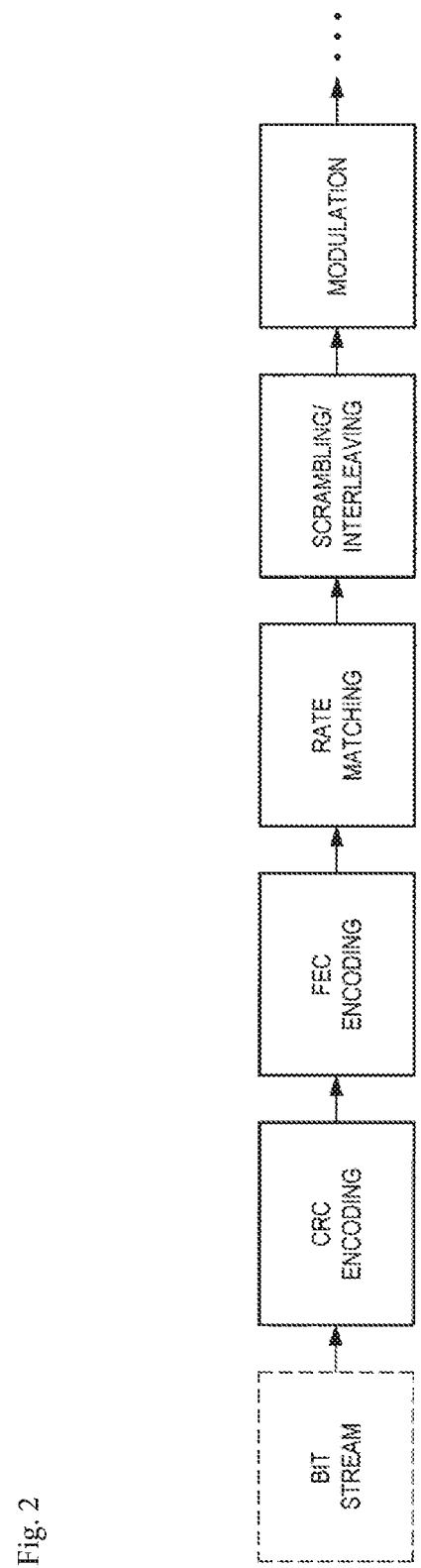
FIG. 2 is a second explanatory diagram for describing an exemplary process in a transmission device configured to support SPC.
Figure 3:
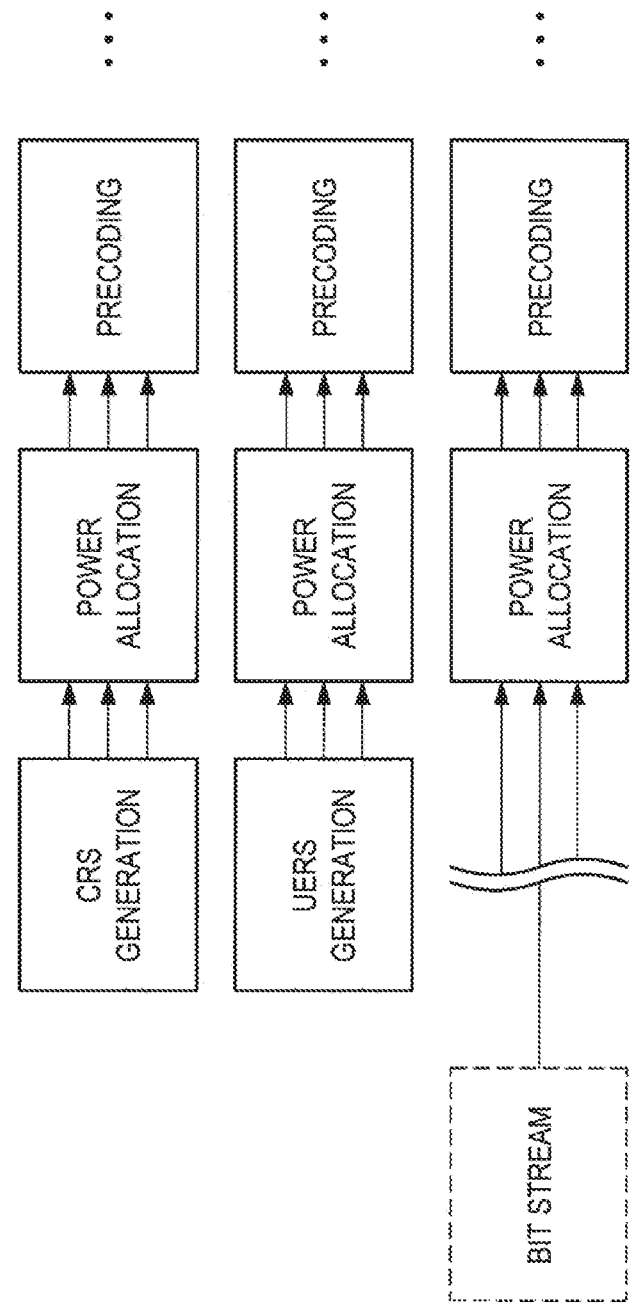
FIG. 3 is a third explanatory diagram for describing an exemplary process in a transmission device configured to support SPC.

FIGS. 1 to 3 are explanatory diagrams for describing an exemplary process in a transmission device configured to support SPC. As illustrated in FIG. 1, for example, bitstreams (for example, transport blocks) of a user A, a user B and a user C are processed. Some processes (for example, Cyclic Redundancy Check (CRC) encoding, Forward Error Correction (FEC) encoding, rate matching and scrambling/interleaving as illustrated in FIG. 2) are performed on each of such bitstreams, and then modulation is performed. Therefore, layer mapping, power allocation, precoding, SPC multiplexing, resource element mapping, inverse discrete Fourier transform (IDFT)/inverse fast Fourier transform (IFFT), cyclic prefix (CP) insertion as well as digital-to-analog and radio frequency (RF) conversion are performed.

In particular, in power allocation, power is allocated to a signal of each of the user A, the user B and the user C. In SPC multiplexing, signals of the user A, the user B and the user C are multiplexed.

(b) Process in Reception Device

Figure 4:
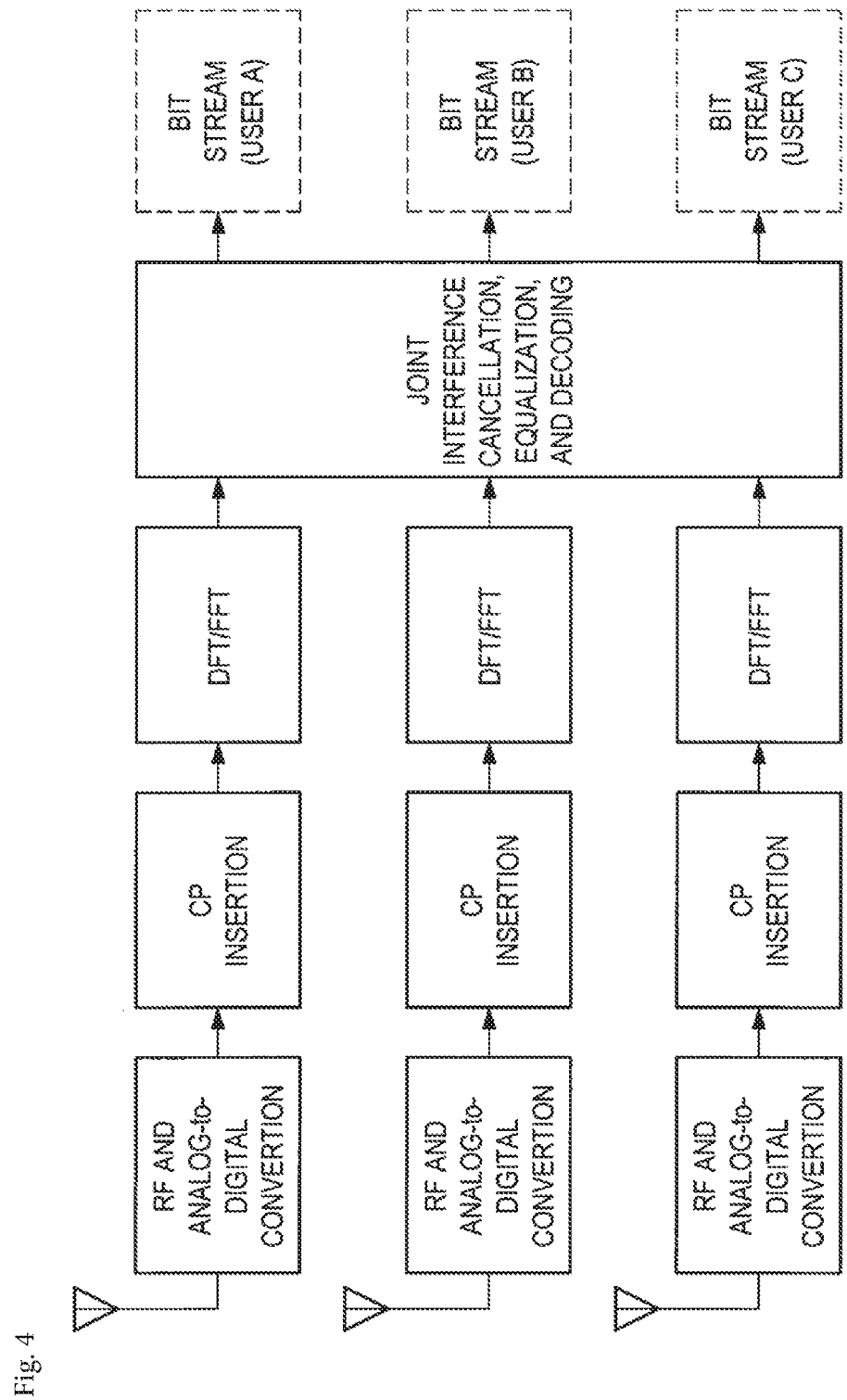
FIG. 4 is an explanatory diagram for describing an exemplary process in a reception device configured to perform interference cancellation.
Figure 5:
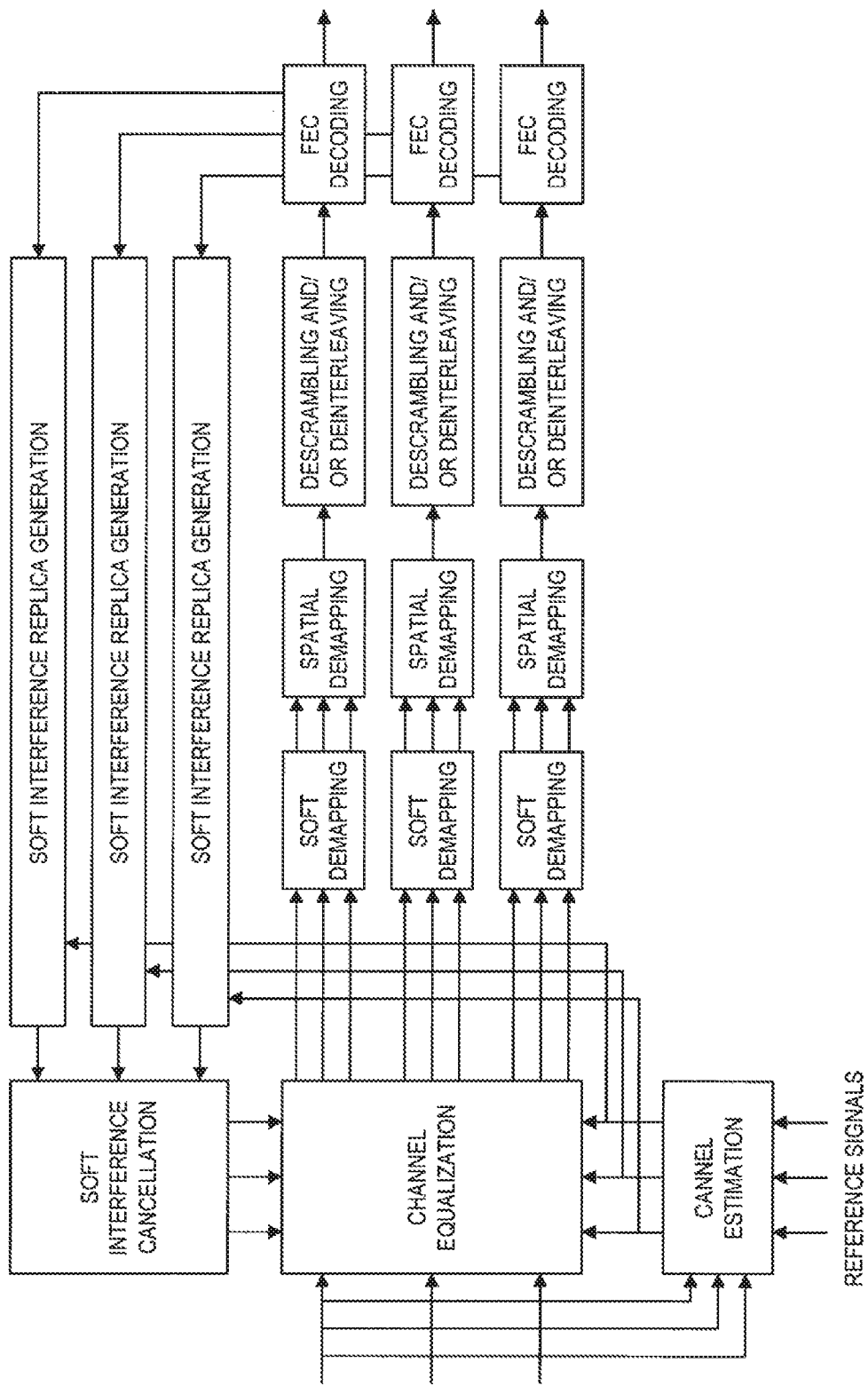
FIG. 5 is an explanatory diagram for describing an exemplary process in a reception device configured to perform interference cancellation.

FIGS. 4 and 5 are explanatory diagrams for describing an exemplary process in a reception device configured to perform interference cancellation. As illustrated in FIG. 4, for example, RF and analog-to-digital conversion, CP cancellation (removal), discrete Fourier transform (DFT)/fast Fourier transform (FFT) as well as joint interference cancellation, equalization and decoding are performed. In the joint interference cancellation, for example, as illustrated in FIG. 5, when channel estimation, channel equalization, soft demapping, spatial demapping, descrambling and/or deinterleaving, FEC decoding, soft interference replica generation and soft interference cancellation are performed, an SIC process is performed. As a result, bitstreams (for example, transport blocks) of the user A, the user B and the user C are obtained.

(2) Transmission Signal and Reception Signal (a) Downlink

Next, a transmission signal and a reception signal of downlink when SPC is used will be described. Here, a multi-cell system such as a heterogeneous network (HetNet) or small cell enhancement (SCE) is assumed.

"i" represents an index of a cell to which a target user u is connected. "$N_{TX,i}$" represents the number of transmission antennas of a base station corresponding to the cell. Each of the transmission antennas may also be referred to as a transmission antenna port. A transmission signal from the cell i to the user u can be represented in a vector form as follows.

$$S_{i,u} = \begin{bmatrix} S_{i,u,0} \\ \vdots \\ S_{i,u,N_{TX,i}-1} \end{bmatrix} = W_{i,u} P_{i,u} x_{i,u} \quad \text{[Math. 1]}$$

$$W_{i,u} = \begin{bmatrix} w_{i,u,0,0} & \cdots & w_{i,u,0,N_{SS,u}-1} \\ \vdots & \ddots & \vdots \\ w_{i,u,N_{TX,i}-1,0} & \cdots & w_{i,u,N_{TX,i}-1,N_{SS,u}-1} \end{bmatrix} \quad \text{[Math. 2]}$$

$$P_{i,u} = \begin{bmatrix} P_{i,u,0,0} & \cdots & P_{i,u,0,N_{SS,u}-1} \\ \vdots & \ddots & \vdots \\ P_{i,u,N_{SS,u}-1,0} & \cdots & P_{i,u,N_{SS,u}-1,N_{SS,u}-1} \end{bmatrix} \quad \text{[Math. 3]}$$

$$x_{i,u} = \begin{bmatrix} x_{i,u,0} \\ \vdots \\ x_{i,u,N_{SS,u}-1} \end{bmatrix} \quad \text{[Math. 4]}$$

In the above-described formulae, $N_{SS,u}$ represents the number of spatial transmission streams for the user u. Basically, $N_{SS,u}$ is a positive integer equal to or less than $N_{TX,i}$. A vector $x_{i,u}$ represents a spatial stream signal for the user u. Basically, elements of the vector correspond to digital modulation symbols such as phase shift keying (PSK) and quadrature amplitude modulation (QAM). A matrix $W_{i,u}$ represents a precoding matrix for the user u. Elements in the matrix are basically complex numbers, but may be real numbers.

A matrix $P_{i,u}$ represents a power allocation coefficient matrix for the user u in the cell i. In the matrix, elements are preferably positive real numbers. Also, the matrix may be a diagonal matrix (that is, a matrix in which elements other than diagonal elements are 0) as follows.

$$P_{i,u} = \begin{bmatrix} P_{i,u,0,0} & 0 & \cdots & 0 \\ 0 & P_{i,u,1,1} & \ddots & \vdots \\ \vdots & \ddots & \ddots & 0 \\ 0 & \cdots & \cdots & P_{i,u,N_{SS,u}-1,N_{SS,u}-1} \end{bmatrix} \quad \text{[Math. 5]}$$

When no adaptive power allocation is performed on a spatial stream, a scalar value $P_{i,u}$ in place of the matrix $P_{i,u}$ may be used.

Not only the user u but also another user v are in the cell i, and a signal $s_{i,v}$ of the other user v is transmitted using the same radio resources. Such a signal is multiplexed by SPC. The multiplexed signal $s_i$ from the cell i is represented as follows.

$$s_i = \sum_{u' \in U_i} s_{i,u'} \quad \text{[Math. 6]}$$

In the above-described formula, $U_i$ represents a set of users multiplexed in the cell i. Even in a cell j (a cell serving as an interference source of the user u) other than a serving cell of the user u, a transmission signal $s_j$ is similarly generated. On the user side, such a signal is received as interference. A reception signal $r_u$ of the user u can be represented as follows.

$$r_u = \begin{bmatrix} r_{u,0} \\ \vdots \\ r_{u,N_{RX,u}-1} \end{bmatrix} = \sum_{i'} H_{u,i'} s_{i'} + n_u \quad \text{[Math. 7]}$$

$$H_{u,i} = \begin{bmatrix} h_{u,i,0,0} & \cdots & h_{u,i,0,N_{TX,i}-1} \\ \vdots & \ddots & \vdots \\ h_{u,i,N_{RX,u}-1,0} & \cdots & h_{u,i,N_{RX,u}-1,N_{TX,i}-1} \end{bmatrix} \quad \text{[Math. 8]}$$

$$n_u = \begin{bmatrix} n_{u,0} \\ \vdots \\ n_{u,N_{RX,u}-1} \end{bmatrix} \quad \text{[Math. 9]}$$

In the above-described formulae, a matrix $H_{u,i}$ represents a channel response matrix for the cell i and the user u. Elements of the matrix $H_{u,i}$ are basically complex numbers. A vector $n_u$ represents noise included in the reception signal $r_u$ of the user u. The noise includes, for example, thermal noise and interference from other systems. Average power of the noise will be represented as follows.

$$\sigma_{n,u}^2 \quad \text{[Math. 10]}$$

As will be described below, the reception signal $r_u$ can be represented by a desired signal and other signals.

$$r_u = H_{u,i} s_{i,u} + H_{u,i} \sum_{v \in U_i, v \neq u} s_{i,v} + \sum_{j \neq i} H_{u,j} \sum_{v \in U_j} s_{j,v} + n_u \quad \text{[Math. 11]}$$

In the above-described formula, in the right-hand side, the first term represents a desired signal of the user u, the second term represents interference (referred to as intra-cell interference, multi-user interference, or multi-access interference) in the serving cell i of the user u, and the third term represents interference (referred to as inter-cell interference) from a cell other than the cell i.

Also, when orthogonal multiple access (for example, OFDMA or SC-FDMA) is used, the reception signal can be represented as follows.

$$r_u = H_{u,i} s_{i,u} + \sum_{j \neq i} H_{u,j} s_{j,v} + n_u \quad \text{[Math. 12]}$$

In the orthogonal multiple access, there is no intra-cell interference, and a signal of the other user v even in the other cell j is not multiplexed using the same radio resources.

(b) Uplink

Next, a transmission signal and a reception signal of uplink when SPC is used will be described. Here, a multi-cell system such as HetNet or SCE is assumed. Also, as a symbol representing a signal or the like, the symbol used for downlink is used.

A transmission signal transmitted by the user u in the cell i can be represented in a vector form as follows.

$$s_{i,u} = \begin{bmatrix} s_{i,u,0} \\ \vdots \\ s_{i,u,N_{TX,u}-1} \end{bmatrix} = W_{i,u} P_{i,u} x_{i,u} \quad \text{[Math. 13]}$$

$$W_{i,u} = \begin{bmatrix} w_{i,u,0,0} & \cdots & w_{i,u,0,N_{SS,u}-1} \\ \vdots & \ddots & \vdots \\ w_{i,u,N_{TX,u}-1,0} & \cdots & w_{i,u,N_{TX,u}-1,N_{SS,u}-1} \end{bmatrix} \quad \text{[Math. 14]}$$

$$P_{i,u} = \begin{bmatrix} P_{i,u,0,0} & \cdots & P_{i,u,0,N_{SS,u}-1} \\ \vdots & \ddots & \vdots \\ P_{i,u,N_{SS,u}-1,0} & \cdots & P_{i,u,N_{SS,u}-1,N_{SS,u}-1} \end{bmatrix} \quad \text{[Math. 15]}$$

$$x_{i,u} = \begin{bmatrix} x_{i,u,0} \\ \vdots \\ x_{i,u,N_{SS,u}-1} \end{bmatrix} \quad \text{[Math. 16]}$$

In the above-described formulae, the number of transmission antennas is $N_{TX,u}$, the number of transmission antennas of the user. A matrix $P_{i,u}$ that is a power allocation coefficient matrix for the user u in the cell i, may be a diagonal matrix, similarly to a downlink case.

In uplink, in the user, since a signal of the user and a signal of another user are not multiplexed, a reception signal of a base station of the cell i can be represented as follows.

$$r_i = \begin{bmatrix} r_{i,0} \\ \vdots \\ r_{i,N_{RX,i}-1} \end{bmatrix} = \sum_{i'} \sum_{u' \in U_{i'}} H_{i',u'} s_{i',u'} + n_i \quad \text{[Math. 17]}$$

$$H_{i,u} = \begin{bmatrix} h_{i,u,0,0} & \cdots & h_{i,u,0,N_{TX,u}-1} \\ \vdots & \ddots & \vdots \\ h_{i,u,N_{RX,i}-1,0} & \cdots & h_{i,u,N_{RX,i}-1,N_{TX,u}-1} \end{bmatrix} \quad \text{[Math. 18]}$$

$$n_i = \begin{bmatrix} n_{i,0} \\ \vdots \\ n_{i,N_{RX,i}-1} \end{bmatrix} \quad \text{[Math. 19]}$$

Unlike the downlink case, in an uplink case, it should be noted that the base station has to decode all signals from a plurality of users in the cell. Further, it also should be noted that the channel response matrix is different by the user.

In particular, in an uplink signal in the cell i, focusing on a signal transmitted by the user u, a reception signal can be represented as follows.

$$r_{i,u} = \begin{bmatrix} r_{i,u,0} \\ \vdots \\ r_{i,u,N_{RX,i}-1} \end{bmatrix} = H_{i,u} s_{i,u} + \sum_{v \in U_i, v \neq u} H_{i,v} s_{i,v} + \sum_{j \neq i} \sum_{v \in U_j} H_{i,v} s_{j,v} + n_i \quad \text{[Math. 20]}$$

In the above-described formula, in the right-hand side, the first term represents a desired signal of the user u, the second term represents interference (referred to as intra-cell interference, multi-user interference, or multi-access interference) in the serving cell i of the user u, and the third term represents interference (referred to as inter-cell interference) from a cell other than the cell i.

Also, when orthogonal multiple access (for example, OFDMA or SC-FDMA) is used, the reception signal can be represented as follows.

$$r_{i,u} = H_{i,u}s_{i,u} + \sum_{j \neq i} H_{i,v}s_{j,v} + n_i \quad \text{[Math. 21]}$$

In the orthogonal multiple access, there is no intra-cell interference, and a signal of the other user v even in the other cell j is not multiplexed using the same radio resources.

(3) Reception Signal Process

Next, a reception signal process when SPC is used will be described. Here, in downlink, a reception signal process when the reception device uses successive interference cancellation (SIC) will be described. In addition, a multiplex number using SPC is set to 2 (that is, U=2), a target reception device set as a user 0, and another reception device to be multiplexed is set as a user 1. That is, when a signal addressed to the user 1 is canceled from the reception signal by SIC, the user 0 acquires a signal addressed to the user 0.

Also, in SIC, the reception device performs interference cancellation on an other-device-addressed signal having higher reception power than a signal addressed to the device itself as a target, and ignores an another device-addressed signal having lower reception power than the self-addressed signal as a noise component. That is, the reception device performs an interference cancellation process on the other-device-addressed signal having higher reception power than the self-addressed signal as a target.

The above formula 11 can be represented as follows.

$$r_0 = \overline{H}_{0,0,i}x_{i,0} + \overline{H}_{0,1,i}x_{i,1} + \overline{n}_0 \quad \text{[Math. 22]}$$

In the above-described formula, in the right-hand side, the first term represents a desired signal of the user 0 (that is, the reception device), the second term represents interference (referred to as intra-cell interference, multi-user interference or multi-access interference) in a serving cell i of the user 0, and the third term represents interference (referred to as inter-cell interference) from a cell other than the cell i. An equivalent channel response matrix included in the above formula will be represented as follows.

$$\overline{H}_{u,v,i} = H_{u,i}W_{i,v}P_{i,v} \quad \text{[Math. 23]}$$

The above-described equivalent channel response matrix is influenced by a channel response matrix of a pure radio section, a precoding matrix applied to a transmission signal, etc., between the user u and the base station of the cell i.

First, the user 0 tries to decode a signal of the user 1 serving as an intra-cell interference component by SPC. Therefore, the user 0 performs channel equalization on the signal of the user 1 as a target as shown in the following formula.

$$\tilde{x}_{i,1} = F_{i,1}r_0 \quad \text{[Math. 24]}$$

In the above-described formula, $F_{i,v}$ represents a channel equalization filter matrix for a signal of the user v. The matrix may be generated from, for example, a result of channel estimation using a reference signal (RS) according to a zero-forcing (ZF) criterion or a minimum mean square error (MMSE) criterion.

In the above-described formula, the left-hand side represents an equalization output. The equalization output is decoded according to a modulation scheme, scrambling, interleaving, an error correction code and an encoding rate applied to the signal of the user 1. Therefore, the user 0 uses a decoding output of an error correction decoder or a decoded log likelihood ratio (LLR), and generates a replica of an interference component of the signal addressed to the user 0 due to the signal addressed to the user 1.

Here, the replica may be a hard interference replica that is generated from a hard determination result such as a transmission bit sequence or a soft interference replica that is generated from a transmission symbol probability based on LLR. In terms of characteristics, the soft interference replica is preferably used.

The user 0 cancels (for example, subtracts) the generated interference replica from the reception signal as shown in the following formula.

$$\tilde{r}_0 = r_0 - \tilde{y}_{0,1,i} \quad \text{[Math. 25]}$$

In the above-described formula, the second term of the right-hand side represents an interference replica.

Here, when an ideal interference replica is generated, the following formula is established.

$$\tilde{r}_0 = \overline{H}_{0,0,i}x_{i,0} + \overline{n}_0 \quad \text{[Math. 26]}$$

The user 0 performs channel equalization for the user 0 on the reception signal after the interference cancellation, as shown in the following formula.

$$\tilde{x}_{i,0} = F_{i,0}\tilde{r}_0 \quad \text{[Math. 27]}$$

In the above-described formula, the left-hand side represents an equalization output. The equalization output is decoded according to a modulation scheme, scrambling, interleaving, an error correction code and an encoding rate applied to the signal of the user 0.

According to the reception signal process described above, in the reception device of the user 0, it is possible to demodulate and decode the self-addressed signal from the signal multiplexed by SPC.

<1.2. Control Information>

Next, control information transmitted and received between a base station 100 and a terminal apparatus 200 will be described. Here, as an example thereof, downlink control information (DCI) serving as control information that is transmitted from the base station 100 to the terminal apparatus 200 in a cellular system will be described.

The DCI includes, for example, information indicating transmission parameters used in a transmission signal. The transmission parameters include information indicating, for example, radio resources (for example, frequency resources, time resources or resource blocks (RBs)) that are allocated to each of the terminal apparatuses 200 according to scheduling by the base station 100, and more specifically, that are allocated to a signal (a data channel) transmitted and received by each of the terminal apparatuses 200. In addition, the transmission parameters may include information indicating a power level (that is, a power layer), scrambling, interleaving, an error correction code, an encoding rate and the like. When the reception device acquires the self-allocated transmission parameters through control information (for example, DCI), it is possible to appropriately acquire the self-addressed signal. Also, the frequency resources refer to, for example, subcarriers, resource blocks, sub-bands or component carriers. In addition, the time resources refer to, for example, symbols, slots, sub-frames, resource pools or radio frames.

Here, allocation targets of the transmission parameters such as the radio resources and a power level are considered to be diverse. For example, the transmission parameters may be allocated to each of a plurality of signals. For example, power is allocated to each of the plurality of signals in power allocation and the plurality of signals may be multiplexed in SPC multiplexing. In addition, the transmission parameters may be allocated to each of a plurality of channels. For example, in power allocation, power is allocated to each of a data channel, a control channel and a broadcast channel, and a plurality of channels may be multiplexed in SPC multiplexing. In addition, the transmission parameters may be allocated to each of the plurality of users (the terminal apparatuses 200). For example, power is allocated to a signal (or a data channel, a control channel or a broadcast channel) of each of the user A, the user B and the user C, and signals of the user A, the user B and the user C may be multiplexed in SPC multiplexing. In this specification, allocation targets of the transmission parameters are described as a signal, a data channel, or a user, but a proper use thereof does not limit the present technology. For example, in the following description, the allocation target of the transmission parameters may be appropriately replaced with the signal, the data channel or the user.

A plurality of DCI formats are defined and properly used for uplink, for downlink, for transmit power control (TPC) command, and a transmission mode. For example, in LTE, DCI Format 0/4 is properly used for uplink scheduling, DCI Format 1/1A/1B/1C/1D/2/2A/2B/2C is properly used for downlink scheduling, and DCI Format 3/3A is properly used for TPC command. In DCI, depending on the format, a plurality of information elements (IEs) are further included. An exemplary IE is shown in the following table.

TABLE 1

IE of DCI Format 1

| IE Type | Supplement |
|---|---|
| Carrier Indicator | Relates to Carrier Aggregation |
| Resource Allocation Header | Relates to Resource Allocation Type |
| Resource Block Allocation | Relates to allocation of RB |
| Modulation and Coding Scheme (MCS) | Relates to Modulation Order, Coding Rate, and Transport Block Size (TBS) |
| HARQ Process Number | Relates to HARQ |
| New Data Indicator (NDI) | Relates to indication of new or retransmission |
| Redundancy Version (RV) | Relates to FEC and Rate Matching |
| TPC Command for PUCCH | Relates to Uplink TPC |
| Downlink Assignment Index | TDD Only |

TABLE 2

IE of DCI Format 1A

| IE Type | Supplement |
|---|---|
| Carrier Indicator | Relates to Carrier Aggregation |
| Format 0/Format 1A Flag | Relates to indication of DCI Format |
| Localized/Distributed VRB Assignment Flag | Relates to allocation of RB |
| Resource Block Allocation | Relates to allocation of RB |
| MCS | Relates to Modulation Order, Coding Rate, and TBS |
| HARQ Process Number | Relates to HARQ |
| NDI | Relates to indication of new or retransmission |
| RV | Relates to FEC and Rate Matching |
| TPC Command for PUCCH | Relates to Uplink TPC |
| Downlink Assignment Index | TDD Only |
| Sounding Reference Signal (SRS) Request | Relates to SRS |

TABLE 3

IE of DCI Format 1B

| IE Type | Supplement |
|---|---|
| Carrier Indicator | Relates to Carrier Aggregation |
| Localized/Distributed VRB Assignment Flag | Relates to allocation of RB |
| Resource Block Allocation | Relates to allocation of RB |
| MCS | Relates to Modulation Order, Coding Rate, and TBS |
| HARQ Process Number | Relates to HARQ |
| NDI | Relates to indication of new or retransmission |
| RV | Relates to FEC and Rate Matching |
| TPC Command for PUCCH | Relates to Uplink TPC |
| Downlink Assignment Index | TDD Only |
| Transmitted PMI (TPMI) Precoding Information | Relates to Precoding |
| PMI Confirmation for Precoding | Relates to Precoding |

TABLE 4

IE of DCI Format 1C

| IE Type | Supplement |
|---|---|
| Gap Value | Relates to allocation of RB |
| Resource Block Allocation | Relates to allocation of RB |
| Transport Block Size | Relates to TBS |

TABLE 5

IE of DCI Format 1D

| IE Type | Supplement |
|---|---|
| Carrier Indicator | Relates to Carrier Aggregation |
| Localized/Distributed VRB Assignment Flag | Relates to allocation of RB |
| Resource Block Allocation | Relates to allocation of RB |
| MCS | Relates to Modulation Order, Coding Rate, and TBS |
| HARQ Process Number | Relates to HARQ |
| NDI | Relates to indication of new or retransmission |
| RV | Relates to FEC and Rate Matching |
| TPC Command for PUCCH | Relates to Uplink TPC |
| Downlink Assignment Index | TDD Only |
| TPMI Precoding Information | Relates to Precoding |
| Downlink Power Offset | Relates to Power Offset when MU-MIMO is used |

TABLE 6

IE of DCI Format 2 and DCI Format 2A

| IE Type | | Supplement |
|---|---|---|
| Carrier Indicator | | Relates to Carrier Aggregation |
| Resource Allocation Header | | Relates to allocation of RB |
| Resource Block Allocation | | Relates to allocation of RB |
| TPC Command for PUCCH | | Relates to Uplink TPC |
| Downlink Assignment Index | | TDD Only |
| HARQ Process Number | | Relates to HARQ |
| Transport Block to Codeword Swap Flag | | Relates to indication of relation between Transport Block 1/2 and Codeword 0/1 |
| Transport Block 1 | MCS | Relates to Modulation Order, Coding Rate, and TBS |
| | NDI | Relates to indication of new or retransmission |

TABLE 6-continued

IE of DCI Format 2 and DCI Format 2A

| IE Type | | Supplement |
|---|---|---|
| | RV | Relates to FEC and Rate Matching |
| Transport Block 2 | MCS | Relates to Modulation Order, Coding Rate, and TBS |
| | NDI | Relates to indication of new or retransmission |
| | RV | Relates to FEC and Rate Matching |
| Precoding Information | | Relates to Precoding |

TABLE 7

IE of DCI Format 2B

| IE Type | | Supplement |
|---|---|---|
| Carrier Indicator | | Relates to Carrier Aggregation |
| Resource Allocation Header | | Relates to allocation of RB |
| Resource Block Allocation | | Relates to allocation of RB |
| TPC Command for PUCCH | | Relates to Uplink TPC |
| Downlink Assignment Index | | TDD Only |
| HARQ Process Number | | Relates to HARQ |
| Scrambling Identity | | Relates to antenna port of MU-MIMO |
| SRS Request | | Relates to SRS |
| Transport Block 1 | MCS | Relates to Modulation Order, Coding Rate, and TBS |
| | NDI | Relates to indication of new or retransmission |
| | RV | Relates to FEC and Rate Matching |
| Transport Block 2 | MCS | Relates to Modulation Order, Coding Rate, and TBS |
| | NDI | Relates to indication of new or retransmission |
| | RV | Relates to FEC and Rate Matching |

TABLE 8

IE of DCI Format 2C

| IE Type | | Supplement |
|---|---|---|
| Carrier Indicator | | Relates to Carrier Aggregation |
| Resource Allocation Header | | Relates to allocation of RB |
| Resource Block Allocation | | Relates to allocation of RB |
| TPC Command for PUCCH | | Relates to Uplink TPC |
| Downlink Assignment Index | | TDD Only |
| HARQ Process Number | | Relates to HARQ |
| Antenna Port, Scrambling Identity, and Layers | | Relates to antenna port and spatial layer of MU-MIMO |
| SRS Request | | Relates to SRS |
| Transport Block 1 | MCS | Relates to Modulation Order, Coding Rate, and TBS |
| | NDI | Relates to indication of new or retransmission |
| | RV | Relates to FEC and Rate Matching |
| Transport Block 2 | MCS | Relates to Modulation Order, Coding Rate, and TBS |
| | NDI | Relates to indication of new or retransmission |
| | RV | Relates to FEC and Rate Matching |

Note that, the DCI formats shown in Tables 1 to 8 are also referred to as legacy format DCI.

2. Schematic Configuration of System

Figure 6:
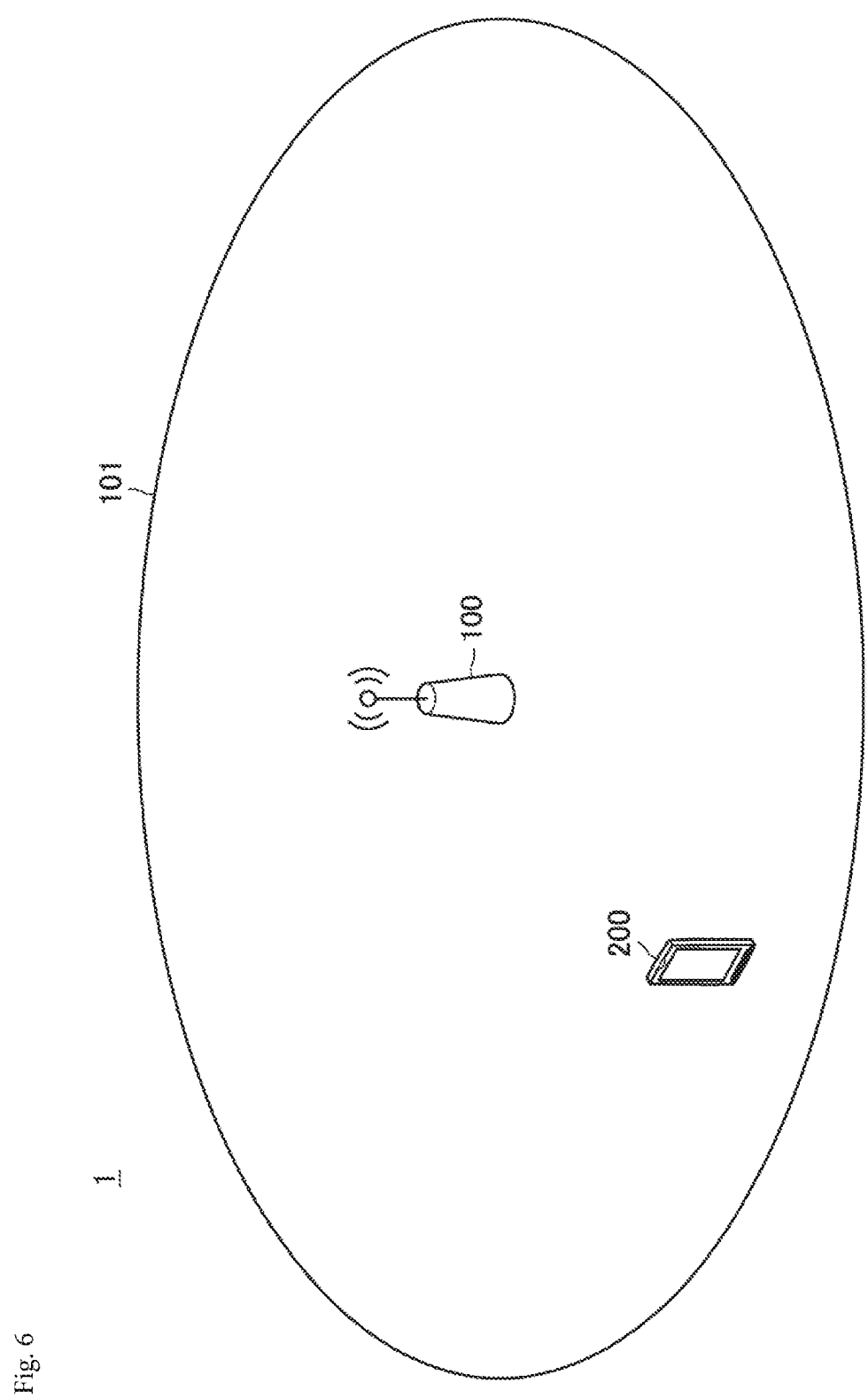
FIG. 6 is an explanatory diagram for describing an exemplary schematic configuration of a system 1 according to an embodiment of the present disclosure.

Next, a schematic configuration of a system 1 according to an embodiment of the present disclosure will be described with reference to FIG. 6. FIG. 6 is an explanatory diagram for describing an exemplary schematic configuration of the system 1 according to the embodiment of the present disclosure. As illustrated in FIG. 6, the system 1 includes the base station 100 and the terminal apparatus 200. Here, the terminal apparatus 200 is also referred to as a user. The user may also be referred to as user equipment (UE). The UE herein may be UE defined in LTE or LTE-A and more generally mean communication equipment.

Here, only one terminal apparatus 200 is illustrated for better understanding. However, it is needless to say that the system 1 may include a plurality of terminal apparatuses 200. In addition, the system 1 may include not only the terminal apparatus 200 but also other types of terminal apparatuses. Hereinafter, "another terminal apparatus" may be another among the terminal apparatuses 200 or another type of terminal apparatus.

(1) Base Station 100

The base station 100 is a base station of a cellular system (or a mobile communication system). The base station 100 performs radio communication with a terminal apparatus (for example, the terminal apparatus 200) located in a cell 101 of the base station 100. For example, the base station 100 transmits a downlink signal to the terminal apparatus and receives an uplink signal from the terminal apparatus.

(2) Terminal Apparatus 200

The terminal apparatus 200 can perform communication in the cellular system (or the mobile communication system). The terminal apparatus 200 performs radio communication with a base station (for example, the base station 100) of the cellular system. For example, the terminal apparatus 200 receives a downlink signal from the base station and transmits an uplink signal to the base station.

(3) Multiple Access

In particular, in an embodiment of the present disclosure, the base station 100 performs radio communication with the plurality of terminal apparatuses according to the non-orthogonal multiple access. More specifically, the base station 100 performs radio communication with the plurality of terminal apparatuses according to multiplexing/multiple access using SPC.

For example, the base station 100 performs radio communication with the plurality of terminal apparatuses according to multiplexing/multiple access using SPC in downlink. More specifically, for example, the base station 100 multiplexes data signals to the plurality of terminal apparatuses using SPC. In this case, for example, the terminal apparatus 200 cancels one or more other data signals as interference from the multiplexed signal including the data signal to the terminal apparatus 200, and decodes the data signal to the terminal apparatus 200.

Note that, in uplink, the base station 100 may perform radio communication with the plurality of terminal apparatuses according to multiplexing/multiple access using SPC in place of downlink, or along with downlink. In this case, the base station 100 may decode each of the data signals from the multiplexed signal including the data signal transmitted by the plurality of terminal apparatuses.

3. Configurations of Devices

Next, configurations of the base station 100 and the terminal apparatus 200 according to an embodiment of the present disclosure will be described with reference to FIGS. 7 and 8.

<3.1. Configuration of Base Station>

Figure 7:
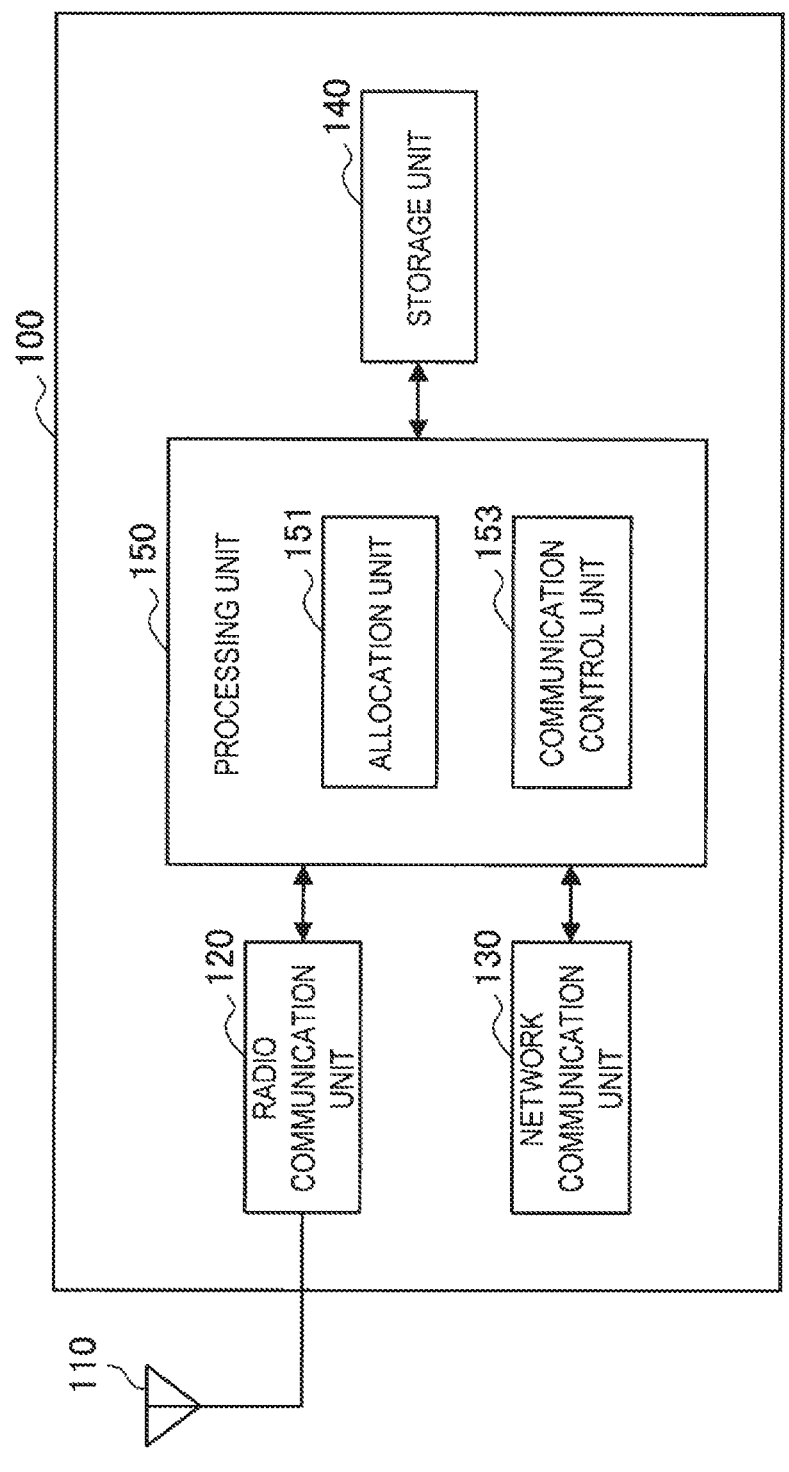
FIG. 7 is a block diagram illustrating an exemplary logical configuration of a base station according to the present embodiment.

FIG. 7 is a block diagram illustrating an exemplary logical configuration of the base station 100 according to the present embodiment. As illustrated in FIG. 7, the base station 100 includes an antenna unit 110, a radio communication unit 120, a network communication unit 130, a storage unit 140 and a processing unit 150.

(1) Antenna Unit 110

The antenna unit 110 emits a signal output from the radio communication unit 120 to a space as a radio wave. In addition, the antenna unit 110 converts the spatial radio wave into a signal, and outputs the signal to the radio communication unit 120.

(2) Radio Communication Unit 120

The radio communication unit 120 transmits and receives a signal. For example, the radio communication unit 120 transmits a downlink signal to the terminal apparatus and receives an uplink signal from the terminal apparatus.

(3) Network Communication Unit 130

The network communication unit 130 transmits and receives information. For example, the network communication unit 130 transmits information to other nodes, and receives information from the other nodes. For example, the other nodes include other base stations and core network nodes.

(4) Storage Unit 140

The storage unit 140 temporarily or permanently stores programs and various pieces of data for operating the base station 100.

(5) Processing Unit 150

The processing unit 150 provides various functions of the base station 100. The processing unit 150 includes an allocation unit 151 and a communication control unit 153. Note that, the processing unit 150 may further include a component other than these components. That is, the processing unit 150 may perform an operation other than operations of these components.

Operations of the allocation unit 151 and the communication control unit 153 will be described below in detail.

<3.2. Configuration of Terminal Apparatus>

Figure 8:
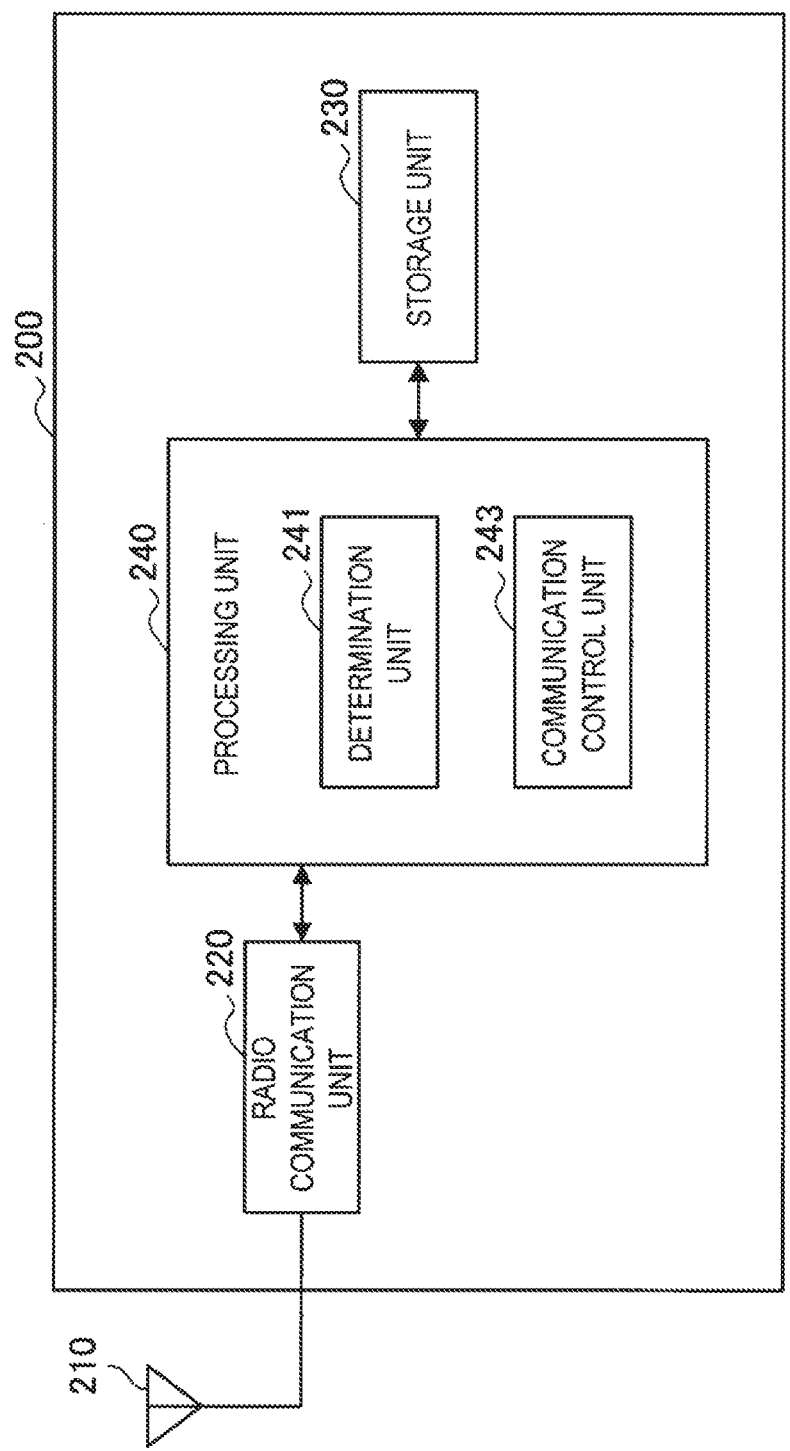
FIG. 8 is a block diagram illustrating an exemplary logical configuration of a terminal apparatus according to the present embodiment.

FIG. 8 is a block diagram illustrating an exemplary logical configuration of the terminal apparatus 200 according to the present embodiment. As illustrated in FIG. 8, the terminal apparatus 200 includes an antenna unit 210, a radio communication unit 220, a storage unit 230 and a processing unit 240.

(1) Antenna Unit 210

The antenna unit 210 emits a signal output from the radio communication unit 220 to a space as a radio wave. In addition, the antenna unit 210 converts the spatial radio wave into a signal, and outputs the signal to the radio communication unit 220.

(2) Radio Communication Unit 220

The radio communication unit 220 transmits and receives a signal. For example, the radio communication unit 220 receives a downlink signal from the base station and transmits an uplink signal to the base station.

(3) Storage Unit 230

The storage unit 230 temporarily or permanently stores programs and various pieces of data for operating the terminal apparatus 200.

(4) Processing Unit 240

The processing unit 240 provides various functions of the terminal apparatus 200. The processing unit 240 includes a determination unit 241 and a communication control unit 243. Also, the processing unit 240 may further include a component other than these components. That is, the processing unit 240 may perform an operation other than operations of these components.

Operations of the determination unit 241 and the communication control unit 243 will be described below in detail.

4. Technical Characteristics

Next, technical characteristics of the system 1 according to the present embodiment will be described with reference to FIGS. 9 to 30.

<4.1. Restrictions on Transmission Parameters>

(1) Basic Principle

In the reception signal process described above, when the signal multiplexed by SPC is demodulated or decoded, it is preferable that the reception device be able to read DCI addressed to another reception device in addition to self-addressed DCI. This is because, in order to generate a replica of an interference component of a self-addressed signal due to a signal addressed to another user, the user uses the transmission parameters (for example, information included in DCI of the transmission parameters such as a modulation scheme, scrambling, interleaving, an error correction code and an encoding rate) used in the signal addressed to the other user.

A bit sequence of DCI including the transmission parameters is generally scrambled by a cell radio network temporary identifier (C-RNTI), a temporary C-RNTI, a semi-persistent schedule RNTI (SPS-RNTI) or the like. Such RNTIs are generally user-specific (UE-Specific), and are allocated from the base station 100 of a cell to which the terminal apparatus 200 is connected. Therefore, the terminal apparatus 200 has a difficulty in reading DCI other than self-addressed DCI. However, since the number of RNTIs is finite, it is possible to solve scramble in a round-robin manner. Therefore, it is said that the terminal apparatus 200 can read DCI other than self-addressed DCI, but it is impractical in consideration of a high processing load.

As one of methods of reading DCI for the other user, a method in which the transmission device transmits DCI of all reception devices to be multiplexed to each of the reception devices. However, in this method, a high communication load is necessary to transmit and receive DCI.

Accordingly, in the system 1 according to the present embodiment, when a signal is transmitted to at least some reception devices, the transmission device uses restricted transmission parameters. When the transmission parameters are restricted, without reading DCI addressed to the other reception device, a load of the interference cancellation process on the reception device side is reduced, and a communication load for transmitting and receiving DCI is reduced. While a technique for downlink in which the base station 100 is used as the transmission device and the terminal apparatus 200 is used as the reception device will be described below, the same technique may also be provided for uplink.

(2) Specific Restriction Examples (a) Control Based on Power Level

For example, the base station 100 may control whether restricted transmission parameters are allocated based on a power level allocated to a data channel that each of the terminal apparatuses 200 uses. Details will be described below with reference to FIGS. 9 and 10.

Figure 9:
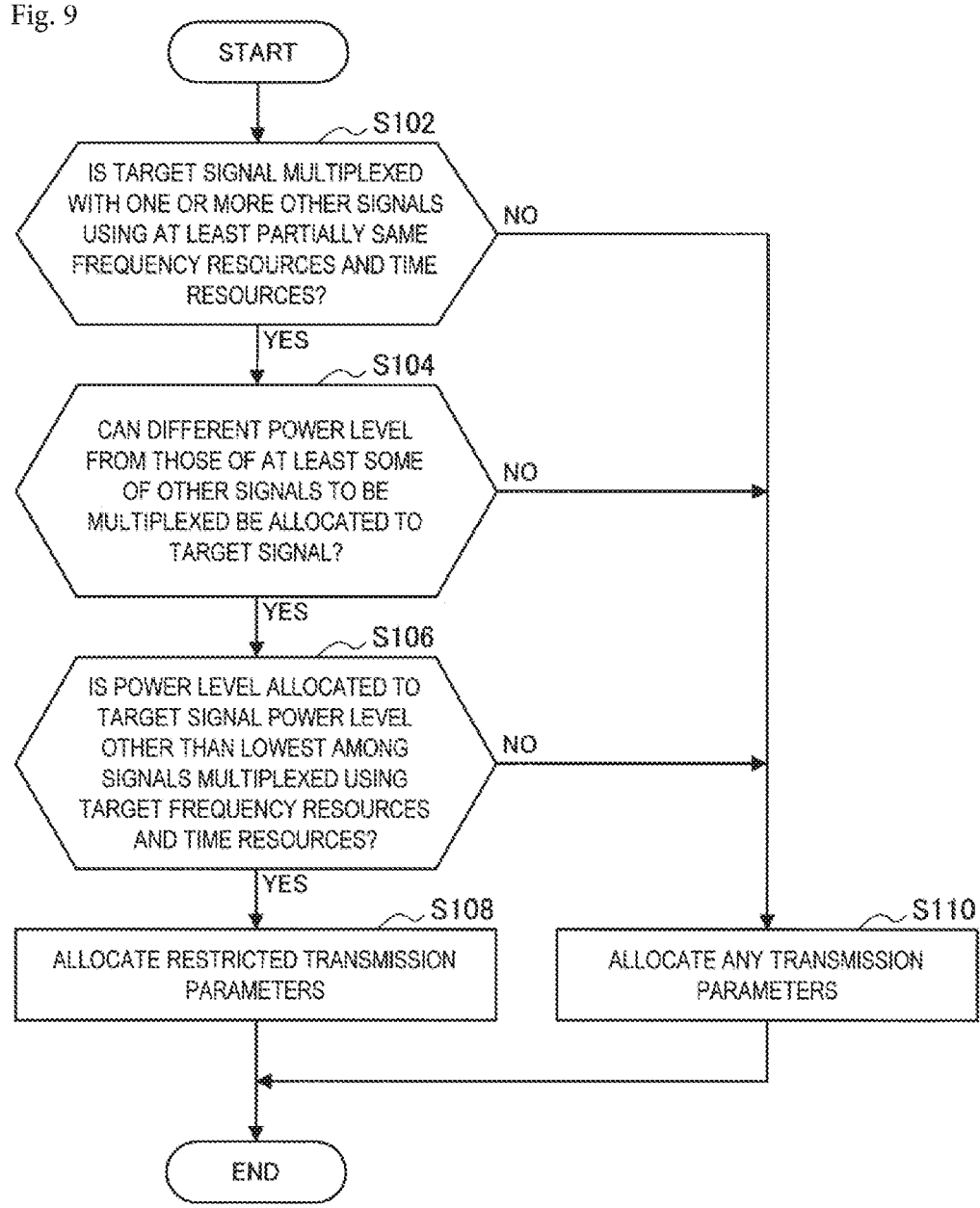
FIG. 9 is a flowchart illustrating an exemplary flow of an allocation process of transmission parameters performed in a base station according to the present embodiment.

FIG. 9 is a flowchart illustrating an exemplary flow of an allocation process of transmission parameters performed in the base station 100 according to the present embodiment. As illustrated in FIG. 9, as a first condition, the base station 100 determines whether a target signal is multiplexed with one or more other signals using at least partially the same frequency resources and time resources (Step S102). In addition, as a second condition, the base station 100 determines whether a power level different from those of at least some of other signals to be multiplexed can be allocated to the target signal (Step S104). In addition, as a third condition, the base station 100 determines whether the power level allocated to the target signal is not the lowest among signals multiplexed using target frequency resources and time resources (Step S106). When the first to third conditions are completely satisfied (YES in Step S102, YES in Step S104, and YES in Step S106), the base station 100 allocates the restricted transmission parameters (Step S108). On the other hand, when any of these conditions is not satisfied (NO in Step S102, NO in Step S104, or NO in Step S106), the base station 100 allocates any transmission parameters.

Figure 10:
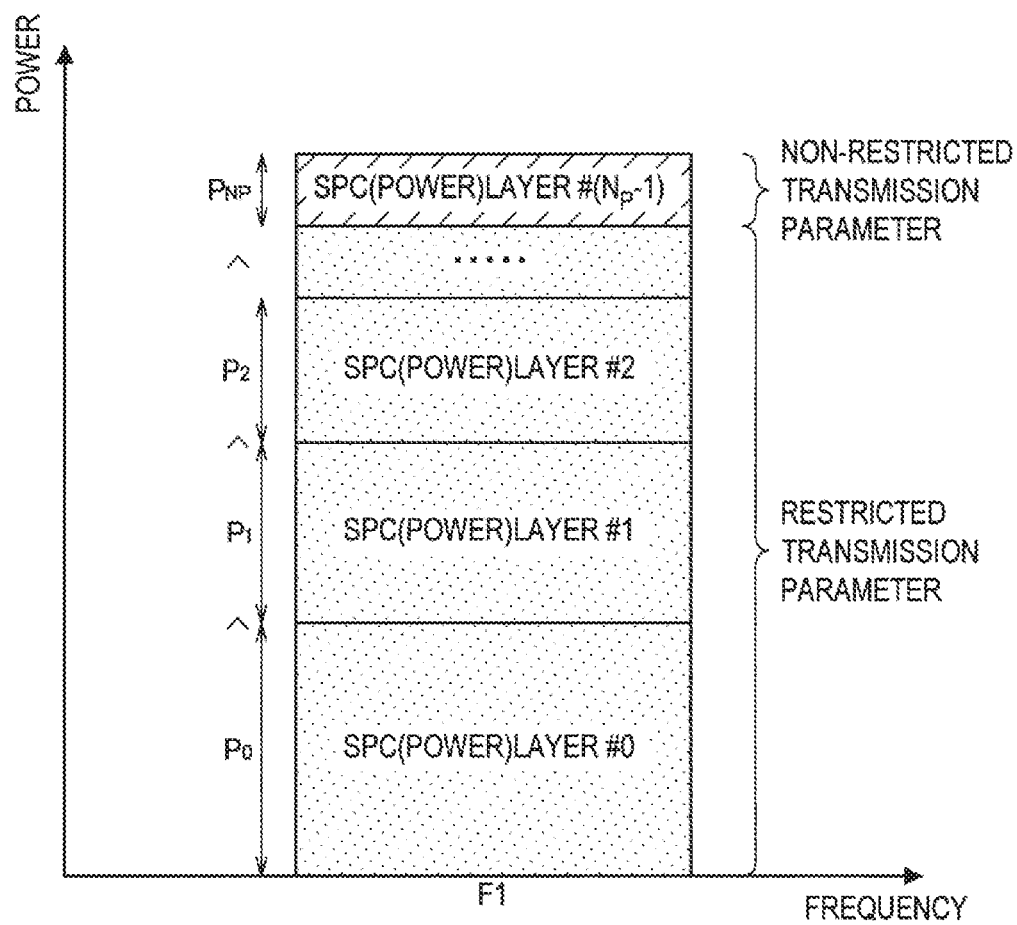
FIG. 10 is a diagram for describing an allocation process of transmission parameters according to the present embodiment.

FIG. 10 is a diagram for describing an allocation process of transmission parameters according to the present embodiment. The horizontal axis represents frequency resources, and the vertical axis represents a power level. Users are allocated with any power layer (an SPC Power Layer) #0 to #$N_P$−1. The users transmit and receive a signal using the power level of the allocated power layer. A height of the power layer indicates the power level, and the power level becomes higher as a power layer having a lower index. For example, power level $P_0$ is higher than $P_1$, $P_1$ is higher than $P_2$, and $P_{NP}$ is the lowest. For example, the base station 100 allocates any transmission parameters to a user allocated with a power layer #$N_P$−1 whose power level is the lowest, and allocates restricted transmission parameters to a user allocated with other power layer.

(a-1) Specific Example of Restricted Parameters

For example, the base station 100 according to the present embodiment allocates transmission parameters that are shared among the plurality of terminal apparatuses 200 as the restricted transmission parameters.

Specifically, the allocation unit 151 allocates at least partially shared transmission parameters to at least some of the plurality of terminal apparatuses 200 (or a signal, a data channel, a control channel or a broadcast channel) to which radio resources (for example, resource blocks) in which frequency resources or time resources at least partially overlap are allocated. Therefore, the communication control unit 153 controls a transmission process performed on the plurality of terminal apparatuses 200 using the shared transmission parameters. Specifically, the communication control unit 153 transmits a signal addressed to each of the plurality of terminal apparatuses 200 using the shared transmission parameters.

When the transmission parameters are shared, the user may acquire the shared transmission parameters for interference cancellation. That is, the user does not have to separately acquire each of the transmission parameters allocated to other users for interference cancellation. Since the transmission parameters are shared, a communication load and/or a processing load for the user to know the transmission parameters allocated to other users is reduced.

The terminal apparatus 200 according to the present embodiment performs the reception signal process in consideration of the transmission parameters that are shared.

For example, the determination unit 241 determines that at least partially shared transmission parameters are used in a signal addressed to another terminal apparatus 200 to which resource blocks in which frequency resources or time resources allocated to a self-addressed signal at least partially overlap are allocated. Therefore, the communication control unit 243 controls the interference cancellation process for a signal addressed to the other terminal apparatus 200 based on the determination result of the determination unit 241. Specifically, the communication control unit 243 performs the interference cancellation process by using the shared transmission parameters in the signal addressed to the other terminal apparatus 200.

The allocation unit 151 may allocate the shared transmission parameters based on the transmission parameters allocated to one terminal apparatus 200 selected from among the plurality of terminal apparatuses 200. A specific example in which the transmission parameters are shared will be described below.

(1) First Sharing (Transmission Process)

For example, the allocation unit 151 selects one terminal apparatus 200 having the lowest power level of a data channel allocated to each of the plurality of terminal apparatuses 200. Therefore, the allocation unit 151 allocates the same transmission parameters as the transmission parameters allocated to the selected one terminal apparatus 200 as the shared transmission parameters. That is, the allocation unit 151 allocates any transmission parameters to the terminal apparatus 200 having the lowest power level and allocates the shared transmission parameters to the other terminal apparatus 200.

In this case, the same transmission parameters are allocated to all users to be multiplexed. Therefore, by acquiring the self-allocated transmission parameters from self-addressed DCI, the user can automatically know the transmission parameters allocated to the other user. Therefore, the base station 100 can avoid reporting to the user the transmission parameters (for example, at least a part of information included in DCI) applied to a signal to be canceled (that is, interference cancellation). Accordingly, it is possible to decrease a communication load, compared to an example in which DCI of all users to be multiplexed is transmitted to each of the users.

Note that, when this sharing is performed, the terminal apparatus 200 preferably recognizes in advance the assumption that the same transmission parameters as the transmission parameters applied to the self-addressed signal is applied to a signal to be canceled. For example, the base station 100 may include the assumption in DCI and report that to the terminal apparatus 200. In addition, the number of power layers to be multiplexed $N_P$ is preferably set to 2.

A transmission process in the base station 100 will be described below with reference to FIG. 11.

Figure 11:
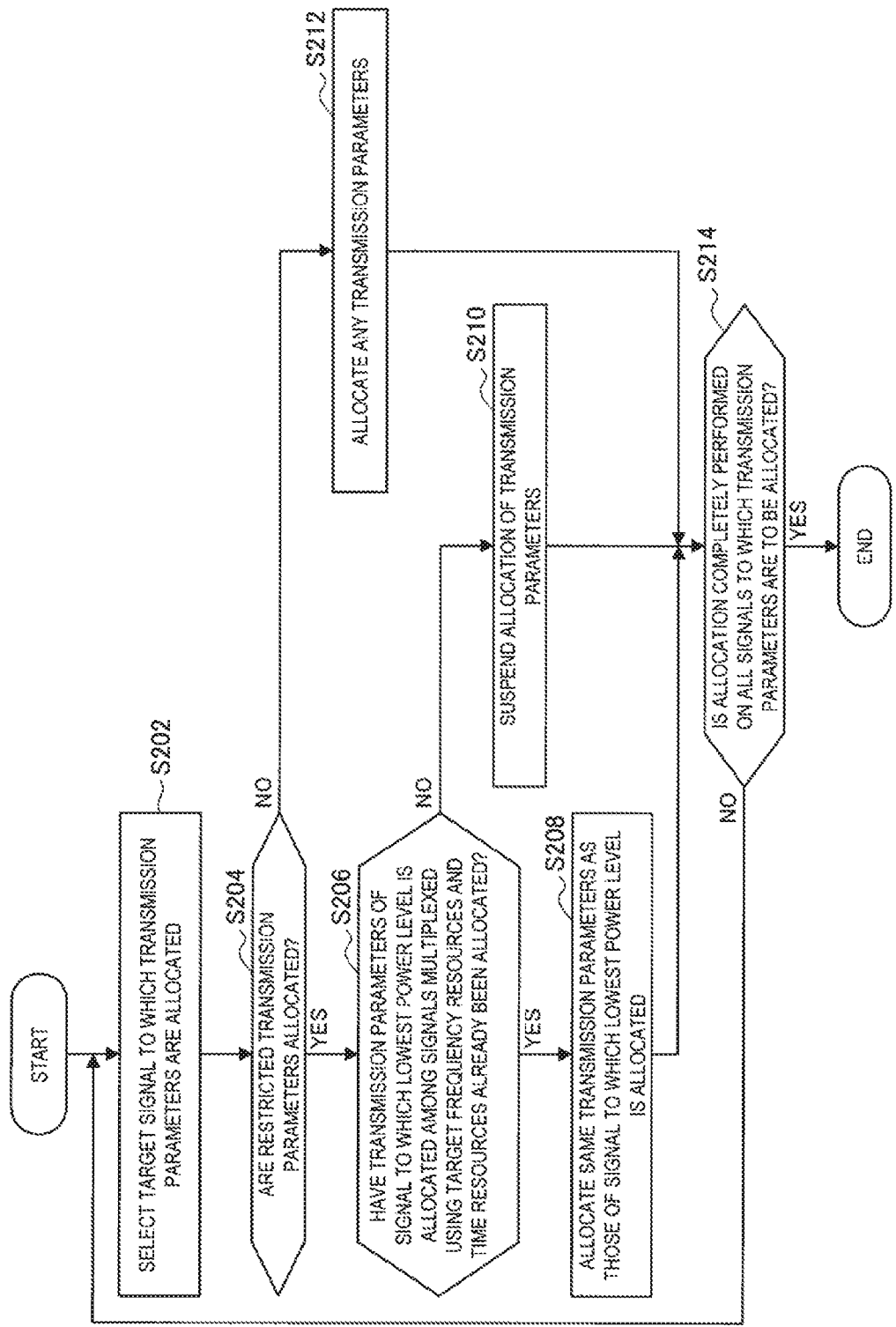
FIG. 11 is a flowchart illustrating an exemplary flow of an allocation process of transmission parameters performed in a base station according to the present embodiment.

FIG. 11 is a flowchart illustrating an exemplary flow of an allocation process of transmission parameters performed in the base station 100 according to the present embodiment. As illustrated in FIG. 11, first, the allocation unit 151 selects a target signal to which transmission parameters are allocated (Step S202). Next, the allocation unit 151 determines whether restricted transmission parameters are allocated to the target signal (Step S204). Such determination criteria are the same as those described with reference to FIG. 9.

A process when it is determined that the restricted transmission parameters are allocated (YES in Step S204) will be described. As described above with reference to FIG. 9, the present process is performed on a signal whose allocated power level is not the lowest among signals multiplexed using target frequency resources and time resources as a target.

First, the allocation unit 151 determines whether transmission parameters of a signal to which the lowest power level is allocated among signals multiplexed using target frequency resources and time resources have already been allocated (Step S206). When it is determined that the transmission parameters have already been allocated (YES in Step S206), the allocation unit 151 allocates the same transmission parameters as those of the signal to which the lowest power level is allocated (Step S208). As the same transmission parameters, for example, resource block allocation, modulation and coding scheme (MCS), redundancy version (RV), precoding and spatial layers) and the like are exemplified. On the other hand, when it is determined that the transmission parameters are not yet allocated (NO in Step S206), the allocation unit 151 suspends allocation of the transmission parameters (S210). That is, the allocation unit 151 waits until the transmission parameters of the signal to which the lowest power level is allocated are allocated. After the allocation, the process advances to a process of Step S208.

On the other hand, when it is determined that the restricted transmission parameters are not allocated (NO in Step S204), the allocation unit 151 allocates any transmission parameters (Step S212). For example, the allocation unit 151 allocates the transmission parameters based on a result of measurement of such as channel state information (CSI) that is previously fed-back from the terminal apparatus 200 serving as a destination of the signal. As described above with reference to FIG. 9, the present process is performed on a signal whose allocated power level is the lowest as a target among, for example, signals multiplexed using target frequency resources and time resources.

Then, the allocation unit 151 determines whether allocation is completely performed on all signals to which transmission parameters are to be allocated. When the allocation is incomplete, the process returns to Step S202 (NO in Step S214). When the allocation is completed, the process ends (YES in Step S214).

The communication control unit 153 transmits a signal using the transmission parameters allocated in this manner.

(Reception Process)

For example, the determination unit 241 determines that transmission parameters at least partially shared with the transmission parameters used in the self-addressed signal are used in the signal addressed to the other terminal apparatus 200. For example, the determination unit 241 determines that the shared transmission parameters are used in the signal addressed to the other terminal apparatus 200 based on content of DCI and a format of DCI received from the base station 100, or the power level allocated to the self-addressed signal. Therefore, the communication control unit 243 performs the interference cancellation process on the signal addressed to the other terminal apparatus 200 to which a higher power level than a power level of a self-allocated data channel is allocated as a target. Accordingly, the terminal apparatus 200 can cancel interference due to a signal having higher reception power than the self-addressed signal without separately acquiring the transmission parameters for the other terminal apparatus 200.

A reception process in the terminal apparatus 200 will be described below with reference to FIG. 12.

Figure 12:
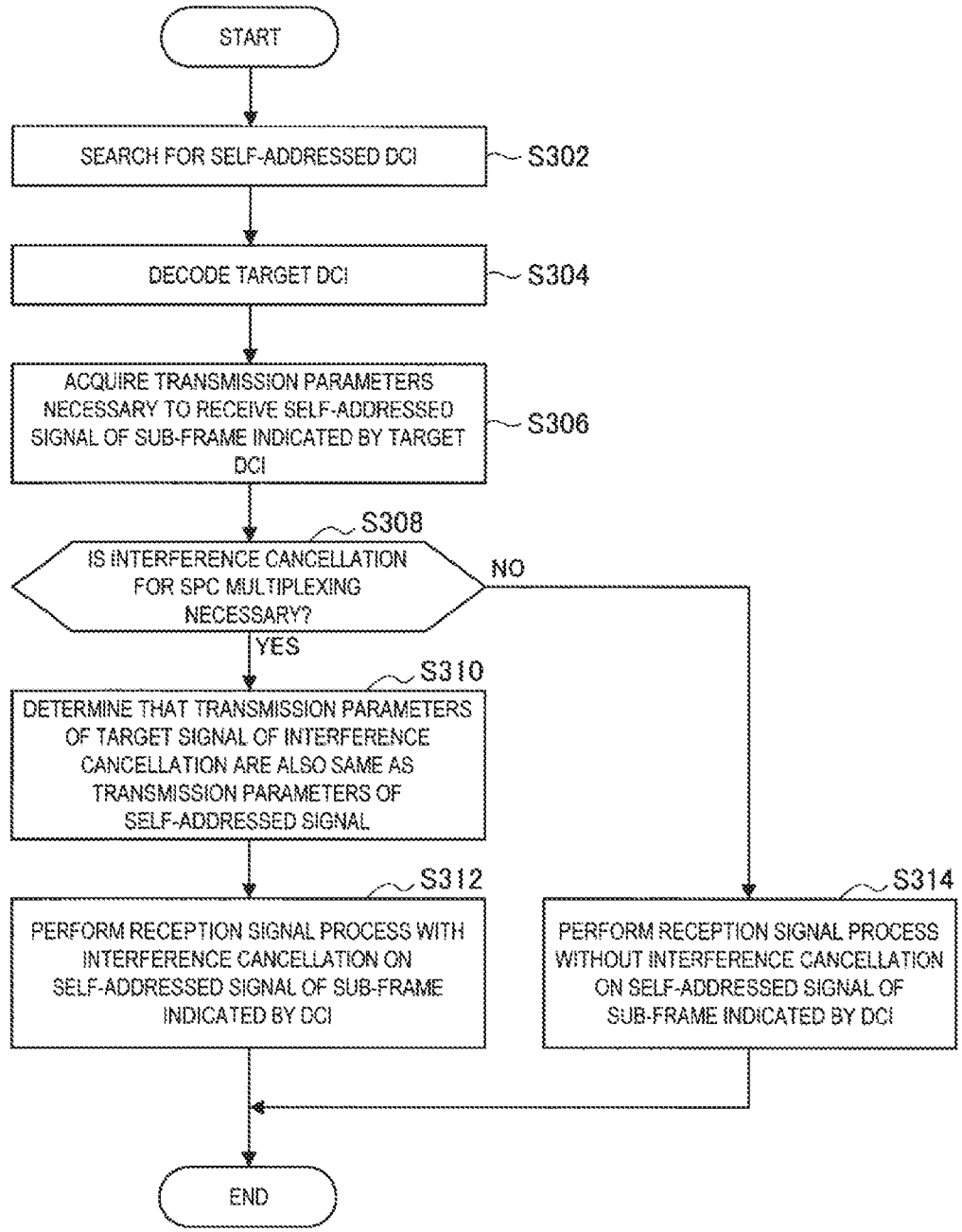
FIG. 12 is a flowchart illustrating an exemplary flow of an interference cancellation process performed in a terminal apparatus according to the present embodiment.

FIG. 12 is a flowchart illustrating an exemplary flow of an interference cancellation process performed in the terminal apparatus 200 according to the present embodiment. As illustrated in FIG. 12, first, the communication control unit 243 searches for self-addressed DCI (Step S302), and decodes target DCI (Step S304). For example, the communication control unit 243 searches PDCCH, Common Search Space, and/or Dedicated Search Space for DCI to be decoded by itself (that is, self-addressed). Next, the communication control unit 243 reads and acquires the transmission parameters necessary to receive a self-addressed signal of a sub-frame indicated by target DCI from the DCI (Step S306). DCI may be, for example, legacy format DCI shown in Tables 1 to 8, and may further include IE indicating whether SPC multiplexing is applied and IE indicating a number of a power layer to which the self-addressed signal is allocated (that is, a number of a power level allocated thereto).

Next, the determination unit 241 determines whether interference cancellation for SPC multiplexing is necessary (Step S308). For example, the determination unit 241 determines that interference cancellation is necessary when multiplexing using SPC is applied to the self-addressed signal and a power level allocated to the self-addressed signal is not the highest among signals to be multiplexed. This is because interference cancellation has to be performed on the signal addressed to the other user that interferes with the self-addressed signal and has higher reception power than the self-addressed signal as a target. On the other hand, when multiplexing using SPC is not applied to the self-addressed signal or a power level allocated to the self-addressed signal is the highest among multiplexed signals, the determination unit 241 determines that interference cancellation is unnecessary.

When it is determined that interference cancellation is necessary (YES in Step S308), the determination unit 241 determines that transmission parameters of a target signal of interference cancellation are also the same as the transmission parameters of the self-addressed signal (Step S310). Therefore, the communication control unit 243 performs the reception signal process with interference cancellation on the self-addressed signal of the sub-frame indicated by DCI (Step S312). In this case, the communication control unit 243 performs interference cancellation assuming that transmission parameters of an interference signal are the same as the transmission parameters of the self-addressed signal.

On the other hand, when it is determined that interference cancellation is unnecessary (NO in Step S308), the communication control unit 243 performs the reception signal process without interference cancellation on the self-addressed signal of the sub-frame indicated by DCI (Step S314).

(2) Second Sharing (Transmission Process)

For example, the allocation unit 151 may allocate the predetermined transmission parameters to the terminal apparatus 200 other than the terminal apparatus 200 selected as having the lowest power level as the shared transmission parameters. That is, the allocation unit 151 allocates any transmission parameters to the terminal apparatus 200 having the lowest power level and allocates the predetermined (that is, shared) transmission parameters to the other terminal apparatus 200.

In this case, any transmission parameters are allocated to a user having the lowest power level, and the predetermined transmission parameters are allocated to the other users. As described above, the reception device performs the interference cancellation process on a signal addressed to the other device having higher reception power than the self-addressed signal as a target. Therefore, since the signal of the user having the lowest power level is not considered as a target of the interference cancellation process for any other user, the other users does not have to know the transmission parameters allocated to the user having the lowest power level. Accordingly, in this allocation example, the user can know the transmission parameters allocated to the other user serving as an interference cancellation target. Therefore, the base station 100 can avoid reporting to the user the transmission parameters (for example, at least a part of information included in DCI) applied to a signal to be canceled (that is, interference cancellation). Accordingly, it is possible to decrease a communication load, compared to an example in which DCI of all users to be multiplexed is transmitted to each of the users.

Note that, when this sharing is performed, the terminal apparatus 200 preferably recognizes in advance the assumption that the predetermined transmission parameters are applied to a signal to be canceled. For example, the base station 100 may include the assumption in DCI and report that to the terminal apparatus 200.

A transmission process in the base station 100 will be described below with reference to FIG. 13.

Figure 13:
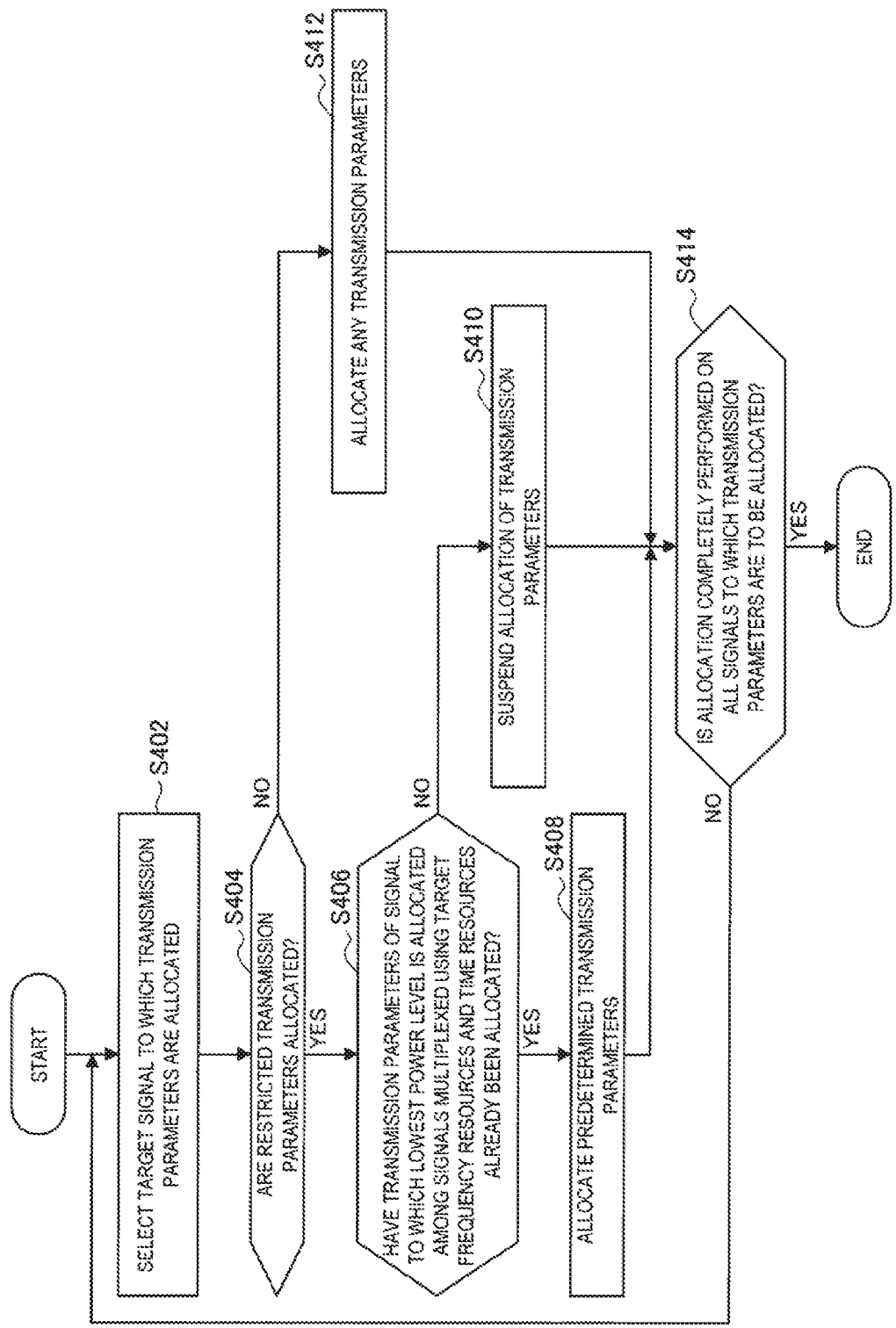
FIG. 13 is a flowchart illustrating an exemplary flow of an allocation process of transmission parameters performed in a base station according to the present embodiment.

FIG. 13 is a flowchart illustrating an exemplary flow of an allocation process of transmission parameters performed in the base station 100 according to the present embodiment. The flowchart illustrated in FIG. 13 is the same as the flowchart illustrated in FIG. 11 except that a process of Step S408 is different. Therefore, here, the process of Step S408 will be described.

In Step S408, the allocation unit 151 allocates the predetermined transmission parameters. The predetermined transmission parameters are preferably shared in advance between the base station 100 and the terminal apparatus 200 included in the system 1.

(Reception Process)

For example, the determination unit 241 determines that the predetermined transmission parameters are used in the signal addressed to the other terminal apparatus 200. For example, the determination unit 241 determines that the predetermined transmission parameters are used in the signal addressed to the other terminal apparatus 200 based on content of DCI and a format of DCI received from the base station 100, or the power level allocated to the self-addressed signal. Therefore, the communication control unit 243 performs the interference cancellation process on the signal addressed to the other terminal apparatus 200 to which a higher power level than a power level of a self-allocated data channel is allocated as a target. Accordingly, the terminal apparatus 200 can cancel interference due to a signal having higher reception power than the self-addressed signal without separately acquiring the transmission parameters for the other terminal apparatus 200.

A reception process in the terminal apparatus 200 will be described below with reference to FIG. 14.

Figure 14:
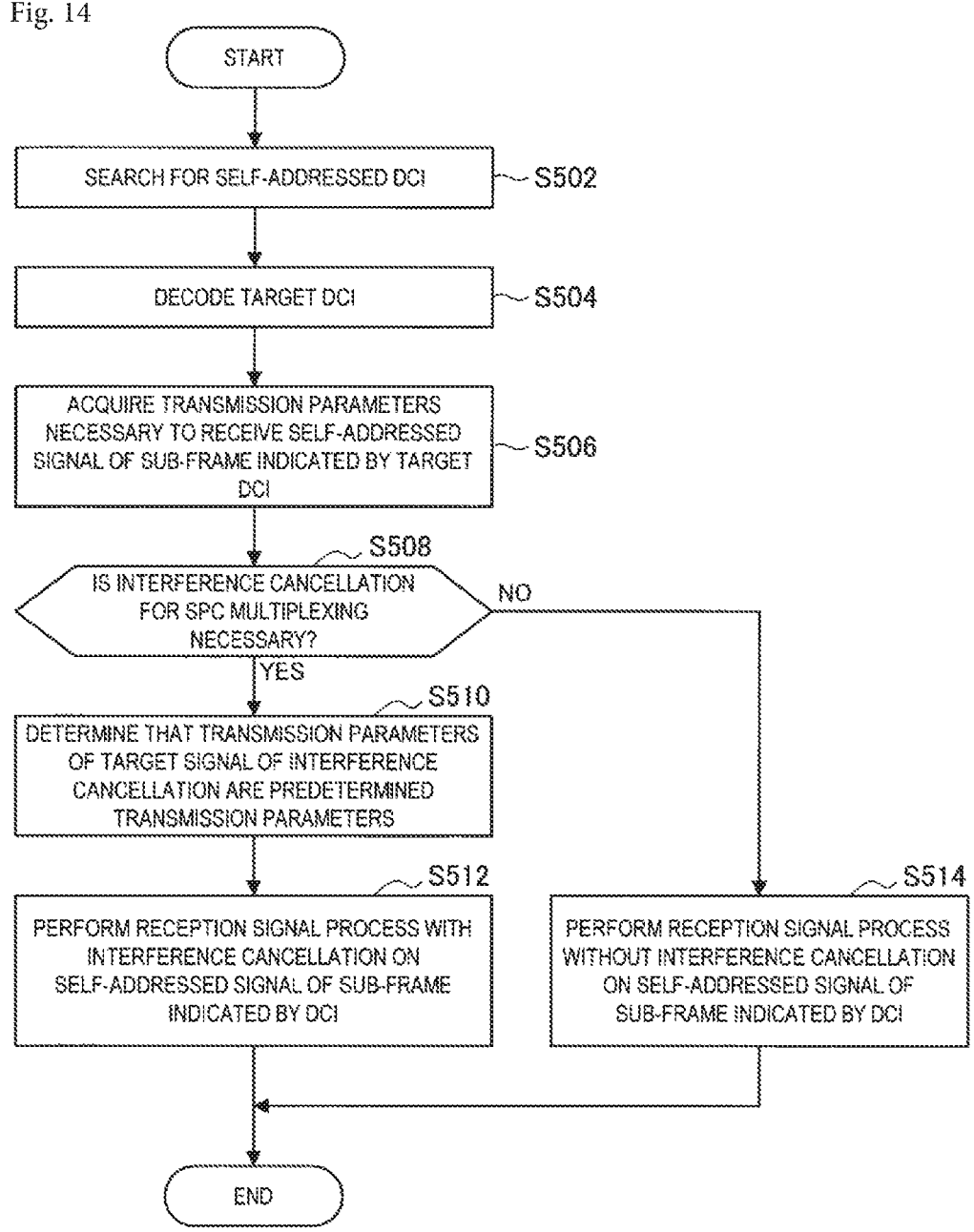
FIG. 14 is a flowchart illustrating an exemplary flow of an interference cancellation process performed in a terminal apparatus according to the present embodiment.

FIG. 14 is a flowchart illustrating an exemplary flow of an interference cancellation process performed in the terminal apparatus 200 according to the present embodiment. The flowchart illustrated in FIG. 14 is the same as the flowchart illustrated in FIG. 12 except that a process of Step S510 is different. Therefore, here, the process of Step S510 will be described.

In Step S510, the determination unit 241 determines that transmission parameters of a target signal of interference cancellation are the predetermined transmission parameters. For example, the determination unit 241 determines that the transmission parameters shared in advance between the base station 100 and the terminal apparatus 200 included in the system 1 are applied to the target signal of interference cancellation.

(b) Retransmission Control

For example, the base station 100 may perform control related to a hybrid automatic repeat request (HARQ) according to the allocated power level.

For example, the communication control unit 153 performs retransmission control of transmission data (for example, a transport block) based on the allocated power level. More specifically, the communication control unit 153 transmits transmission data of first transmission or retransmission using the signal to which the lowest power level is allocated. In addition, the communication control unit 153 transmits transmission data of first transmission using a signal other than the signal to which the lowest power level is allocated.

In other words, the communication control unit 153 sets a redundancy version (RV) used for error correction coding or rate matching of transmission data based on the allocated power level. More specifically, the communication control unit 153 uses RV at the time of first transmission or retransmission for transmission data transmitted using the signal to which the lowest power level is allocated. In addition, the communication control unit 153 uses RV at the time of first transmission for transmission data transmitted using a signal other than the signal to which the lowest power level is allocated. Also, RV is a transmission parameter related to rate matching after FEC encoding.

Also, the base station 100 may allocate a power level according to a state of retransmission control. That is, while retransmission control is performed after power allocation in the above, power allocation may be performed after retransmission control.

For example, the communication control unit 153 may allocate a power level to each signal according to a state of retransmission control of transmission data. More specifically, the communication control unit 153 allocates the lowest power level to a signal including transmission data of retransmission. In addition, the communication control unit 153 allocates a power level other than the lowest power level to a signal including transmission data of first transmission. Also, the communication control unit 153 may allocate the lowest power level to a signal including transmission data of first transmission.

In other words, the communication control unit 153 may allocate a power level to each signal according to setting of a redundancy version (RV). More specifically, the communication control unit 153 allocates the lowest power level to a signal in which RV at the time of retransmission is used. In addition, the communication control unit 153 allocates a power level other than the lowest power level to a signal in which RV at the time of first transmission is used. Also, the communication control unit 153 may allocate the lowest power level to a signal in which RV at the time of first transmission is used.

According to such a process, RV related to transmission data transmitted using a signal other than the signal to which the lowest power level is allocated is limited to RV at the time of first transmission. Details will be described below with reference to FIGS. 15 and 16.

Figure 15:
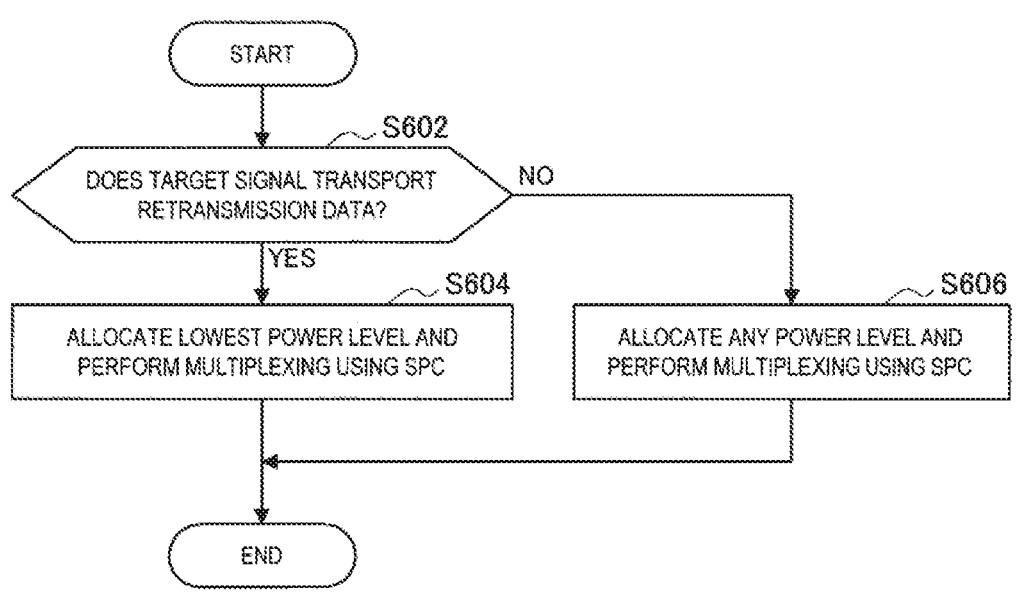
FIG. 15 is a diagram illustrating an exemplary flow of an allocation process of transmission parameters performed in a base station according to the present embodiment.

FIG. 15 is a flowchart illustrating an exemplary flow of an allocation process of transmission parameters performed in the base station 100 according to the present embodiment. As illustrated in FIG. 15, first, the base station 100 determines whether the target signal transports retransmission data (Step S602). When it is determined that the target signal transports retransmission data (YES in Step S602), the base station 100 allocates the lowest power level and performs multiplexing using SPC (Step S604). On the other hand, when it is determined that the target signal transports data of first transmission (NO in Step S602), the base station 100 allocates any power level and performs multiplexing using SPC (Step S606). Note that, the base station 100 may switch whether it performs multiplexing using SPC according to first transmission or retransmission.

Figure 16:
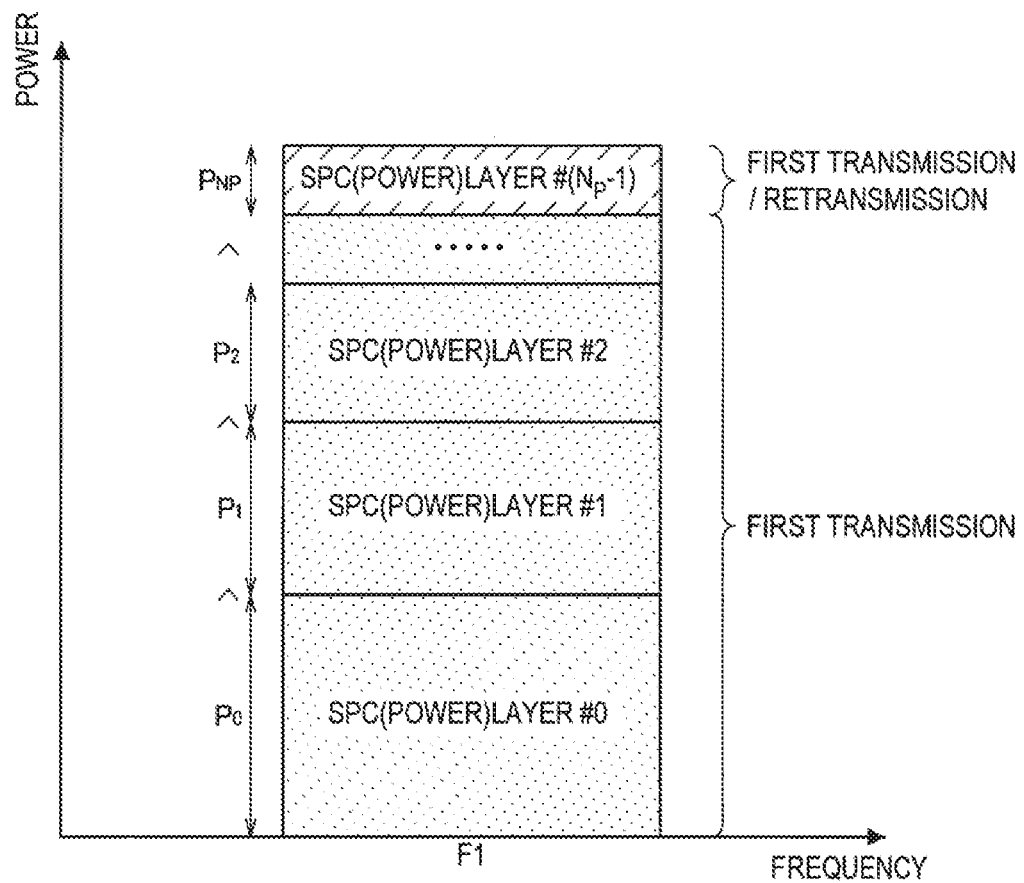
FIG. 16 is a diagram for describing an allocation example of transmission parameters according to the present embodiment.

FIG. 16 is a diagram for describing an allocation example of transmission parameters according to the present embodiment. The horizontal axis represents frequency resources and the vertical axis represents a power level. The power level becomes higher as a power layer having a lower index. As illustrated in FIG. 16, for example, the base station 100 allocates a power layer #$N_P$-1 whose power level is the lowest to a signal transporting retransmission data. In addition, the base station 100 allocates any power layer to a signal transporting data of first transmission. Since a power layer #$N_P$-1 is allocated to the signal transporting retransmission data, power layers #0 to #$N_P$-2 are preferably allocated to the signal transporting data of first transmission.

<4.2. Allocation Example of Transmission Parameters>

Next, a specific allocation example of transmission parameters will be described.

(Resource Allocation)

First, a preferable allocation example related to allocation of radio resources will be described.

For example, the allocation unit 151 allocates the same resource block as the shared transmission parameters. That is, the allocation unit 151 allocates radio resources in which both frequency resources and time resources overlap to the plurality of terminal apparatuses 200 to be multiplexed using SPC. However, an amount of data to be transmitted and received may be different for each terminal apparatus 200. In such a case, as the shared transmission parameters, the allocation unit 151 may allocate, to the terminal apparatus 200 having a high allocated power level, a resource block including a resource block allocated to the other terminal apparatus 200 having a lower allocated power level than that of the terminal apparatus 200. In such allocation, when interference cancellation is performed on the signal of a layer having a low power level, there is no need to consider in detail a modulation scheme for each resource block in a frequency direction. Accordingly, a load of the cancellation process on the terminal apparatus 200 side decreases and an amount of control information (for example, DCI) whose report is necessary decreases. Details will be described below with reference to FIG. 17.

Figure 17:
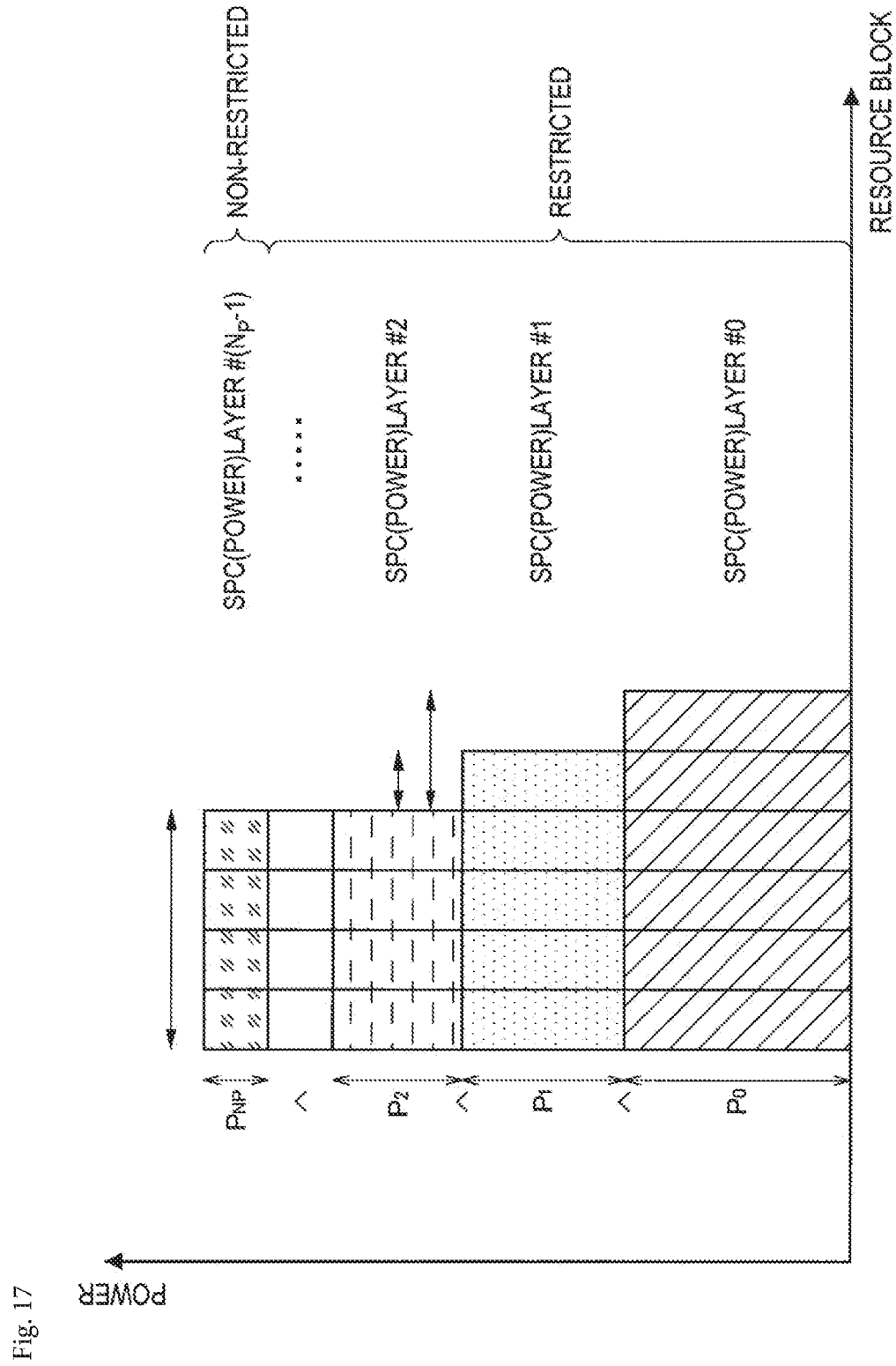
FIG. 17 is a diagram for describing an allocation example of transmission parameters according to the present embodiment.

FIG. 17 is a diagram for describing an allocation example of transmission parameters according to the present embodiment. The horizontal axis represents a resource block. The vertical axis represents a power level. The power level becomes higher as a power layer having a lower index. It is assumed that a difference of colors (hatching) of power layers indicates a difference of allocated users. As illustrated in FIG. 17, the same resource block is allocated for a signal to which a power layer #$N_P$-1 whose power level is the lowest is allocated, and a signal to which a power layer #$N_P$-2 to a power layer #2 are allocated. In addition, a resource block including a resource block allocated to a signal to which a power layer #2 lower than a power layer #1 is allocated is allocated to a signal to which a power layer #1 is allocated. In addition, a resource block including a resource block allocated to a signal to which a power layer #1 lower than a power layer #0 is allocated is allocated to a signal to which a power layer #0 is allocated.

Next, an allocation example that should be avoided for allocation of radio resources will be described with reference to FIG. 18.

Figure 18:
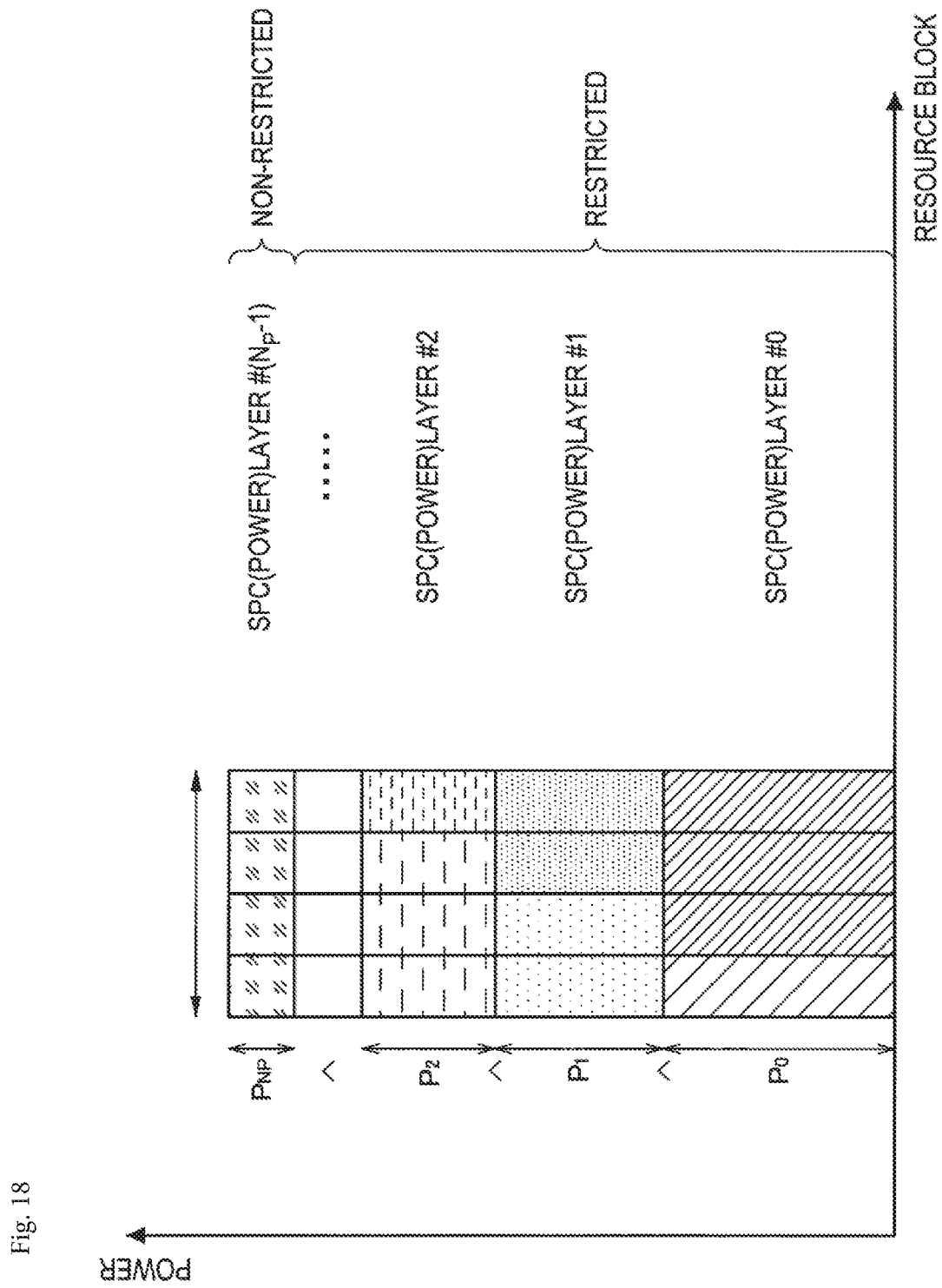
FIG. 18 is a diagram for describing an allocation example of transmission parameters according to the present embodiment.

FIG. 18 is a diagram for describing an allocation example of transmission parameters according to the present embodiment. The horizontal axis represents a resource block. The vertical axis represents a power level. The power level becomes higher as a power layer having a lower index. It is assumed that a difference of colors (hatching) of power layers indicates a difference of allocated users. In the example illustrated in FIG. 18, in a range of resource blocks allocated with certain power layers, signals of a plurality of users are mixed and allocated with other power layers having a higher power level than that of the power layer. For example, in a range of a resource block allocated to a power layer #$N_P$-1 whose power level is the lowest, signals of two users are mixed in a power layer #2. In such a case, the terminal apparatus 200 side has to consider a modulation scheme, an encoding scheme, an encoding rate, a type of an MCS and a precoder for each mixed user signal, and has a concern of a load of the interference cancellation process. In addition, since the base station 100 side has to report such information, necessary control information (for example, DCI) is expected to increase. However, when transmission parameters other than the RB such as the modulation scheme, the encoding scheme, the encoding rate, the type of the MCS and the precoder are restricted to being shared between the mixed users, such a concern is also mitigated, and thus the example illustrated in FIG. 18 may be allowed.

(Modulation Scheme, Encoding Scheme, Encoding Rate, and MCS)

For example, the allocation unit 151 may allocate at least partially shared transmission parameters for a modulation scheme, an encoding scheme, an encoding rate and an MCS.

For example, the allocation unit 151 may allocate the transmission parameters to the terminal apparatus 200 having a high allocated power level such that a data rate or frequency usage efficiency that is the same as or lower than that of the other terminal apparatus 200 having a lower allocated power level than that of the terminal apparatus 200 is achieved. Accordingly, in the terminal apparatus 200, even when no interference cancellation is performed, it is possible to suppress reception quality from degrading (occurrence of bit or block errors).

Specifically, the allocation unit 151 allocates, to the terminal apparatus 200 having a high allocated power level, a modulation scheme in which an amount of information that can be transmitted in one symbol is the same as or lower than that of the other terminal apparatus 200 having a lower allocated power level than that of the terminal apparatus 200. In other words, the allocation unit 151 may allocate, to the terminal apparatus 200 having a high allocated power level, a modulation and coding scheme (MCS) that is the same or lower than that of the other terminal apparatus 200 having a lower allocated power level than that of the terminal apparatus 200. This is the same as in the encoding scheme and the encoding rate.

Here, Tables 9 and 10 are exemplary tables of a modulation scheme and a TBS index. Table 9 is an exemplary table in which QPSK, 16QAM and 64QAM are used as candidates. In addition, Table 10 is an exemplary table in which QPSK, 16QAM, 64QAM and 256QAM are used as candidates.

An MCS index may be stored in IE of MCS in legacy format DCI in Tables 1 to 8. A modulation order refers to a modulation order corresponding to a type of the modulation scheme. For example, QPSK has a modulation order of 2, 16QAM has a modulation order of 4, 64QAM has a modulation order of 6, and 256QAM has a modulation order of 8. A TBS index refers to an index that is used in other tables for calculating a transport block size. In the system 1, when tables of a plurality of modulation schemes and TBS indices shown in Tables 9 and 10 can be used, a table to be used is preferably determined in advance. In addition, the same table is preferably used between users multiplexed by SPC.

TABLE 9

| MCS Index $I_{MCS}$ | Modulation Order $Q_m$ | TBS Index $I_{TBS}$ |
| --- | --- | --- |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

TABLE 10

| MCS Index $I_{MCS}$ | Modulation Order $Q_m$ | TBS Index $I_{TBS}$ |
| --- | --- | --- |
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 11 |
| 7 | 4 | 12 |
| 8 | 4 | 13 |
| 9 | 4 | 14 |
| 10 | 4 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 8 | 25 |
| 21 | 8 | 27 |
| 22 | 8 | 28 |
| 23 | 8 | 29 |
| 24 | 8 | 30 |
| 25 | 8 | 31 |
| 26 | 8 | 32 |
| 27 | 8 | 33 |
| 28 | 2 | reserved |
| 29 | 4 | |
| 30 | 6 | |
| 31 | 8 | |

Details will be described below with reference to FIGS. 19 to 24.

Figure 19:
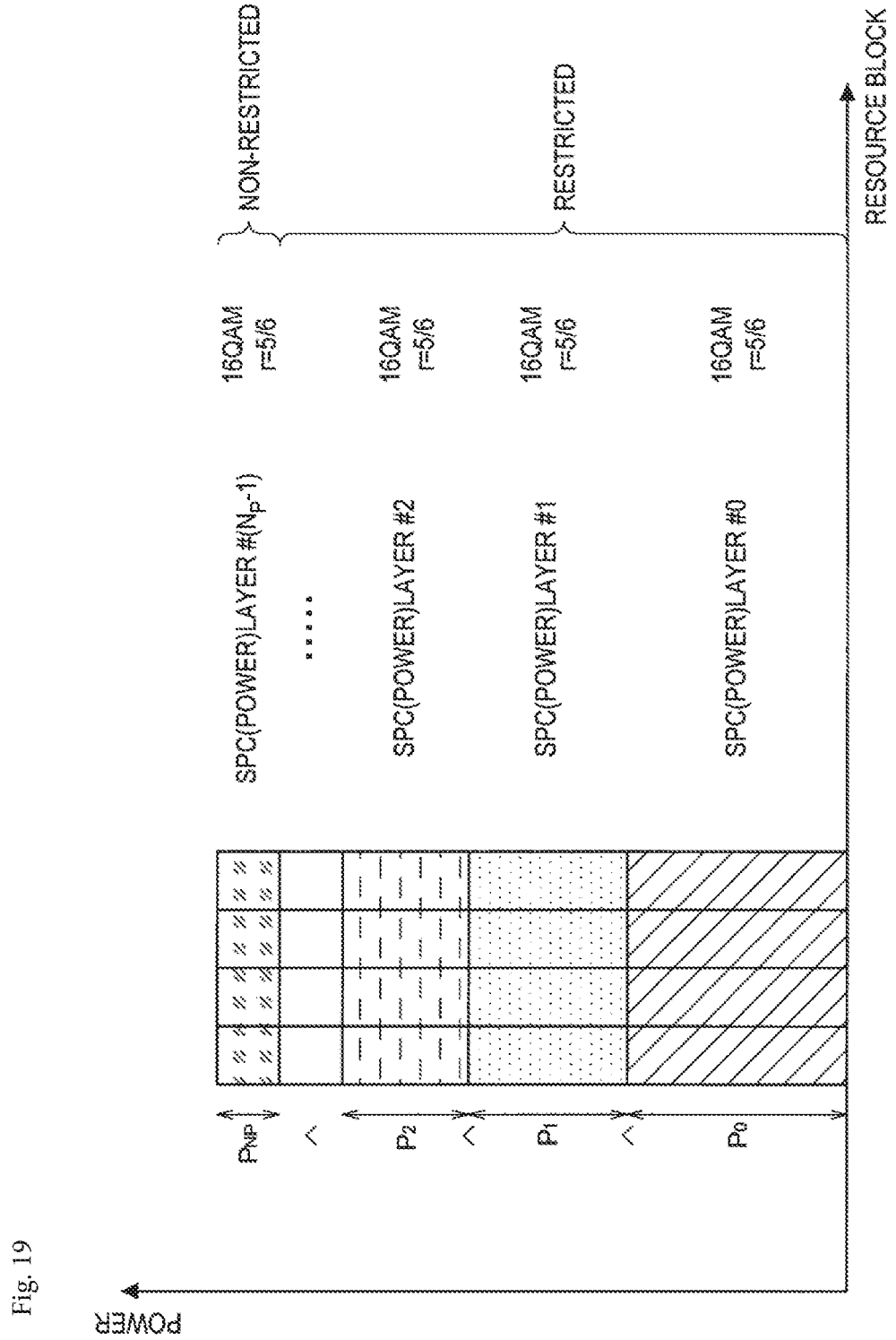
FIG. 19 is a diagram for describing an allocation example of transmission parameters according to the present embodiment.

FIG. 19 is a diagram for describing an allocation example of transmission parameters according to the present embodiment. The horizontal axis represents a resource block. The vertical axis represents a power level. The power level becomes higher as a power layer having a lower index. It is assumed that a difference of colors (hatching) of power layers indicates a difference of allocated users. In the example illustrated in FIG. 19, the same modulation scheme 16QAM, and the same encoding rate r=5/6 of the same encoding scheme are allocated to a power layer #$N_P$–1 whose power level is the lowest and a power layer #$N_P$–2 to a power layer #0. Accordingly, in the terminal apparatus 200 to which a power layer #$N_P$–2 to a power layer #0 are allocated, the same data rate or frequency usage efficiency as that of the terminal apparatus 200 to which a power layer #0 whose power level is the lowest is allocated is achieved. Not that, the allocation example of the transmission parameters illustrated in FIG. 19 corresponds to the specific example of first sharing described above.

Figure 20:
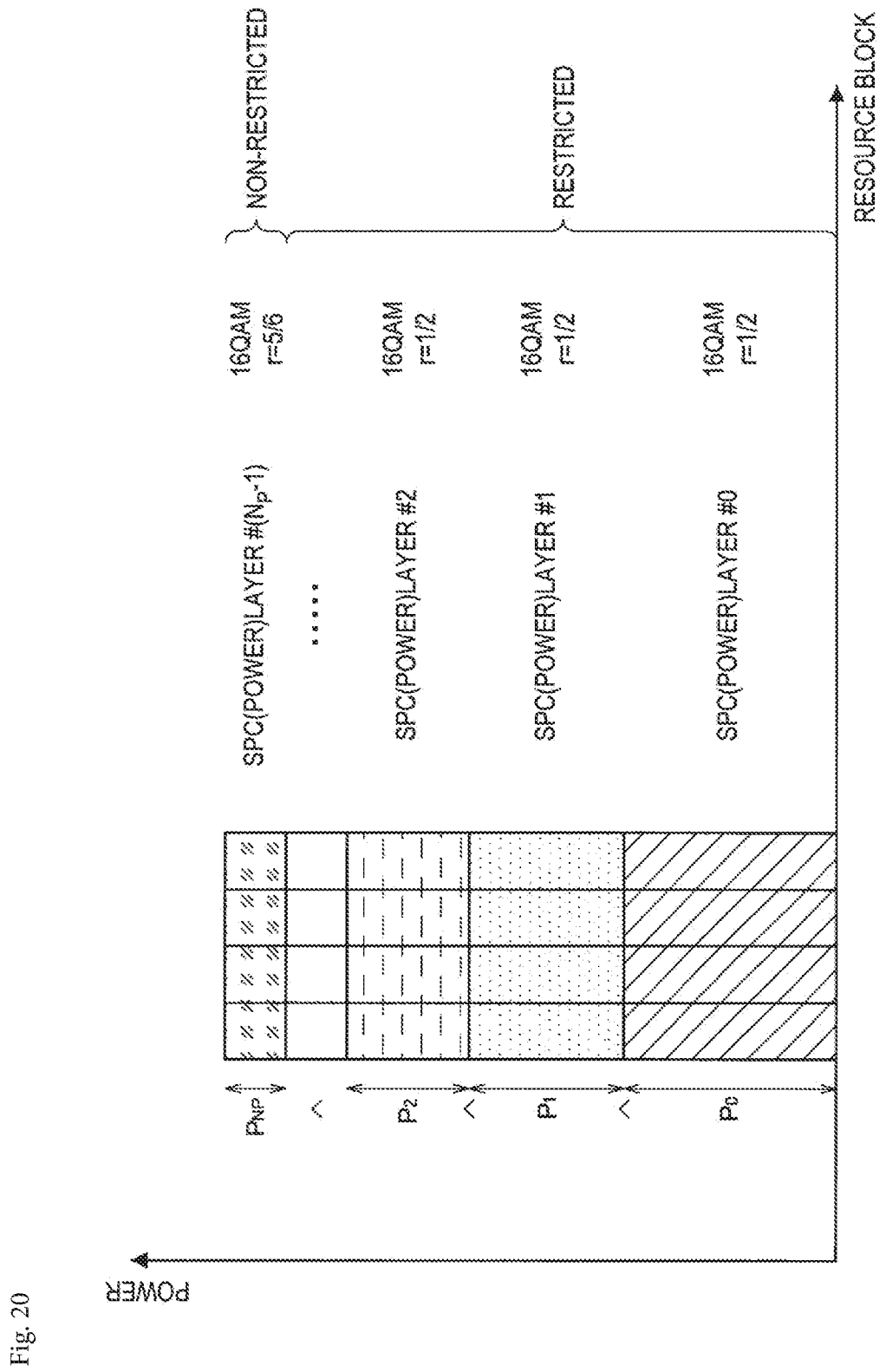
FIG. 20 is a diagram for describing an allocation example of transmission parameters according to the present embodiment.

FIG. 20 is a diagram for describing an allocation example of transmission parameters according to the present embodiment. The horizontal axis represents a resource block. The vertical axis represents a power level. The power level becomes higher as a power layer having a lower index. It is assumed that a difference of colors (hatching) of power layers indicates a difference of allocated users. In the example illustrated in FIG. 20, the same modulation scheme 16QAM is allocated to a power layer #$N_P$–1 whose power level is the lowest and a power layer #$N_P$–2 to a power layer #0. On the other hand, as the encoding rate, an encoding rate r=5/6 is allocated to the power layer #$N_P$–1, and an encoding rate r=1/2 is allocated to the power layer #$N_P$–2 to the power layer #0. Accordingly, in the terminal apparatus 200 to which a power layer #$N_P$–2 to a power layer #0 whose power levels are high are allocated, a lower data rate or frequency usage efficiency than that of the terminal apparatus 200 to which a power layer #0 whose power level is the lowest is allocated is achieved. Note that, the allocation example of the transmission parameters illustrated in FIG. 20 corresponds to the specific example of second sharing described above.

Here, in the example illustrated in FIG. 20, the terminal apparatus 200 generates, for example, an interference signal replica equivalent to an output of a demodulator or a demapper without passing through an FEC decoder, and thus can perform interference cancellation at a level of a modulation symbol. Accordingly, an increase in a degree of freedom of a transmission data rate is expected. In addition, when the encoding rate is reported to the terminal apparatus 200, it is possible to generate an interference signal replica equivalent to an FEC decoding output. When the encoding rate is reported to the terminal apparatus 200, since a gain of FEC in the interference cancellation process may not be expected, it is necessary to be aware of a demerit that reception quality decreases somewhat.

Figure 21:
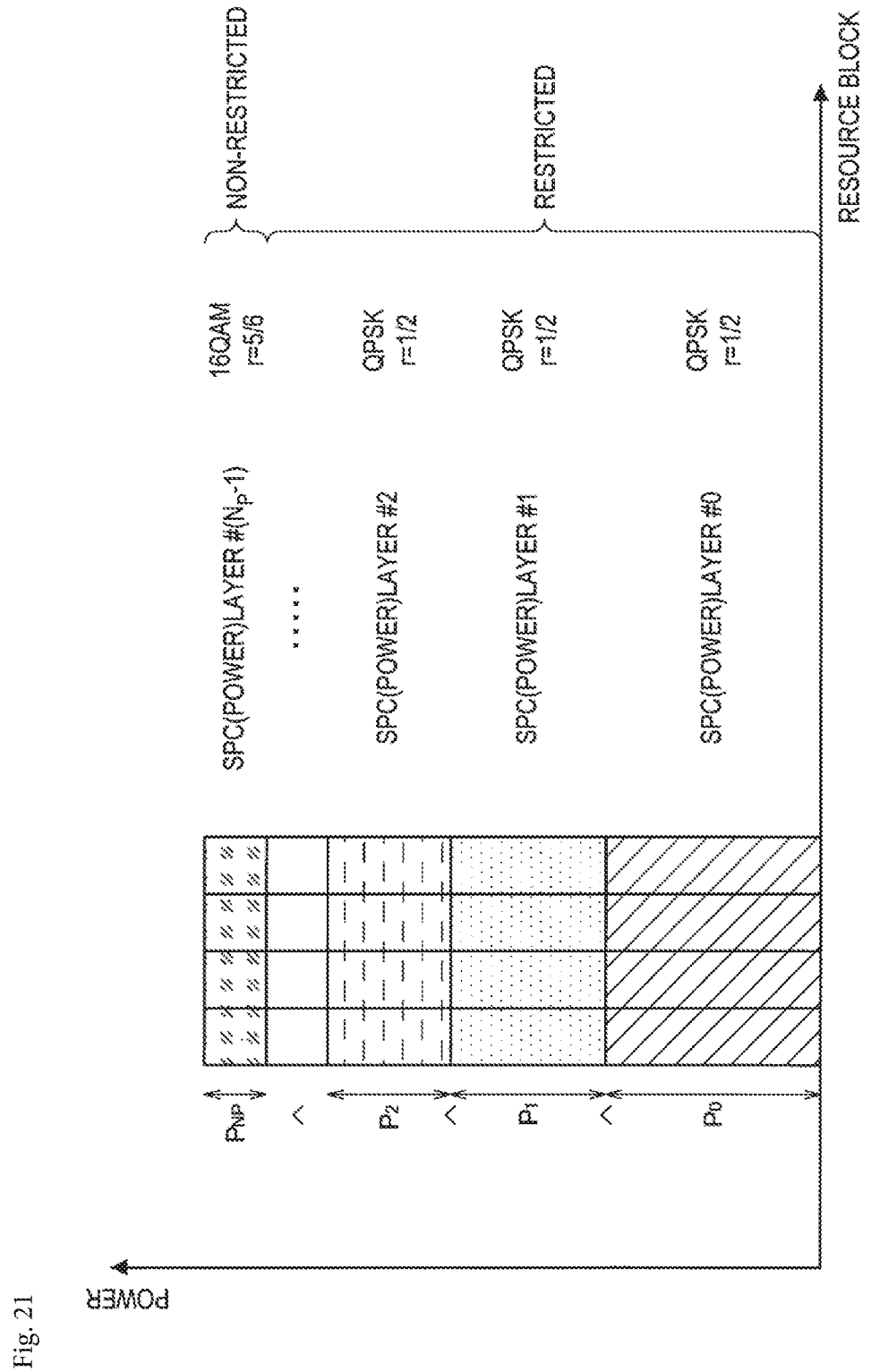
FIG. 21 is a diagram for describing an allocation example of transmission parameters according to the present embodiment.

FIG. 21 is a diagram for describing an allocation example of transmission parameters according to the present embodiment. The horizontal axis represents a resource block. The vertical axis represents a power level. The power level becomes higher as a power layer having a lower index. It is assumed that a difference of colors (hatching) of power layers indicates a difference of allocated users. In the example illustrated in FIG. 21, as the modulation scheme, a modulation scheme 16QAM is allocated to a power layer #$N_P$-1 whose power level is lowest, and QPSK is allocated to a power layer #$N_P$-2 to a power layer #0. In addition, as the encoding rate, an encoding rate r=5/6 is allocated to a power layer #$N_P$-1 whose power level is lowest, and an encoding rate r=1/2 is allocated to a power layer #$N_P$-2 to a power layer #0. Accordingly, in the terminal apparatus 200 to which a power layer #$N_P$-2 to a power layer #0 whose power levels are high are allocated, a lower data rate or frequency usage efficiency than that of the terminal apparatus 200 to which a power layer #0 whose power level is the lowest is allocated is achieved. Note that, the allocation example of the transmission parameters illustrated in FIG. 21 corresponds to the specific example of second sharing described above.

Here, the shared parameters in the example illustrated in FIG. 21 have a modulation scheme of QPSK and an encoding rate r=½. Such transmission parameters are preferably used to implement the lowest data rate among modulation schemes and encoding rates that can be implemented in the system 1. Accordingly, in the terminal apparatus 200, even when no interference cancellation is performed, it is possible to suppress reception quality from degrading (occurrence of bit or block errors). However, it is necessary to be aware that an achievable transmission data rate peaks with such restrictions.

Figure 22:
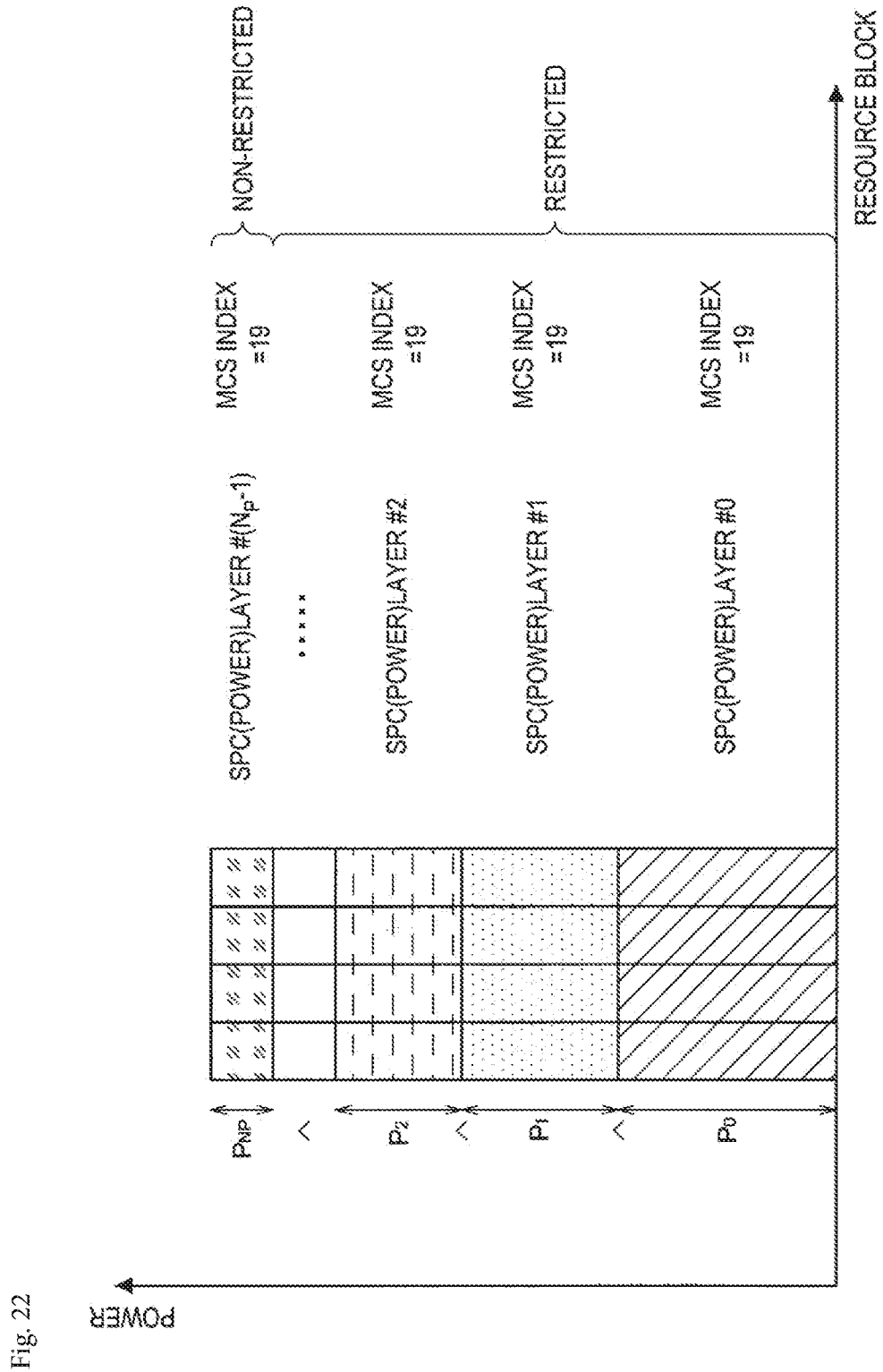
FIG. 22 is a diagram for describing an allocation example of transmission parameters according to the present embodiment.

FIG. 22 is a diagram for describing an allocation example of transmission parameters according to the present embodiment. The horizontal axis represents a resource block. The vertical axis represents a power level. The power level becomes higher as a power layer having a lower index. It is assumed that a difference of colors (hatching) of power layers indicates a difference of allocated users. In the example illustrated in FIG. 22, the same MCS index of 19 is allocated to a power layer #$N_P$-1 whose power level is the lowest and a power layer #$N_P$-2 to a power layer #0. Accordingly, in the terminal apparatus 200 to which a power layer #$N_P$-2 to a power layer #0 are allocated, the same data rate or frequency usage efficiency as that of the terminal apparatus 200 to which a power layer #0 whose power level is the lowest is allocated is achieved. Not that, the allocation example of the transmission parameters illustrated in FIG. 22 corresponds to the specific example of first sharing described above.

Figure 23:
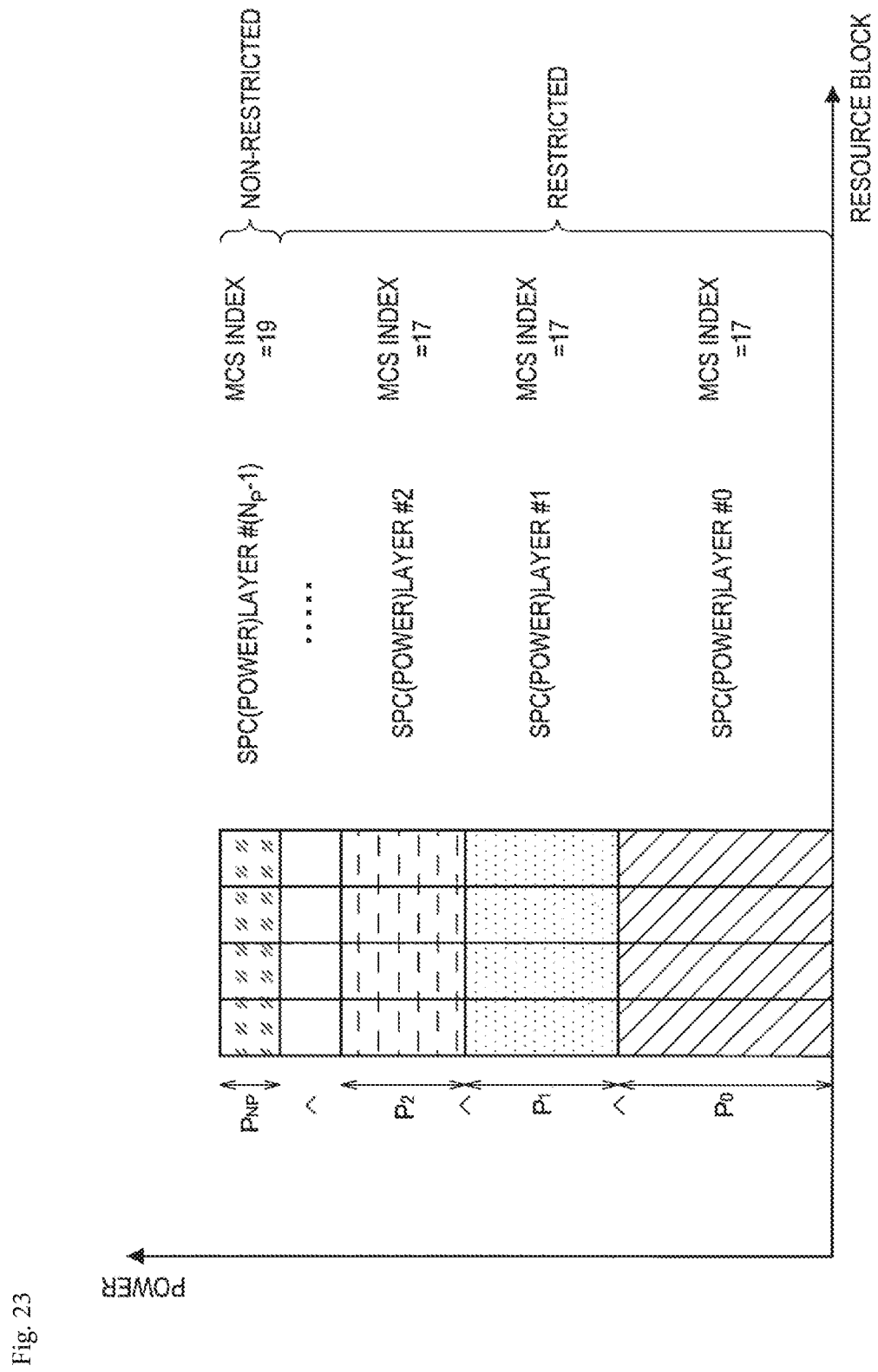
FIG. 23 is a diagram for describing an allocation example of transmission parameters according to the present embodiment.

FIG. 23 is a diagram for describing an allocation example of transmission parameters according to the present embodiment. The horizontal axis represents a resource block. The vertical axis represents a power level. The power level becomes higher as a power layer having a lower index. It is assumed that a difference of colors (hatching) of power layers indicates a difference of allocated users. In the example illustrated in FIG. 23, an MCS index of 19 is allocated to a power layer #$N_P$-1 whose power level is lowest, and an MCS index of 17 is allocated to a power layer #$N_P$-2 to a power layer #0. Note that, as shown in Tables 9 and 10, the same modulation order is allocated to a power layer #$N_P$-1 to a power layer #0. Accordingly, in the terminal apparatus 200 to which a power layer #$N_P$-2 to a power layer #0 whose power levels are high are allocated, a lower data rate or frequency usage efficiency than that of the terminal apparatus 200 to which a power layer #0 whose power level is the lowest is allocated is achieved. Note that, the allocation example of the transmission parameters illustrated in FIG. 20 corresponds to the specific example of second sharing described above.

Figure 24:
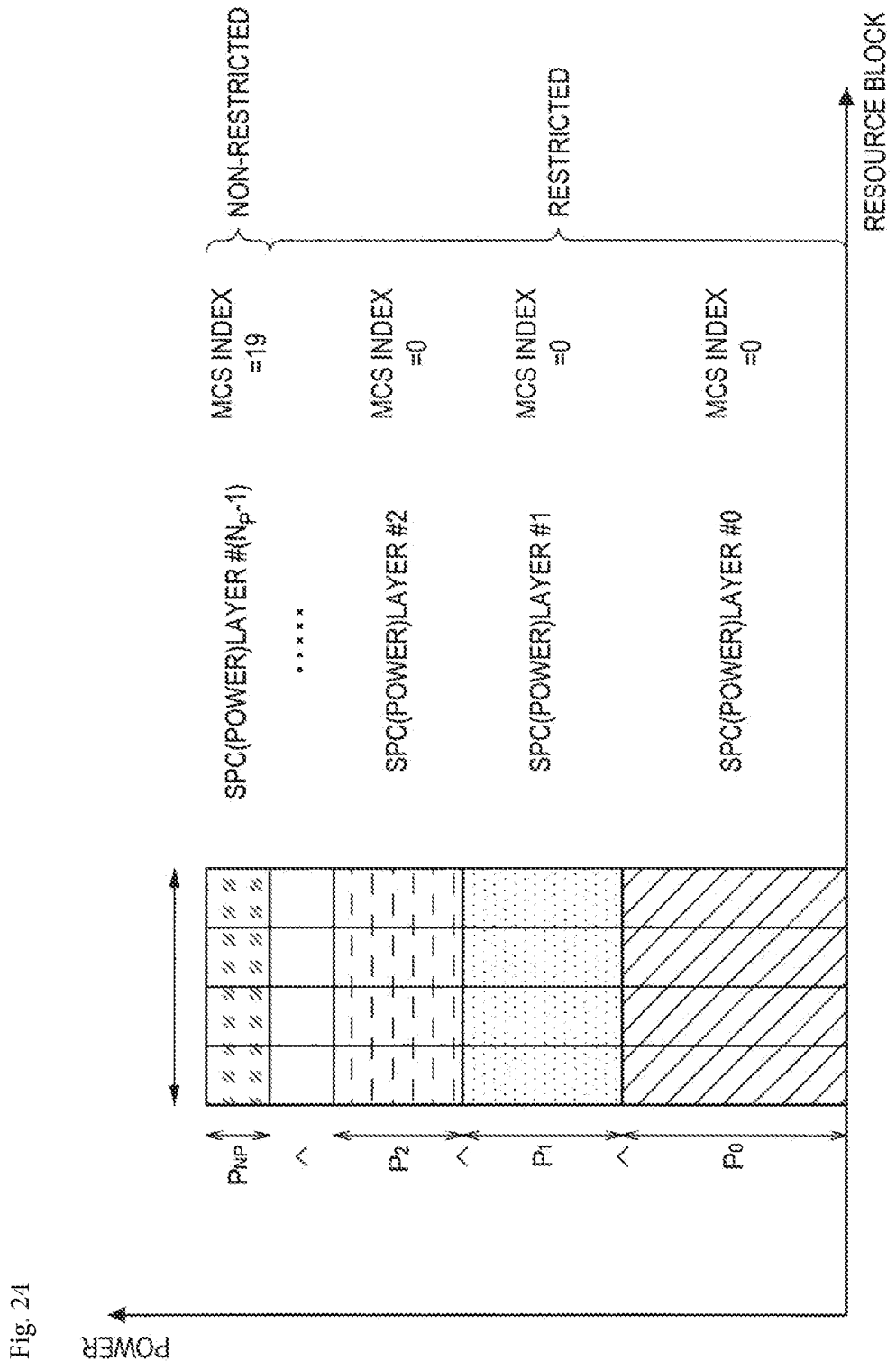
FIG. 24 is a diagram for describing an allocation example of transmission parameters according to the present embodiment.

FIG. 24 is a diagram for describing an allocation example of transmission parameters according to the present embodiment. The horizontal axis represents a resource block. The vertical axis represents a power level. The power level becomes higher as a power layer having a lower index. It is assumed that a difference of colors (hatching) of power layers indicates a difference of allocated users. In the example illustrated in FIG. 23, an MCS index of 19 is allocated to a power layer #$N_P$-1 whose power level is lowest, and an MCS index of 0 is allocated to a power layer #$N_P$-2 to a power layer #0. Therefore, in the terminal apparatus 200 to which a power layer #$N_P$-2 to a power layer #0 whose power levels are high, are allocated, a lower data rate or frequency usage efficiency than that of the terminal apparatus 200 to which a power layer #0 whose power level is the lowest is allocated is achieved. Note that, the allocation example of the transmission parameters illustrated in FIG. 24 corresponds to the specific example of second sharing described above.

(RV)

For example, the allocation unit 151 may share RV. Details will be described below with reference to FIGS. 25 and 26.

Figure 25:
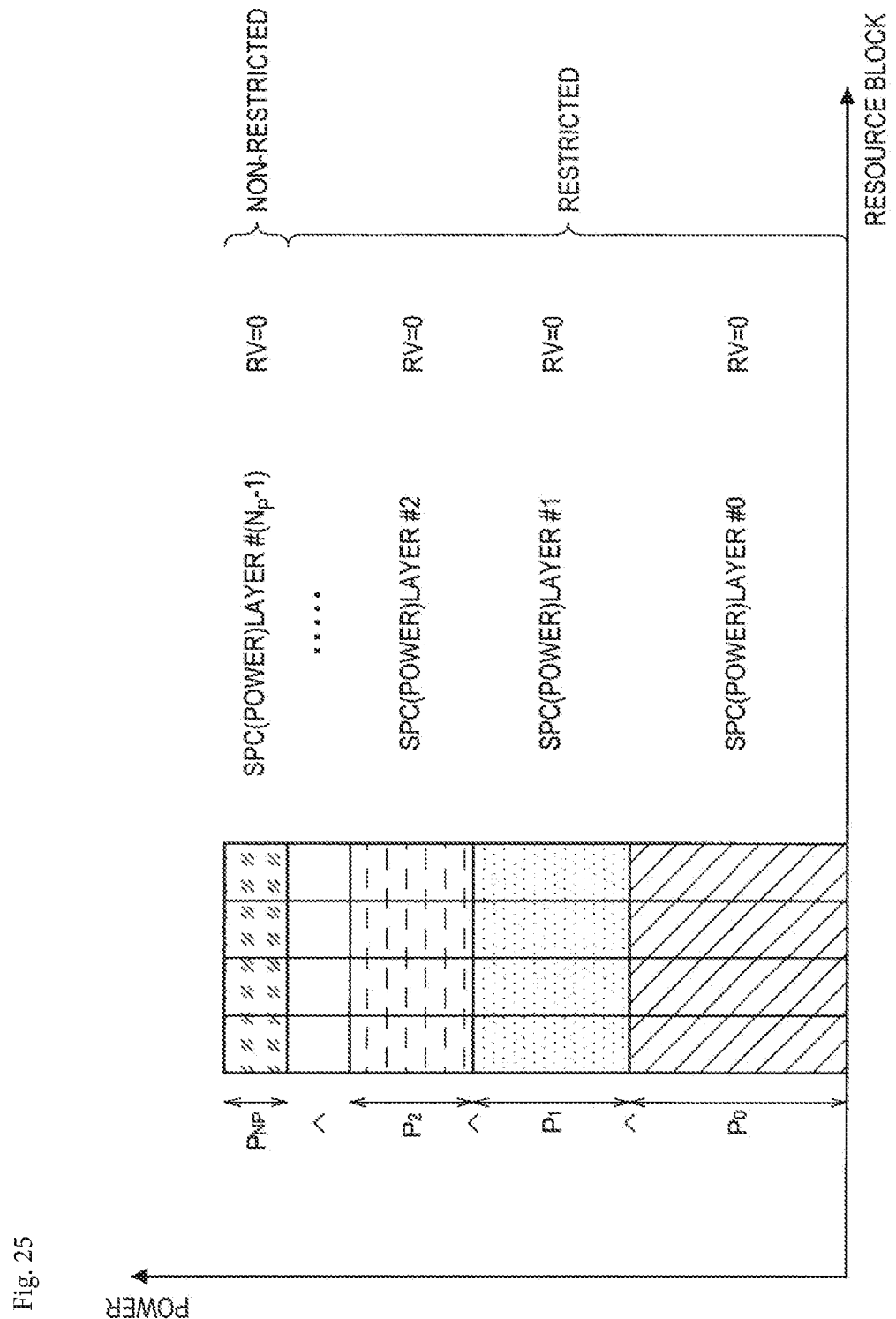
FIG. 25 is a diagram for describing an allocation example of transmission parameters according to the present embodiment.

FIG. 25 is a diagram for describing an allocation example of transmission parameters according to the present embodiment. The horizontal axis represents a resource block. The vertical axis represents a power level. The power level becomes higher as a power layer having a lower index. It is assumed that a difference of colors (hatching) of power layers indicates a difference of allocated users. In the example illustrated in FIG. 25, the same RV of 0 is allocated to all power layers. Note that, the allocation example of the transmission parameters illustrated in FIG. 25 corresponds to the specific example of first sharing described above.

Figure 26:
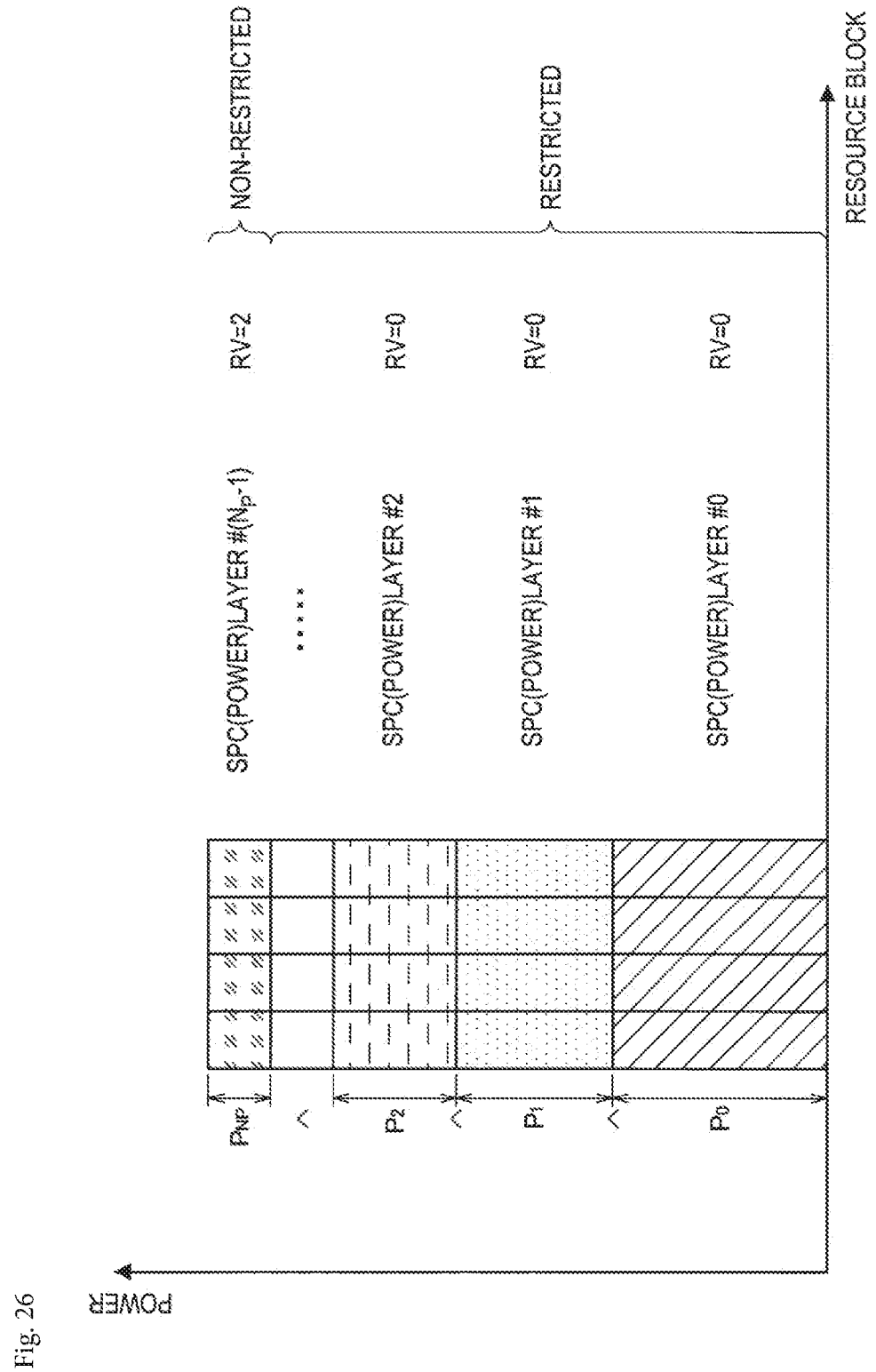
FIG. 26 is a diagram for describing an allocation example of transmission parameters according to the present embodiment.

FIG. 26 is a diagram for describing an allocation example of transmission parameters according to the present embodiment. The horizontal axis represents a resource block. The vertical axis represents a power level. The power level becomes higher as a power layer having a lower index. It is assumed that a difference of colors (hatching) of power layers indicates a difference of allocated users. In the example illustrated in FIG. 26, RV=2 is allocated to a power layer #$N_P$-1 whose power level is lowest, and RV=0 is allocated to a power layer #$N_P$-2 to a power layer #0. Note that, the allocation example of the transmission parameters illustrated in FIG. 26 corresponds to the specific example of second sharing described above.

Here, in the shared parameters in the example illustrated in FIG. 26, RV=0. This value is preferably the same RV value that is used at the time of first transmission in HARQ when the system 1 uses HARQ.

(Spatial Resources)

For example, the allocation unit 151 may allocate the same spatial resources as the shared transmission parameter. Specifically, the allocation unit 151 may allocate a precoder (for example, a precoding matrix and the number of spatial layers) for the same spatial multiplexing as the shared transmission parameter. Therefore, in radio resources, a percentage of a reference signal necessary for reception and decoding may decrease. In addition, signals multiplexed by SPC to which the same precoding matrix is applied are preferably transmitted from the same antenna or antenna port. Further, when signals to which different precoding matrixes are applied and multiplexed by SPC are transmitted using the same time resources (for example, a sub-frame), these signals are preferably transmitted from different antennas or antenna ports.

A process of the communication control unit 153 sharing spatial resources will be described. The communication control unit 153 applies the same precoding matrix to some or all signals multiplexed by SPC using the same resource block. In addition, the communication control unit 153 applies the same number of spatial layers to some or all signals multiplexed by SPC using the same resource block. In addition, when the same precoding matrix or the same number of spatial layers is applied, the communication control unit 153 sets the same antenna or antenna port used for transmission. In addition, when a different precoding matrix or a different number of spatial layers is applied, the communication control unit 153 sets a different antenna or antenna port used for transmission.

Details will be described below with reference to FIG. 27.

Figure 27:
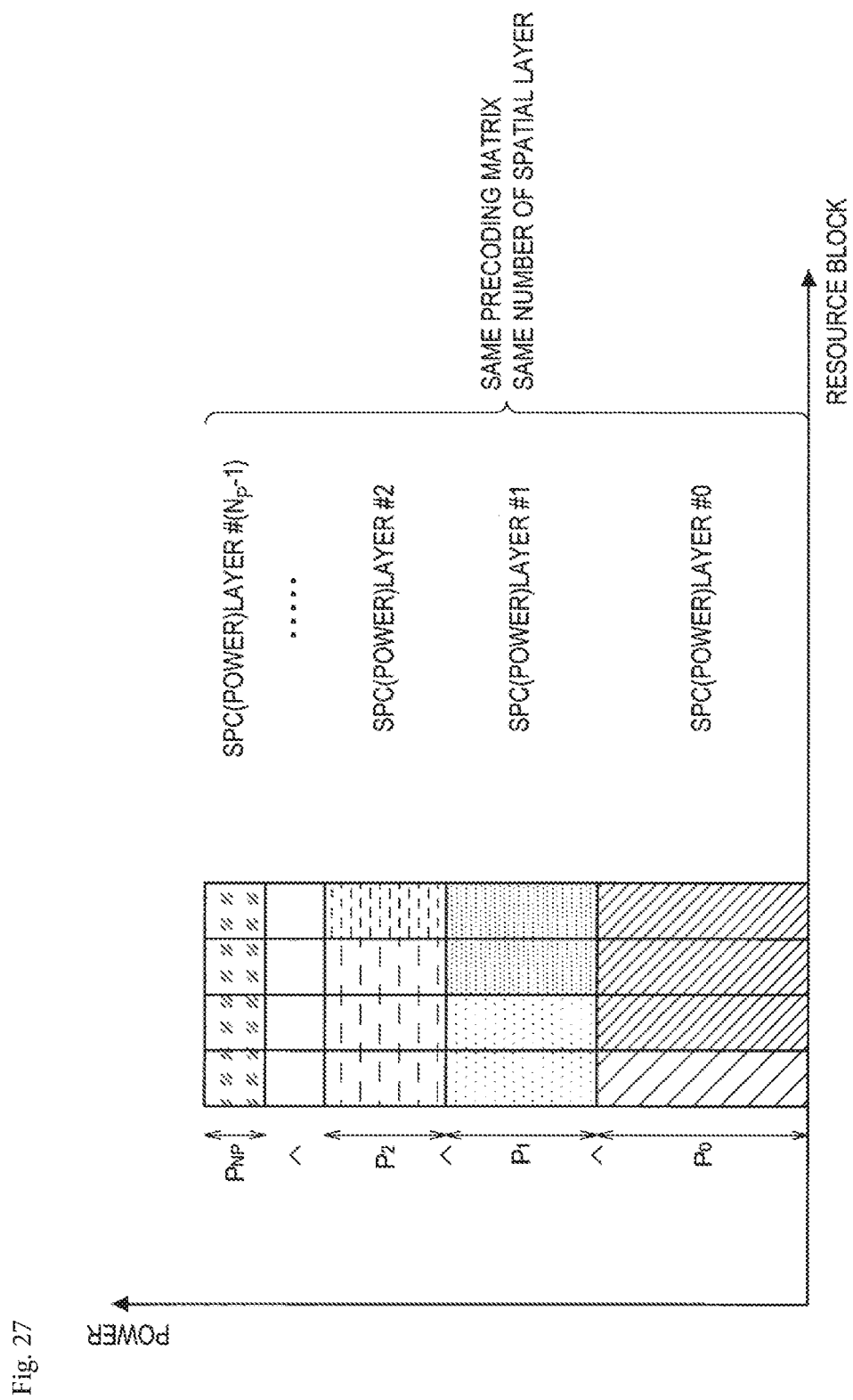
FIG. 27 is a diagram for describing an allocation example of transmission parameters according to the present embodiment.

FIG. 27 is a diagram for describing an allocation example of transmission parameters according to the present embodiment. The horizontal axis represents a resource block. The vertical axis represents a power level. The power level becomes higher as a power layer having a lower index. It is assumed that a difference of colors (hatching) of power layers indicates a difference of allocated users. In the example illustrated in FIG. 27, the same precoding matrix is applied to all power layers. In addition, the same number of spatial layers is applied to all power layers. Note that, the allocation example of the transmission parameters illustrated in FIG. 27 corresponds to the specific example of first sharing described above.

(Other Restrictions)

The number of power layers or the number of users multiplexed by SPC using the same frequency resources and the same time resources is preferably 2. In this manner, it is possible to simplify an item and a combination to be considered when the allocation unit 151 applies the above-described restrictions and it is possible to reduce a scheduling processing load of the base station 100 in downlink.

<4.3. Format Example 1 of New DCI>

In the system 1 according to the present embodiment, a format of new DCI is introduced. Specifically, a format of DCI including the following new IE is introduced.

Cancellation Indicator
: a flag indicating whether it is necessary to perform interference cancellation Power Layer Index
: a number of a power layer that is allocated Also, when the number of power layers is 2, only a cancellation indicator may be included in DCI. When the number of power layers is 3 or more, only a power layer index may be included in DCI.

The terminal apparatus 200 decodes the self-addressed signal with reference to such IEs. For example, the terminal apparatus 200 determines whether it is necessary to perform interference cancellation with reference to the cancellation indicator. Next, the terminal apparatus 200 knows an index of a power layer with reference to a power layer index. Therefore, the terminal apparatus 200 determines whether any transmission parameter or the shared transmission parameter is allocated to it according to whether an index of a power layer indicates the lowest power level. In addition, the terminal apparatus 200 determines the transmission parameter allocated to the terminal apparatus 200 of an interference cancellation target. For example, as the first sharing described above, the terminal apparatus 200 determines that the same transmission parameter as itself is allocated to the terminal apparatus 200 of the interference cancellation target. In addition, as the second sharing described above, the terminal apparatus 200 determines that the predetermined transmission parameters are allocated to the terminal apparatus 200 of the interference cancellation target. In this manner, the terminal apparatus 200 can acquire the transmission parameters allocated to the terminal apparatus 200 of the interference cancellation target, and accordingly can appropriately decode the self-addressed signal.

The following Tables 11 to 18 show an exemplary IE of a format of new DCI including a cancellation indicator and a power layer index.

TABLE 11

IE of DCI Format 1_NOMA

| IE Type | Supplement |
| --- | --- |
| Carrier Indicator | Relates to Carrier Aggregation |
| Resource Allocation Header | Relates to Resource Allocation Type |
| Resource Block Allocation | Relates to allocation of RB |
| Modulation and Coding Scheme (MCS) | Relates to Modulation Order, Coding Rate, Transport Block Size (TBS) |
| HARQ Process Number | Relates to HARQ |
| New Data Indicator (NDI) | Relates to indication of new or retransmission |
| Redundancy Version (RV) | Relates to FEC and Rate Matching |
| TPC Command for PUCCH | Relates to Uplink TPC |
| Downlink Assignment Index | TDD Only |
| Cancellation Indicator | Relates to necessity for interference cancellation |
| Power Layer Index | Relates to allocated power layer |

TABLE 12

IE of DCI Format 1A_NOMA

| IE Type | Supplement |
| --- | --- |
| Carrier Indicator | Relates to Carrier Aggregation |
| Format 0/Format 1A Flag | Relates to indication of DCI Format |
| Localized/Distributed VRB Assignment Flag | Relates to allocation of RB |
| Resource Block Allocation | Relates to allocation of RB |
| MCS | Relates to Modulation Order, Coding Rate, and TBS |
| HARQ Process Number | Relates to HARQ |
| NDI | Relates to indication of new or retransmission |
| RV | Relates to FEC and Rate Matching |
| TPC Command for PUCCH | Relates to Uplink TPC |
| Downlink Assignment Index | TDD Only |
| Sounding Reference Signal (SRS) Request | Relates to SRS |
| Cancellation Indicator | Relates to necessity for interference cancellation |
| Power Layer Index | Relates to allocated power layer |

TABLE 13

IE of DCI Format 1B_NOMA

| IE Type | Supplement |
| --- | --- |
| Carrier Indicator | Relates to Carrier Aggregation |
| Localized/Distributed VRB Assignment Flag | Relates to allocation of RB |

TABLE 13-continued

IE of DCI Format 1B_NOMA

| IE Type | Supplement |
|---|---|
| Resource Block Allocation | Relates to allocation of RB |
| MCS | Relates to Modulation Order, Coding Rate, and TBS |
| HARQ Process Number | Relates to HARQ |
| NDI | Relates to indication of new or retransmission |
| RV | Relates to FEC and Rate Matching |
| TPC Command for PUCCH | Relates to Uplink TPC |
| Downlink Assignment Index | TDD Only |
| Transmitted PMI (TPMI) Precoding Information | Relates to Precoding |
| PMI Confirmation for Precoding | Relates to Precoding |
| Cancellation Indicator | Relates to necessity for interference cancellation |
| Power Layer Index | Relates to allocated power layer |

TABLE 14

IE of DCI Format 1C_NOMA

| IE Type | Supplement |
|---|---|
| Gap Value | Relates to allocation of RB |
| Resource Block Allocation | Relates to allocation of RB |
| Transport Block Size | Relates to TBS |
| Cancellation Indicator | Relates to necessity for interference cancellation |
| Power Layer Index | Relates to allocated power layer |

TABLE 15

IE of DCI Format 1D_NOMA

| IE Type | Supplement |
|---|---|
| Carrier Indicator | Relates to Carrier Aggregation |
| Localized/Distributed VRB Assignment Flag | Relates to allocation of RB |
| Resource Block Allocation | Relates to allocation of RB |
| MCS | Relates to Modulation Order, Coding Rate, and TBS |
| HARQ Process Number | Relates to HARQ |
| NDI | Relates to indication of new or retransmission |
| RV | Relates to FEC and Rate Matching |
| TPC Command for PUCCH | Relates to Uplink TPC |
| Downlink Assignment Index | TDD Only |
| TPMI Precoding Information | Relates to Precoding |
| Downlink Power Offset | Relates to Power Offset when MU-MIMO is used |
| Cancellation Indicator | Relates to necessity for interference cancellation |
| Power Layer Index | Relates to allocated power layer |

TABLE 16

IE of DCI Format 2_NOMA and DCI Format 2A_NOMA

| IE Type | | Supplement |
|---|---|---|
| Carrier Indicator | | Relates to Carrier Aggregation |
| Resource Allocation Header | | Relates to allocation of RB |
| Resource Block Allocation | | Relates to allocation of RB |
| TPC Command for PUCCH | | Relates to Uplink TPC |
| Downlink Assignment Index | | TDD Only |
| HARQ Process Number | | Relates to HARQ |
| Transport Block to Codeword Swap Flag | | Relates to indication of relation between Transport Block 1/2 and Codeword 0/1 |
| Transport Block 1 | MCS | Relates to Modulation Order, Coding Rate, and TBS |
| | NDI | Relates to indication of new or retransmission |
| | RV | Relates to FEC and Rate Matching |
| Transport Block 2 | MCS | Relates to Modulation Order, Coding Rate, and TBS |
| | NDI | Relates to indication of new or retransmission |
| | RV | Relates to FEC and Rate Matching |
| Precoding Information | | Relates to Precoding |
| Cancellation Indicator | | Relates to necessity for interference cancellation |
| Power Layer Index | | Relates to allocated power layer |

TABLE 17

IE of DCI Format 2B_NOMA

| IE Type | | Supplement |
|---|---|---|
| Carrier Indicator | | Relates to Carrier Aggregation |
| Resource Allocation Header | | Relates to allocation of RB |
| Resource Block Allocation | | Relates to allocation of RB |
| TPC Command for PUCCH | | Relates to Uplink TPC |
| Downlink Assignment Index | | TDD Only |
| HARQ Process Number | | Relates to HARQ |
| Scrambling Identity | | Relates to antenna port of MU-MIMO |
| SRS Request | | Relates to SRS |
| Transport Block 1 | MCS | Relates to Modulation Order, Coding Rate, and TBS |
| | NDI | Relates to indication of new or retransmission |
| | RV | Relates to FEC and Rate Matching |
| Transport Block 2 | MCS | Relates to Modulation Order, Coding Rate, and TBS |
| | NDI | Relates to indication of new or retransmission |
| | RV | Relates to FEC and Rate Matching |
| Cancellation Indicator | | Relates to necessity for interference cancellation |
| Power Layer Index | | Relates to allocated power layer |

TABLE 18

IE of DCI Format 2C_NOMA

| IE Type | | Supplement |
|---|---|---|
| Carrier Indicator | | Relates to Carrier Aggregation |
| Resource Allocation Header | | Relates to allocation of RB |
| Resource Block Allocation | | Relates to allocation of RB |
| TPC Command for PUCCH | | Relates to Uplink TPC |
| Downlink Assignment Index | | TDD Only |
| HARQ Process Number | | Relates to HARQ |
| Antenna Port, Scrambling Identity, and Layers | | Relates to antenna port and spatial layer of MU-MIMO |
| SRS Request | | Relates to SRS |
| Transport Block 1 | MCS | Relates to Modulation Order, Coding Rate, and TBS |

TABLE 18-continued

IE of DCI Format 2C_NOMA

| IE Type | | Supplement |
|---|---|---|
| | NDI | Relates to indication of new or retransmission |
| | RV | Relates to FEC and Rate Matching |
| Transport Block 2 | MCS | Relates to Modulation Order, Coding Rate, and TBS |
| | NDI | Relates to indication of new or retransmission |
| | RV | Relates to FEC and Rate Matching |
| Cancellation Indicator | | Relates to necessity for interference cancellation |
| Power Layer Index | | Relates to allocated power layer |

Note that, in Tables 11 to 18, parts added from legacy format DCI are shaded.

Here, interference cancellation is unnecessary for the terminal apparatus 200 having the highest allocated power level, and interference cancellation is necessary for the other terminal apparatus 200. Therefore, according to whether interference cancellation is necessary, different DCI may be used.

As for the base station 100 side, for example, for some of the terminal apparatuses 200 to which the shared transmission parameters are allocated, the communication control unit 153 may use control information of a format different from that of the other terminal apparatuses 200. More specifically, the communication control unit 153 uses control information of a format corresponding to the power level allocated to the terminal apparatus 200. Specifically, the communication control unit 153 uses control information of a format including information indicating that the interference cancellation process is to be performed as exemplified in Tables 11 to 18 for the terminal apparatus 200 whose allocated power level is not the highest. On the other hand, the communication control unit 153 uses control information of a legacy format including no information indicating that the interference cancellation process is to be performed as exemplified in Tables 1 to 8 for the terminal apparatus 200 having the highest allocated power level. Here, the information indicating that the interference cancellation process is to be performed refers to at least one of a cancellation indicator and a power layer index. According to such control, with respect to the terminal apparatus 200 having the highest allocated power level, it is possible to reduce an amount of DCI data.

As for the terminal apparatus 200, the determination unit 241 performs determination based on a format of control information. For example, the determination unit 241 controls whether the interference cancellation process is performed based on a format of DCI. Specifically, the communication control unit 243 performs the interference cancellation process when the information indicating that the interference cancellation process is to be performed is included in control information as exemplified in Tables 11 to 18. On the other hand, the communication control unit 243 does not perform the interference cancellation process when control information is legacy format DCI including no information indicating that the interference cancellation process is to be performed as shown in Tables 1 to 8. In addition, the determination unit 241 may perform determination based on a power level of a self-allocated data channel. For example, the determination unit 241 determines that no interference cancellation process is performed if the power level of the self-allocated data channel is the highest among the other terminal apparatuses 200 to be multiplexed, and determines that the interference cancellation process is performed if the power level of the self-allocated data channel is not the highest among the other terminal apparatuses 200.

A reception process in the terminal apparatus 200 will be described below with reference to FIG. 28.

Figure 28:
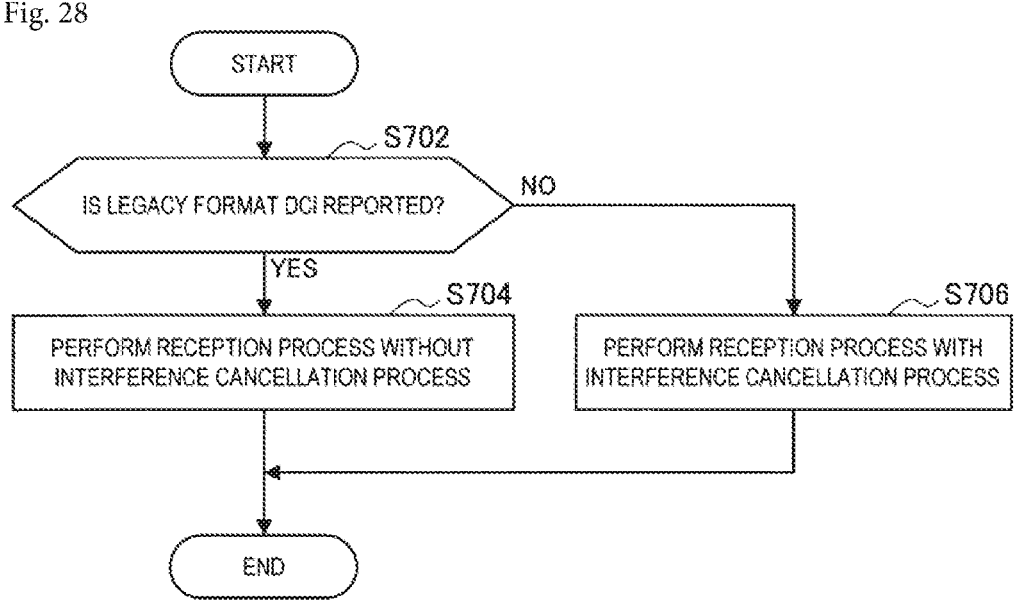
FIG. 28 is a flowchart illustrating an exemplary flow of a reception process performed in a terminal apparatus according to the present embodiment.

FIG. 28 is a flowchart illustrating an exemplary flow of a reception process performed in the terminal apparatus 200 according to the present embodiment. As illustrated in FIG. 28, first, the determination unit 241 determines whether legacy format DCI is reported (Step S702). When it is determined that the legacy format DCI is reported (Yes in Step S702), the communication control unit 243 performs the reception process without the interference cancellation process (Step S704). On the other hand, when it is determined that no legacy format DCI is reported (No in Step S702), the communication control unit 243 performs the reception process with the interference cancellation process (Step S706).

<4.4. Format Example 2 of New DCI>

In the above embodiment, by sharing the transmission parameters, a load of the interference cancellation process and a communication load for transmitting and receiving DCI on the terminal apparatus 200 side are reduced. Here, some of the transmission parameters may be shared and the other thereof may not be shared. With respect to the non-shared transmission parameters, transmission parameters of the other terminal apparatus 200 (that is, having a higher allocated power level than that of the target terminal apparatus 200) serving as an interference cancellation target are preferably reported to each of the terminal apparatuses 200 multiplexed using SPC. Therefore, it is possible to mitigate restrictions of the transmission parameters and increase usage efficiency of radio resources. As a result, it is possible to increase throughput of each user and system throughput.

Here, interference cancellation is unnecessary for the terminal apparatus 200 having the highest allocated power level and interference cancellation is necessary for the other terminal apparatus 200. Therefore, according to whether interference cancellation is necessary, legacy format DCI and new format DCI including information indicating transmission parameters of the terminal apparatus 200 of the interference cancellation target may be properly used similarly to the "format example 1 of new DCI" described above.

Figure 29:
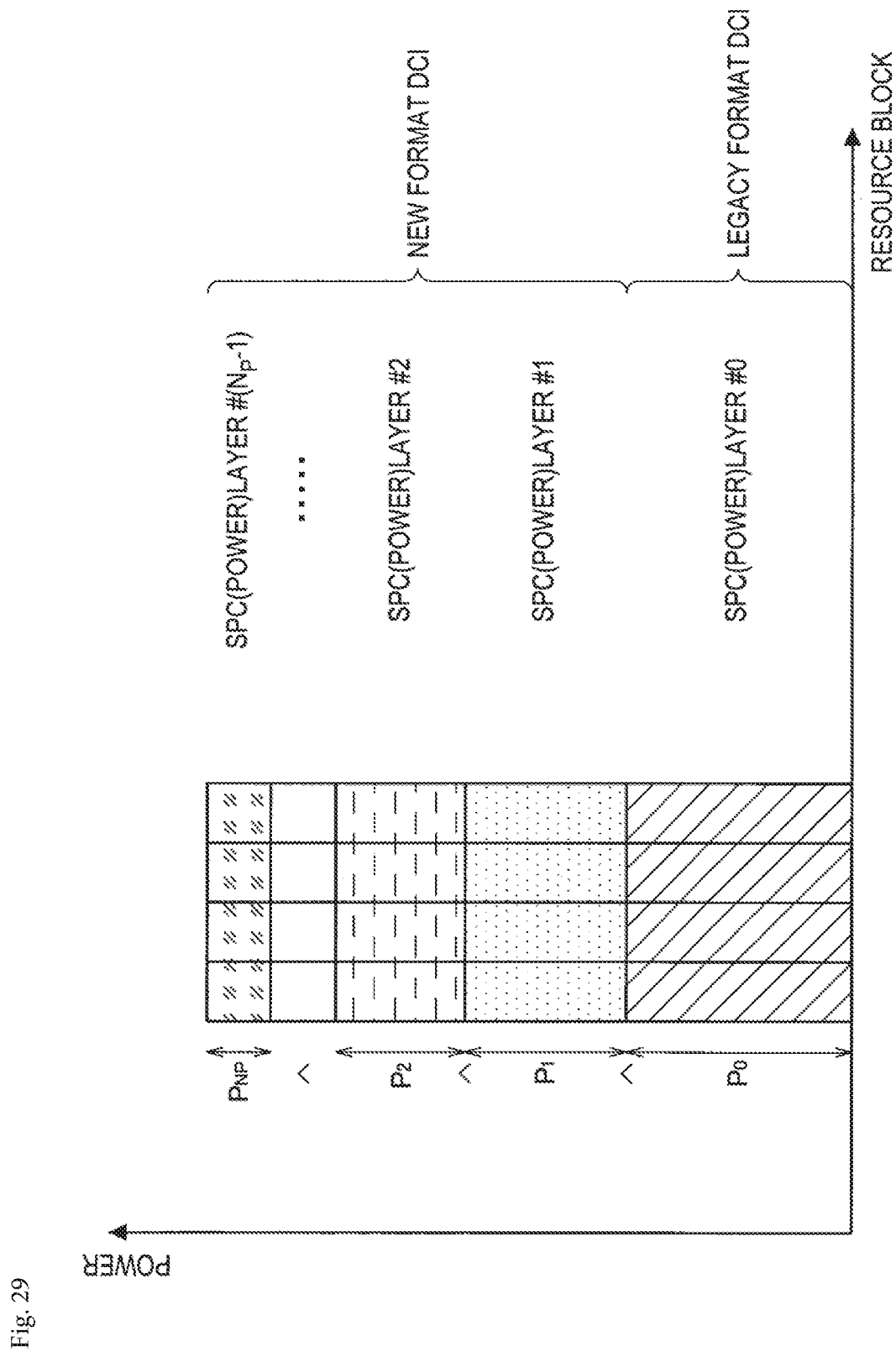
FIG. 29 is a diagram for describing a proper use example of a format of DCI according to the present embodiment.

FIG. 29 is a diagram for describing a proper use example of a format of DCI according to the present embodiment. The horizontal axis represents a resource block. The vertical axis represents a power level. The power level becomes higher as a power layer having a lower index. It is assumed that a difference of colors (hatching) of power layers indicates a difference of allocated users. In the example illustrated in FIG. 29, control information of a legacy format including no transmission parameter of the other terminal apparatus 200 is used for the terminal apparatus 200 configured to transmit and receive a signal using a power layer whose allocated power level is the highest. On the other hand, control information of a new format including information indicating transmission parameters of the other terminal apparatus 200 of an interference cancellation target is used for the terminal apparatus 200 configured to transmit and receive a signal using a power layer whose allocated power level is not the highest.

According to such a proper use, a legacy device capable of reading only legacy format DCI and a device capable of reading new format DCI can coexist in the system 1 configured to perform multiplexing using SPC.

When information indicating transmission parameters of the other terminal apparatus 200 of an interference cancellation target is included in DCI, in order to decrease a size of DCI, the maximum number of power layers multiplexed using SPC is preferably small. The number is preferably, for example, 2.

The following Tables 19 to 26 show an exemplary IE of a format of new DCI including information indicating transmission parameters of the other terminal apparatus 200 of an interference cancellation target.

TABLE 19

| IE of DCI Format 1_NOMA_Diff | |
| --- | --- |
| IE Type | Supplement |
| Carrier Indicator | Relates to Carrier Aggregation |
| Resource Allocation Header | Relates to Resource Allocation Type |
| Resource Block Allocation | Relates to allocation of RB |
| Modulation and Coding Scheme (MCS) | Relates to Modulation Order, Coding Rate, Transport Block Size (TBS) |
| HARQ Process Number | Relates to HARQ |
| New Data Indicator (NDI) | Relates to indication of new or retransmission |
| Redundancy Version (RV) | Relates to FEC and Rate Matching |
| TPC Command for PUCCH | Relates to Uplink TPC |
| Downlink Assignment Index | TDD Only |
| Transport Block to Be Cancelled MCS(_Diff) | Relates to (difference of) Modulation Order, Coding Rate, and Transport Block Size (TBS) of signal in which interference is to be canceled |
| NDI | Relates to indication of new or retransmission of signal in which interference is to be canceled |
| RV | Relates to FEC and Rate Matching of signal in which interference is to be canceled |
| Power Layer Index | Relates to allocated power layer |

TABLE 20

| IE of DCI Format 1A_NOMA_Diff | |
| --- | --- |
| IE Type | Supplement |
| Carrier Indicator | Relates to Carrier Aggregation |
| Format 0/Format 1A Flag | Relates to indication of DCI Format |
| Localized/Distributed VRB Assignment Flag | Relates to allocation of RB |
| Resource Block Allocation | Relates to allocation of RB |
| MCS | Relates to Modulation Order, Coding Rate, and TBS |
| HARQ Process Number | Relates to HARQ |
| NDI | Relates to indication of new or retransmission |
| RV | Relates to FEC and Rate Matching |
| TPC Command for PUCCH | Relates to Uplink TPC |
| Downlink Assignment Index | TDD Only |
| Sounding Reference Signal (SRS) Request | Relates to SRS |

TABLE 20-continued

| IE of DCI Format 1A_NOMA_Diff | |
| --- | --- |
| IE Type | Supplement |
| Transport Block to Be Cancelled MCS(_Diff) | Relates to (difference of) Modulation Order, Coding Rate, and Transport Block Size (TBS) of signal in which interference is to be canceled |
| NDI | Relates to indication of new or retransmission of signal in which interference is to be canceled |
| RV | Relates to FEC and Rate Matching of signal in which interference is to be canceled |
| Power Layer Index | Relates to allocated power layer |

TABLE 21

| IE of DCI Format 1B_NOMA_Diff | |
| --- | --- |
| IE Type | Supplement |
| Carrier Indicator | Relates to Carrier Aggregation |
| Localized/Distributed VRB Assignment Flag | Relates to allocation of RB |
| Resource Block Allocation | Relates to allocation of RB |
| MCS | Relates to Modulation Order, Coding Rate, and TBS |
| HARQ Process Number | Relates to HARQ |
| NDI | Relates to indication of new or retransmission |
| RV | Relates to FEC and Rate Matching |
| TPC Command for PUCCH | Relates to Uplink TPC |
| Downlink Assignment Index | TDD Only |
| Transmitted PMI (TPMI) Precoding Information | Relates to Precoding |
| PMI Confirmation for Precoding | Relates to Precoding |
| Transport Block to Be Cancelled MCS(_Diff) | Relates to (difference of) Modulation Order, Coding Rate, and Transport Block Size (TBS) of signal in which interference is to be canceled |
| NDI | Relates to indication of new or retransmission of signal in which interference is to be canceled |
| RV | Relates to FEC and Rate Matching of signal in which interference is to be canceled |
| Power Layer Index | Relates to allocated power layer |

TABLE 22

IE of DCI Format 1C_NOMA_Diff

| IE Type | | Supplement |
|---|---|---|
| Gap Value | | Relates to allocation of RB |
| Resource Block Allocation | | Relates to allocation of RB |
| Transport Block Size | | Relates to TBS |
| Transport Block to Be Cancelled | MCS(_Diff) | Relates to (difference of) Modulation Order, Coding Rate, and Transport Block Size (TBS) of signal in which interference is to be canceled |
| | NDI | Relates to indication of new or retransmission of signal in which interference is to be canceled |
| | RV | Relates to FEC and Rate Matching of signal in which interference is to be canceled |
| Power Layer Index | | Relates to allocated power layer |

TABLE 23

IE of DCI Format 1D_NOMA_Diff

| IE Type | | Supplement |
|---|---|---|
| Carrier Indicator | | Relates to Carrier Aggregation |
| Localized/Distributed VRB Assignment Flag | | Relates to allocation of RB |
| Resource Block Allocation | | Relates to allocation of RB |
| MCS | | Relates to Modulation Order, Coding Rate, and TBS |
| HARQ Process Number | | Relates to HARQ |
| NDI | | Relates to indication of new or retransmission |
| RV | | Relates to FEC and Rate Matching |
| TPC Command for PUCCH | | Relates to Uplink TPC |
| Downlink Assignment Index | | TDD Only |
| TPMI Precoding Information | | Relates to Precoding |
| Downlink Power Offset | | Relates to Power Offset when MU-MIMO is used |
| Transport Block to Be Cancelled | MCS(_Diff) | Relates to (difference of) Modulation Order, Coding Rate, and Transport Block Size (TBS) of signal in which interference is to be canceled |
| | NDI | Relates to indication of new or retransmission of signal in which interference is to be canceled |
| | RV | Relates to FEC and Rate Matching of signal in which interference is to be canceled |
| Power Layer Index | | Relates to allocated power layer |

TABLE 24

IE of DCI Format 2_NOMA_Diff and DCI Format 2A_NOMA_Diff

| IE Type | | Supplement |
|---|---|---|
| Carrier Indicator | | Relates to Carrier Aggregation |
| Resource Allocation Header | | Relates to allocation of RB |
| Resource Block Allocation | | Relates to allocation of RB |
| TPC Command for PUCCH | | Relates to Uplink TPC |
| Downlink Assignment Index | | TDD Only |
| HARQ Process Number | | Relates to HARQ |
| Transport Block to Codeword Swap Flag | | Relates to indication between Transport Block 1/2 and Codeword 0/1 |
| Transport Block 1 | MCS | Relates to Modulation Order, Coding Rate, and TBS |
| | NDI | Relates to indication of new or retransmission |
| | RV | Relates to FEC and Rate Matching |
| Transport Block 2 | MCS | Relates to Modulation Order, Coding Rate, and TBS |
| | NDI | Relates to indication of new or retransmission |
| | RV | Relates to FEC and Rate Matching |
| Precoding Information | | Relates to Precoding |
| Transport Block 1 to Be Cancelled | MCS(_Diff) | Relates to (difference of) Modulation Order, Coding Rate, and Transport Block Size (TBS) of signal in which interference is to be canceled |
| | NDI | Relates to indication of new or retransmission of signal in which interference is to be canceled |
| | RV | Relates to FEC and Rate Matching of signal in which interference is to be canceled |
| Transport Block 2 to Be Cancelled | MCS(_Diff) | Relates to (difference of) Modulation Order, Coding Rate, and Transport Block Size (TBS) of signal in which interference is to be canceled |
| | NDI | Relates to indication of new or retransmission of signal in which interference is to be canceled |
| | RV | Relates to FEC and Rate Matching of signal in which interference is to be canceled |
| Power Layer Index | | Relates to allocated power layer |

TABLE 25

IE of DCI Format 2B_NOMA_Diff

| IE Type | | Supplement |
|---|---|---|
| Carrie Indicator | | Relates to Carrier Aggregation |
| Resource Allocation Header | | Relates to allocation of RB |
| Resource Block Allocation | | Relates to allocation of RB |
| TPC Command for PUCCH | | Relates to Uplink TPC |
| Downlink Assignment Index | | TDD Only |
| HARQ Process Number | | Relates to HARQ |
| Scrambling Identity | | Relates to antenna port of MU-MIMO |
| SRS Request | | Relates to SRS |
| Transport Block 1 | MCS | Relates to Modulation Order, Coding Rate, and TBS |
| | NDI | Relates to indication of new or retransmission |
| | RV | Relates to FEC and Rate Matching |
| Transport Block 2 | MCS | Relates to Modulation Order, Coding Rate, and TBS |
| | NDI | Relates to indication of new or retransmission |
| | RV | Relates to FEC and Rate Matching |
| Transport Block 1 to Be Cancelled | MCS(_Diff) | Relates to (difference of) Modulation Order, Coding Rate, and Transport Block Size (TBS) of signal in which interference is to be canceled |

TABLE 25-continued

IE of DCI Format 2B_NOMA_Diff

| IE Type | | Supplement |
|---|---|---|
| | NDI | Relates to indication of new or retransmission of signal in which interference is to be canceled |
| | RV | Relates to FEC and Rate Matching of signal in which interference is to be canceled |
| Transport Block 2 to Be Cancelled | MCS(_Diff) | Relates to (difference of) Modulation Order, Coding Rate, and Transport Block Size (TBS) of signal in which interference is to be canceled |
| | NDI | Relates to indication of new or retransmission of signal in which interference is to be canceled |
| | RV | Relates to FEC and Rate Matching of signal in which interference is to be canceled |
| Power Layer Index | | Relates to allocated power layer |

TABLE 26

IE of DCI Format 2C_NOMA_Diff

| IE Type | | Supplement |
|---|---|---|
| Carrier Indicator | | Relates to Carrier Aggregation |
| Resource Allocation Header | | Relates to allocation of RB |
| Resource Block Allocation | | Relates to allocation of RB |
| TPC Command for PUCCH | | Relates to Uplink TPC |
| Downlink Assignment Index | | TDD Only |
| HARQ Process Number | | Relates to HARQ |
| Antenna Port, Scrambling Identity, and Layers | | Relates to antenna port and spatial layer of MU-MIMO |
| SRS Request | | Relates to SRS |
| Transport Block 1 | MCS | Relates to Modulation Order, Coding Rate, and TBS |
| | NDI | Relates to indication of new or retransmission |
| | RV | Relates to FEC and Rate Matching |
| Transport Block 2 | MCS | Relates to Modulation Order, Coding Rate, and TBS |
| | NDI | Relates to indication of new or retransmission |
| | RV | Relates to FEC and Rate Matching |
| Transport Block 1 to Be Cancelled | MCS(_Diff) | Relates to (difference of) Modulation Order, Coding Rate, and Transport Block Size (TBS) of signal in which interference is to be canceled |
| | NDI | Relates to indication of new or retransmission of signal in which interference is to be canceled |
| | RV | Relates to FEC and Rate Matching of signal in which interference is to be canceled |
| Transport Block 2 to Be Cancelled | MCS(_Diff) | Relates to (difference of) Modulation Order, Coding Rate, and Transport Block Size (TBS) of signal in which interference is to be canceled |
| | NDI | Relates to indication of new or retransmission of signal in which interference is to be canceled |
| | RV | Relates to FEC and Rate Matching of signal in which interference is to be canceled |
| Power Layer Index | | Relates to allocated power layer |

Note that, in Tables 19 to 26, parts added from legacy format DCI are shaded.

Here, an MCS and a modulation order are preferably reported in the form of a difference with respect to an MCS and a modulation order applied to the self-addressed signal. Accordingly, it is possible to reduce a size (that is, the number of bits used for reports) of DCI when the MCS and the modulation order are reported. Such a report example will be described with reference to FIG. 30.

Figure 30:
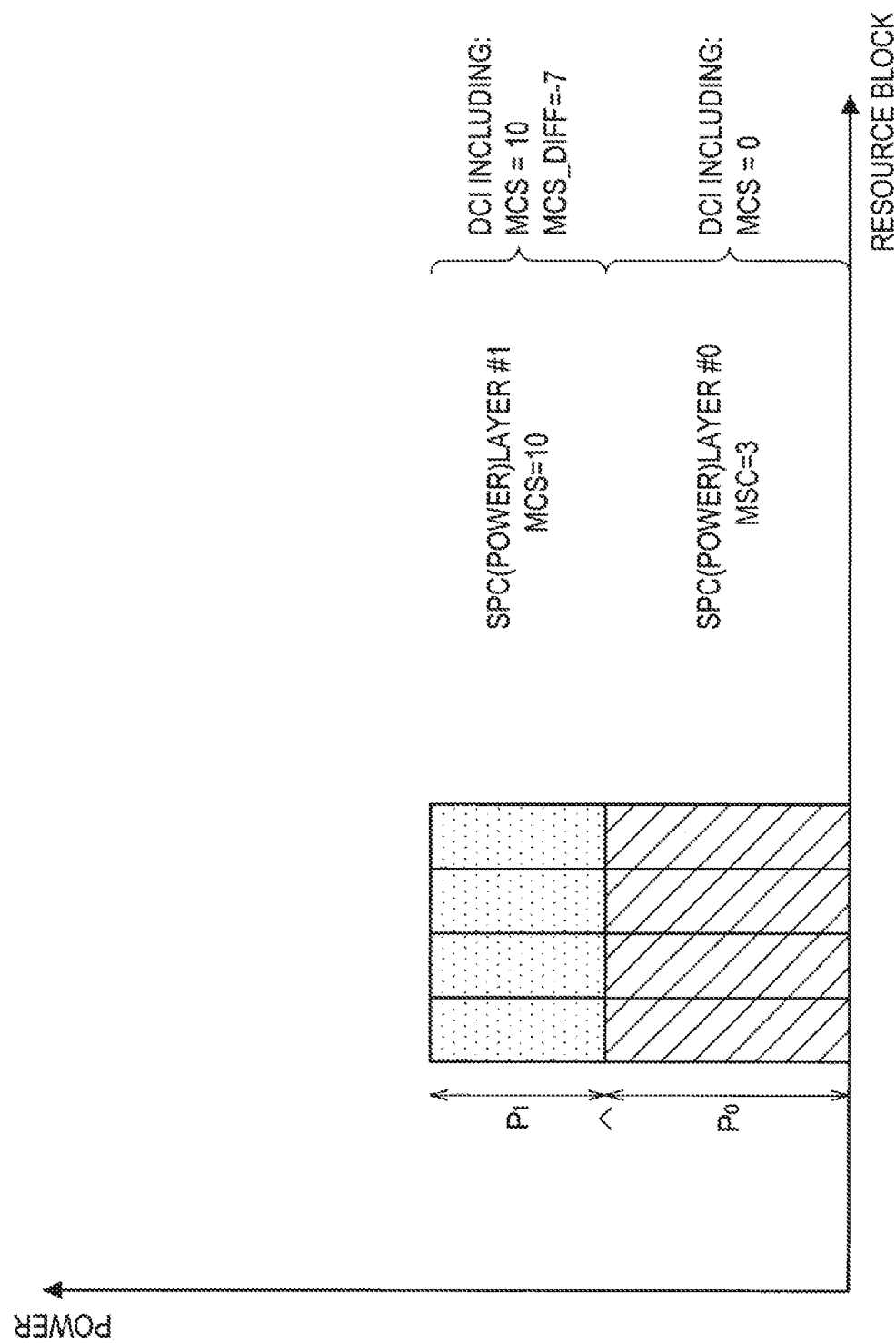
FIG. 30 is a diagram for describing a report example of transmission parameters according to the present embodiment.

FIG. 30 is a diagram for describing a report example of transmission parameters according to the present embodiment. The horizontal axis represents a resource block. The vertical axis represents a power level. The power level becomes higher as a power layer having a lower index. It is assumed that a difference of colors (hatching) of power layers indicates a difference of allocated users. In the example illustrated in FIG. 30, a self-allocated MCS=0 is reported to the terminal apparatus 200 configured to transmit and receive a signal using a power layer whose allocated power level is the highest. On the other hand, a self-allocated MCS=10 is reported to the terminal apparatus 200 configured to transmit and receive a signal using a power layer whose allocated power level is not the highest, and an MCS difference MCS_Diff=−7 with respect to a power layer #0 serving as an interference cancellation target is reported.

Here, the transmission parameters may be restricted such that a difference has a value of zero or less. That is, the transmission parameters may be restricted such that an MCS or a modulation order of a signal of a power layer having higher power is smaller than an MCS or a modulation order of a signal of a power layer having lower power. When a signal is multiplexed using SPC, a device to which a layer of a high power level is allocated is considered to have a relatively larger path loss (that is, a longer distance) than a device to which a layer of a low power level is allocated. Therefore, it is preferably that a modulation scheme and an encoding rate (that is, with which stable reception can be performed with respect to SNR and SINR) having a low data rate (or frequency efficiency) be applied to the device to which a layer of a high power level is allocated than the device to which a layer of a low power level is allocated. In view of such circumstances and in order to reduce the number of bits of DCI, it is preferable that the difference be restricted to zero or less. In this case, it is possible to remove an impractical combination of an MCS and a modulation order.

Here, Tables 27 and 28 show exemplary ranges of representable difference values of MCS_Diff. Table 27 shows an exemplary range when a representable difference value is restricted to zero or less. Table 28 shows an exemplary range when a representable difference value is restricted to zero or more and zero or less.

TABLE 27

| Index of MCS_Diff | Difference of actual MCS |
|---|---|
| 0 | 0 |
| 1 | −1 |
| 2 | −2 |
| 3 | −3 |
| 4 | −4 |
| 5 | −5 |
| 6 | −6 |
| 7 | −7 |

TABLE 28

| Index of MCS_Diff | Difference of actual MCS |
|---|---|
| 0 | +3 |
| 1 | +2 |
| 2 | +1 |
| 3 | 0 |
| 4 | −1 |
| 5 | −2 |
| 6 | −3 |
| 7 | −4 |

5. Application Example

Techniques according to an embodiment of the present disclosure can be applied to various products. For example, a base station 100 may be realized as any type of evolved Node B (eNB) such as a macro eNB, and a small eNB. A small eNB may be an eNB that covers a cell smaller than a macro cell, such as a pico eNB, micro eNB, or home (femto) eNB. Instead, the base station 100 may be realized as any other types of base stations such as a NodeB and a base transceiver station (BTS). The base station 100 may include a main body (that is also referred to as a base station apparatus) configured to control radio communication, and one or more remote radio heads (RRH) disposed in a different place from the main body. Additionally, various types of terminals to be discussed later may also operate as the base station 100 by temporarily or semi-permanently executing a base station function. Further, at least some components of the base station 100 may be implemented in a base station apparatus or a module for the base station apparatus.

For example, the terminal apparatus 200 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The terminal apparatus 200 may also be realized as a terminal (that is also referred to as a machine type communication (MTC) terminal) that performs machine-to-machine (M2M) communication. Furthermore, at least a part of the constituent elements of the terminal apparatus 200 may be realized in a module (such as an integrated circuit module including a single die) mounted on each of the terminals.

<5-1. Application Examples Regarding Base Station>

First Application Example

Figure 31:
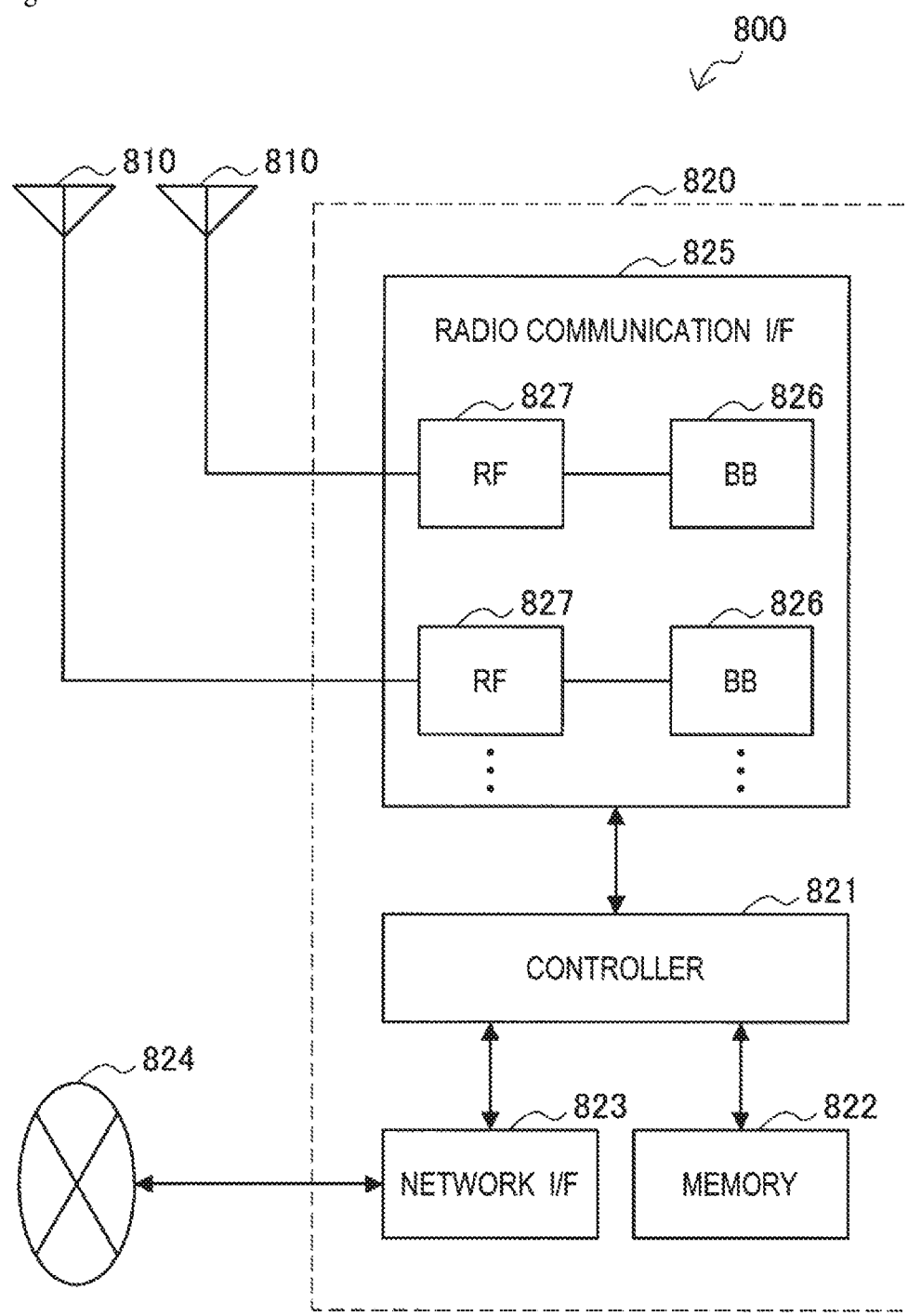
FIG. 31 is a block diagram illustrating a first example of a schematic configuration of an eNB.

FIG. 31 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in an MIMO antenna), and is used for the base station apparatus 820 to transmit and receive radio signals. The eNB 800 may include the multiple antennas 810, as illustrated in FIG. 31. For example, the multiple antennas 810 may be compatible with multiple frequency bands used by the eNB 800. Although FIG. 31 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 31. For example, the multiple BB processors 826 may be compatible with multiple frequency bands used by the eNB 800. The radio communication interface 825 may include the multiple RF circuits 827, as illustrated in FIG. 31. For example, the multiple RF circuits 827 may be compatible with multiple antenna elements. Although FIG. 31 illustrates the example in which the radio communication interface 825 includes the multiple BB processors 826 and the multiple RF circuits 827, the radio communication interface 825 may also include a single BB processor 826 or a single RF circuit 827.

In the eNB 800 illustrated in FIG. 31, the allocation unit 151 and the communication control unit 153 described with reference to FIG. 7 may be implemented in the radio communication interface 825. Alternatively, at least some of such components may be implemented in the controller 821. As an example, the eNB 800 mounts a module including a part (for example, the BB processor 826) of the radio communication interface 825 or all thereof, and/or the controller 821, and the allocation unit 151 and the communication control unit 153 may be implemented in the module. In this case, the module stores a program (in other words, a program causing a processor to perform operations of the allocation unit 151 and the communication control unit 153) causing a processor to function as the allocation unit 151 and the communication control unit 153, and may perform the program.

As another example, a program causing a processor to function as the allocation unit 151 and the communication control unit 153 is installed in the eNB 800, and the radio communication interface 825 (for example, the BB processor 826) and/or the controller 821 may perform the program. As described above, as a device including the allocation unit 151 and the communication control unit 153, the eNB 800, the base station apparatus 820 or the module may be provided, and a program causing a processor to function as the allocation unit 151 and the communication control unit 153 may be provided. In addition, a readable recording medium recording the program may be provided.

In addition, in the eNB 800 illustrated in FIG. 31, the radio communication unit 120 described with reference to FIG. 7 may be implemented in the radio communication interface 825 (for example, the RF circuit 827). In addition, the antenna unit 110 may be implemented in the antenna 810. In addition, the network communication unit 130 may be implemented in the controller 821 and/or the network interface 823. In addition, the storage unit 140 may be implemented in the memory 822.

Second Application Example

Figure 32:
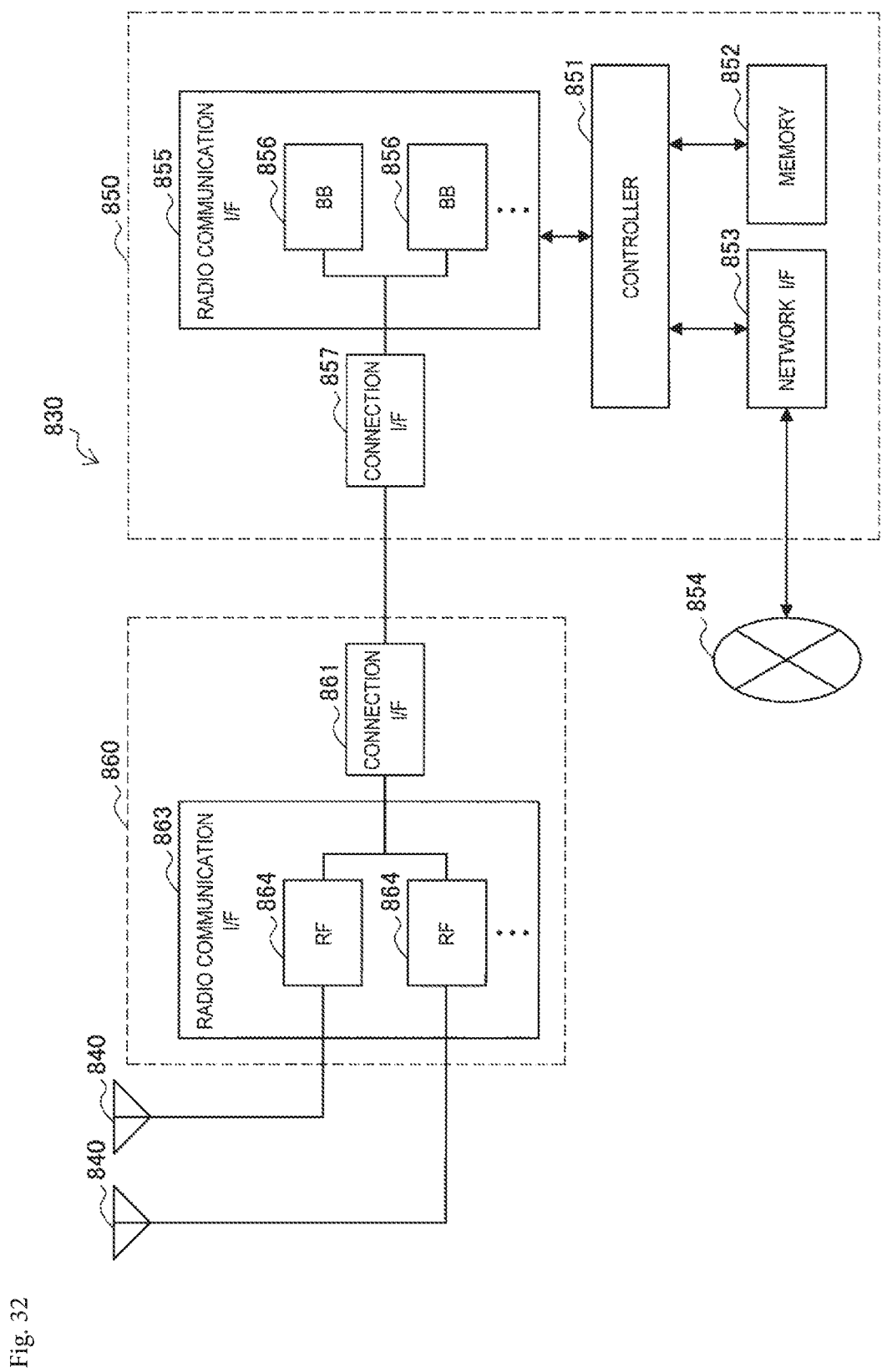
FIG. 32 is a block diagram illustrating a second example of a schematic configuration of an eNB.

FIG. 32 is a block diagram illustrating a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 32. For example, the multiple antennas 840 may be compatible with multiple frequency bands used by the eNB 830. Although FIG. 32 illustrates the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 31.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 31, except the BB processor 856 is connected to the RF circuit 864 of the RRH 860 via the connection interface 857. The radio communication interface 855 may include the multiple BB processors 856, as illustrated in FIG. 32. For example, the multiple BB processors 856 may be compatible with multiple frequency bands used by the eNB 830. Although FIG. 32 illustrates the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 32. For example, the multiple RF circuits 864 may support multiple antenna elements. Although FIG. 32 illustrates the example in which the radio communication interface 863 includes the multiple RF circuits 864, the radio communication interface 863 may also include a single RF circuit 864.

In the eNB 830 illustrated in FIG. 32, the allocation unit 151 and the communication control unit 153 described with reference to FIG. 7 may be implemented in the radio communication interface 855 and/or the radio communication interface 863. Alternatively, at least some of such components may be implemented in the controller 851. As an example, the eNB 830 mounts a module including a part (for example, the BB processor 856) of the radio communication interface 855 or all thereof, and/or the controller 851, and the allocation unit 151 and the communication control unit 153 may be implemented in the module. In this case, the module stores a program (in other words, a program causing a processor to perform operations of the allocation unit 151 and the communication control unit 153) causing a processor to function as the allocation unit 151 and the communication control unit 153, and may perform the program. As another example, a program causing a processor to function as the allocation unit 151 and the communication control unit 153 is installed in the eNB 830, and the radio communication interface 855 (for example, the BB processor 856) and/or the controller 851 may perform the program. As described above, as a device including the allocation unit 151 and the communication control unit 153, the eNB 830, the base station apparatus 850 or the module may be provided. A program causing a processor to function as the allocation unit 151 and the communication control unit 153 may be provided. In addition, a readable recording medium recording the program may be provided.

In addition, in the eNB 830 illustrated in FIG. 32, for example, the radio communication unit 120 described with reference to FIG. 7 may be implemented in the radio communication interface 863 (for example, the RF circuit 864). In addition, the antenna unit 110 may be implemented in the antenna 840. In addition, the network communication unit 130 may be implemented in the controller 851 and/or the network interface 853. In addition, the storage unit 140 may be implemented in the memory 852.

<5.2. Application Examples Regarding Terminal Apparatus>

First Application Example

Figure 33:
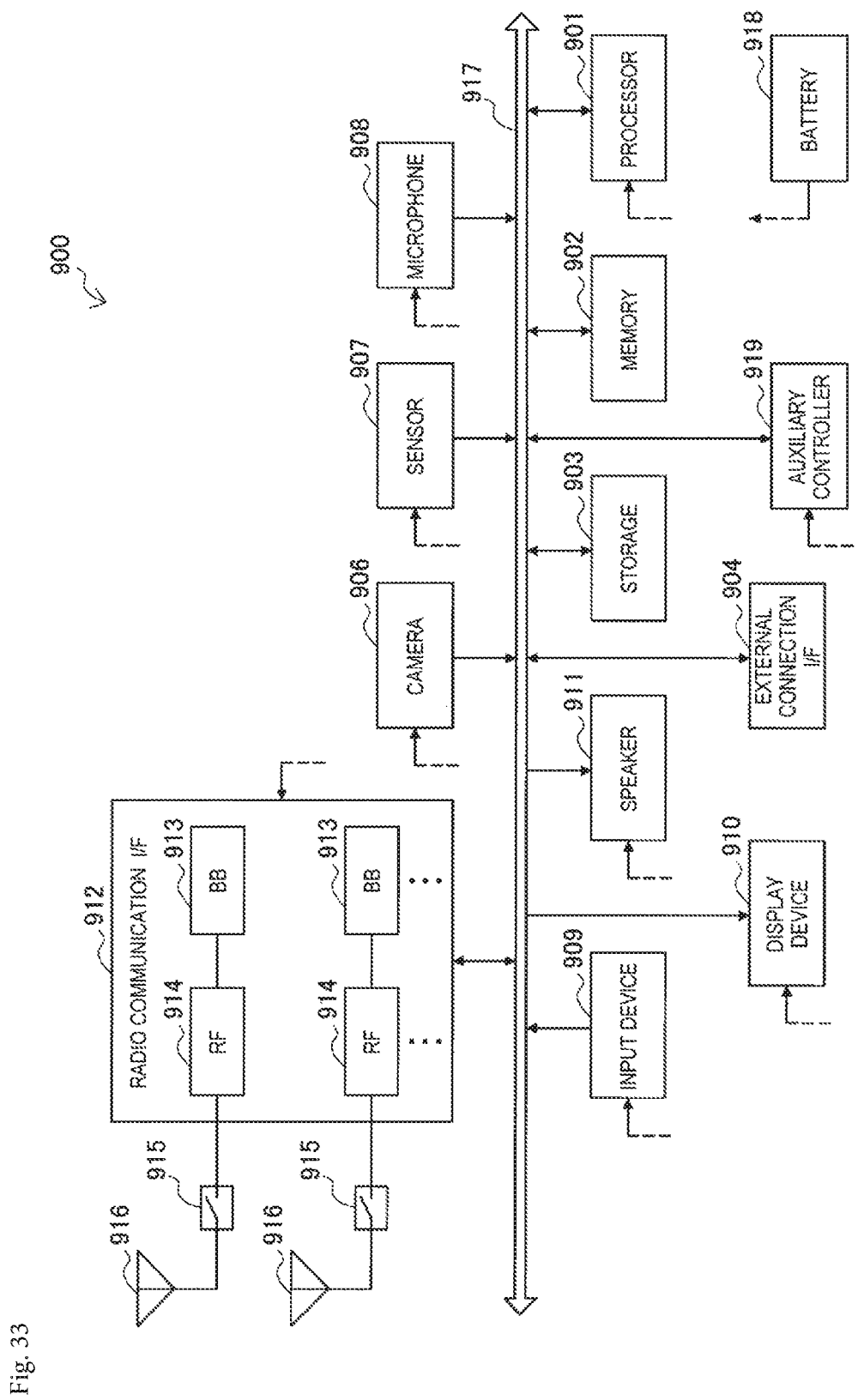
FIG. 33 is a block diagram illustrating an example of a schematic configuration of a smartphone.

FIG. 33 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 33. Although FIG. 33 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 33. Although FIG. 33 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 33 via feeder lines, which are partially shown as dashed lines in the figure. The auxiliary controller 919 operates a minimum necessary function of the smartphone 900, for example, in a sleep mode.

In the smartphone 900 illustrated in FIG. 33, the determination unit 241 and the communication control unit 243 described with reference to FIG. 8 may be implemented in the radio communication interface 912. Alternatively, at least some of such components may be implemented in the processor 901 or the auxiliary controller 919. As an example, the smartphone 900 mounts a module including a part (for example, the BB processor 913) of the radio communication interface 912 or all thereof, the processor 901, and/or the auxiliary controller 919, and the determination unit 241 and the communication control unit 243 may be implemented in the module. In this case, the module stores a program (in other words, a program causing a processor to perform operations of the determination unit 241 and the communication control unit 243) causing a processor to function as the determination unit 241 and the communication control unit 243, and may perform the program.

As another example, a program causing a processor to function as the determination unit 241 and the communication control unit 243 is installed in the smartphone 900, and the radio communication interface 912 (for example, the BB processor 913), the processor 901, and/or the auxiliary controller 919 may perform the program. As described above, as a device including the determination unit 241 and the communication control unit 243, the smartphone 900 or the module may be provided, and a program causing a processor to function as the determination unit 241 and the communication control unit 243 may be provided. In addition, a readable recording medium recording the program may be provided.

In addition, in the smartphone 900 illustrated in FIG. 33, for example, the radio communication unit 220 described with reference to FIG. 8 may be implemented in the radio communication interface 912 (for example, the RF circuit 914). In addition, the antenna unit 210 may be implemented in the antenna 916. In addition, the storage unit 230 may be implemented in the memory 902.

Second Application Example

Figure 34:
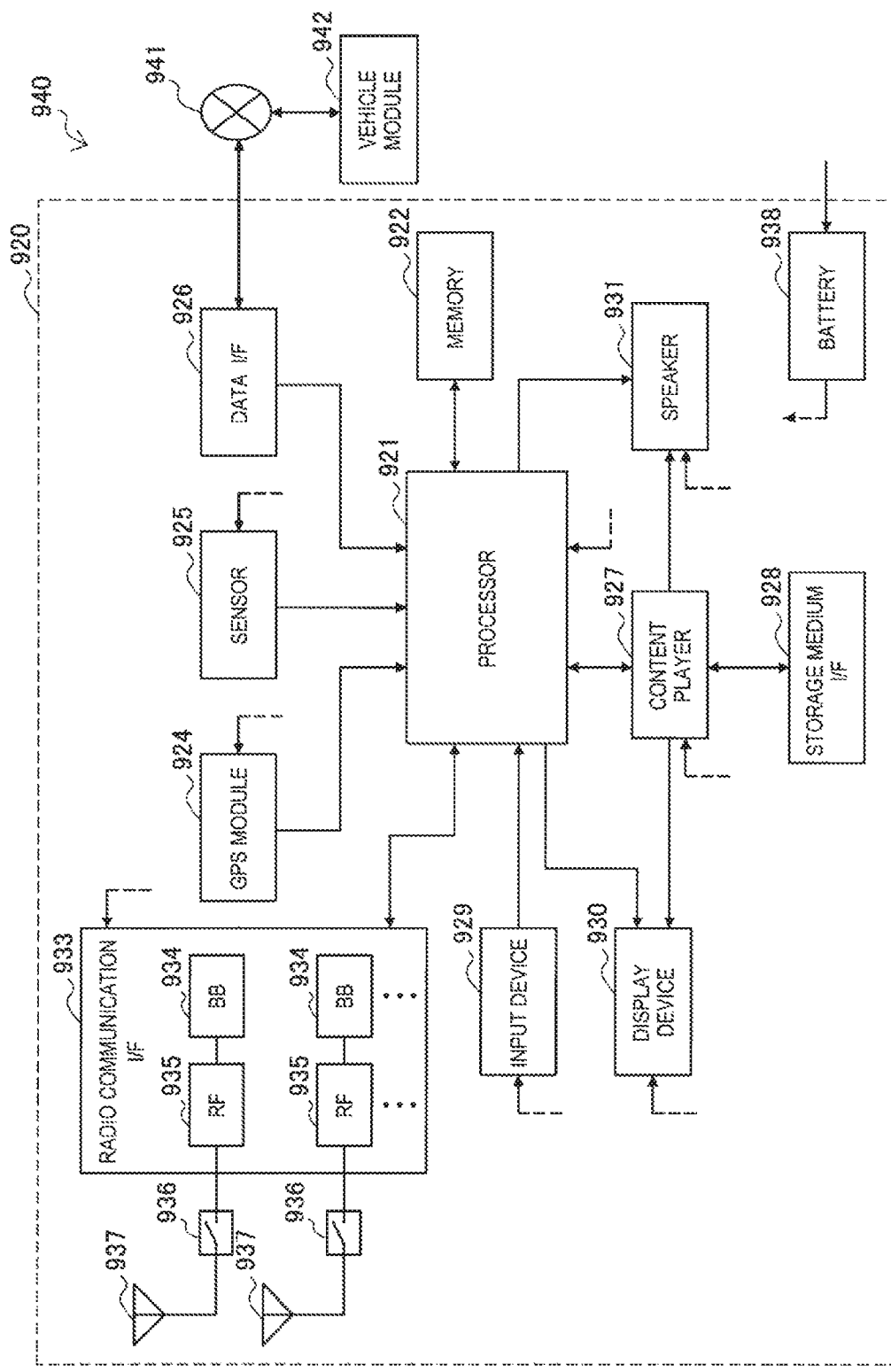
FIG. 34 is a block diagram illustrating an example of a schematic configuration of a car navigation apparatus.

FIG. 34 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 34. Although FIG. 34 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation apparatus 920 may include the multiple antennas 937, as illustrated in FIG. 34. Although FIG. 34 illustrates the example in which the car navigation apparatus 920 includes the multiple antennas 937, the car navigation apparatus 920 may also include a single antenna 937.

Furthermore, the car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 illustrated in FIG. 34 via feeder lines that are partially shown as dashed lines in the figure. The battery 938 accumulates power supplied form the vehicle.

In the car navigation apparatus 920 illustrated in FIG. 34, the determination unit 241 and the communication control unit 243 described with reference to FIG. 8 may be implemented in the radio communication interface 933. Alternatively, at least some of such components may be implemented in the processor 921. As an example, the car navigation apparatus 920 mounts a module including a part (for example, the BB processor 934) of the radio communication interface 933 or all thereof, and/or the processor 921, and the determination unit 241 and the communication control unit 243 may be implemented in the module. In this case, the module stores a program (in other words, a program causing a processor to perform operations of the determination unit 241 and the communication control unit 243) causing a processor to function as the determination unit 241 and the communication control unit 243, and may perform the program. As another example, a program causing a processor to function as the determination unit 241 and the communication control unit 243 is installed in the car navigation apparatus 920, and the radio communication interface 933 (for example, the BB processor 934) and/or the processor 921 may perform the program. As described above, as a device including the determination unit 241 and the communication control unit 243, the car navigation apparatus 920 or the module may be provided. A program causing a processor to function as the determination unit 241 and the communication control unit 243 may be provided. In addition, a readable recording medium recording the program may be provided.

In addition, in the car navigation apparatus 920 illustrated in FIG. 34, for example, the radio communication unit 220 described with reference to FIG. 8 may be implemented in the radio communication interface 933 (for example, the RF circuit 935). In addition, the antenna unit 210 may be implemented in the antenna 937. In addition, the storage unit 230 may be implemented in the memory 922.

The technology of the present disclosure may also be realized as an in-vehicle system (or a vehicle) 940 including one or more blocks of the car navigation apparatus 920, the in-vehicle network 941, and a vehicle module 942. That is, as a device including the determination unit 241 and the communication control unit 243, the in-vehicle system (or a vehicle) 940 may be provided. The vehicle module 942 generates vehicle data such as vehicle speed, engine speed, and trouble information, and outputs the generated data to the in-vehicle network 941.

<<<6. Conclusion

The embodiment of the present disclosure has been described above in detail with reference to FIGS. 1 to 34. As described above, the transmission device (for example, the base station 100) according to the present embodiment allocates at least partially shared transmission parameters to at least some of the plurality of communication devices (for example, the terminal apparatuses 200) to which resource blocks in which frequency resources or time resources at least partially overlap are allocated, and controls a transmission process performed on the plurality of communication devices using the shared transmission parameters. When transmission parameters are shared, the reception device may acquire the shared transmission parameters for interference cancellation. That is, the reception device does not have to separately acquire each of the transmission parameters allocated to other reception devices for interference cancellation. Therefore, the reception device can reduce a load of the interference cancellation process on the reception device side without reading DCI addressed to the other reception device. Further, since the transmission device does not have to transmit transmission parameters of each of the terminal apparatuses 200 to be multiplexed to each of the terminal apparatuses 200 to be multiplexed, a communication load for transmitting and receiving DCI is reduced.

It should be understood by those skilled in the art that various modifications, combinations, sub-combinations and alterations may occur depending on design requirements and other factors insofar as they are within the scope of the appended claims or the equivalents thereof.

For example, in the above embodiment, the example of the non-orthogonal multiple access has been described with a focus on SPC, but the present technology is not limited thereto. For example, the technology described above can be similarly applied to other non-orthogonal multiple access such as Interleave Division Multiple Access (IDMA).

In addition, in the above embodiment, the example in which the shared transmission parameters have 1 type (the same transmission parameters as those of the terminal apparatus 200 whose allocated power level is the lowest or predetermined transmission parameters) has been described, but the present technology is not limited thereto. For example, a plurality of shared transmission parameters may be used. For example, when an index of an allocated power layer is #0 to #5, first predetermined transmission parameters may be allocated. When an index of an allocated power layer is #6 to #10, second predetermined transmission parameters may be allocated.

In addition, processes described using flowcharts and sequence diagrams in this specification may not necessarily be performed in the illustrated order. Some processing Steps may be performed in parallel. In addition, additional processing Steps may be used, and some processing Steps may be omitted.

In addition, it is possible to create a computer program (in other words, a computer program causing the processor to perform operations of components of the above device) causing a processor (for example, a CPU and a DSP) included in a device (for example, a base station, a base station apparatus, a module for the base station apparatus, a terminal apparatus or a module for the terminal apparatus) of this specification to function as components (for example, the allocation unit 151, the communication control unit 153, the determination unit 241 and/or the communication control unit 243) of the device. In addition, a recording medium recording the computer program may be provided. In addition, a device (for example, a base station, a base station apparatus, a module for the base station apparatus, a terminal apparatus or a module for the terminal apparatus) including a memory configured to store the computer program and one or more processors capable of performing the computer program may be provided. In addition, a method including operations of components (for example, the allocation unit 151, the communication control unit 153, the determination unit 241 and/or the communication control unit 243 of the above device) is included in the technology according to an embodiment of the present disclosure.

In addition, the effects described in the present specification are merely illustrative and demonstrative, and not limitative. In other words, the technology according to an embodiment of the present disclosure can exhibit other effects that are evident to those skilled in the art along with or instead of the effects based on the present specification.

Additionally, the present technology may also be configured as below.

(1)

A transmission device including:

an allocation unit configured to allocate at least partially shared transmission parameters to at least some of a plurality of signals to which resource blocks in which frequency resources or time resources at least partially overlap are allocated; and a communication control unit configured to control a transmission process of the plurality of signals using the shared transmission parameters allocated by the allocation unit.

(2)

The transmission device according to (1), wherein the allocation unit allocates the shared transmission parameters based on transmission parameters allocated to one signal selected from among the plurality of signals.

(3)

The transmission device according to (2), wherein the allocation unit selects one signal having the lowest power level of a data channel allocated to each of the plurality of signals.

(4)

The transmission device according to (2) or (3), wherein the allocation unit allocates the same transmission parameters as the transmission parameters allocated to the selected one signal as the shared transmission parameters.

(5)

The transmission device according to (2) or (3), wherein the allocation unit allocates predetermined transmission parameters to a signal other than the selected signal as the shared transmission parameters.

(6)

The transmission device according to any one of (1) to (5), wherein the allocation unit allocates transmission parameters to a signal having a high allocated power level such that a data rate or frequency usage efficiency that is the same as or lower than a data rate or frequency usage efficiency of another signal having a lower allocated power level than the high allocated power level of the signal is achieved.

(7)

The transmission device according to (6), wherein the allocation unit allocates, to the signal having a high allocated power level, a modulation and coding scheme (MCS) that is the same as or lower than an MCS of the other signal having a lower allocated power level than the high allocated power level of the signal.

(8)

The transmission device according to any one of (1) to (7), wherein the communication control unit performs retransmission control of transmission data based on an allocated power level.

(9)

The transmission device according to (8), wherein the communication control unit transmits transmission data of first transmission or retransmission using a data channel having the lowest allocated power level.

(10)

The transmission device according to (8) or (9), wherein the communication control unit transmits transmission data of first transmission using a data channel other than a data channel having the lowest allocated power level.

(11)

The transmission device according to any one of (1) to (10), wherein the communication control unit sets a redundancy version (RV) used for error correction coding or rate matching of transmission data based on an allocated power level.

(12)

The transmission device according to (11), wherein the communication control unit uses the RV at the time of first transmission or retransmission for transmission data to be transmitted using a data channel having the lowest allocated power level.

(13)

The transmission device according to (11) or (12), wherein the communication control unit uses the RV at the time of first transmission for transmission data to be transmitted using a data channel other than a data channel having the lowest allocated power level.

(14)

The transmission device according to any one of (1) to (13), wherein the allocation unit allocates the same resource block as the shared transmission parameters.

(15)

The transmission device according to (14), wherein the allocation unit allocates, to a signal having a high allocated power level, a resource block including a resource block allocated to another signal having a lower allocated power level than the high allocated power level of the signal as the shared transmission parameters.

(16)

The transmission device according to any one of (1) to (15), wherein the allocation unit allocates the same spatial resources as the shared transmission parameters.

(17)

The transmission device according to (16), wherein the allocation unit allocates a precoder for the same spatial multiplexing as the shared transmission parameters.

(18)

The transmission device according to any one of (1) to (17), wherein, for some of the plurality of signals to which the shared transmission parameters are allocated, the communication control unit uses control information of a different format from a format of the other signals.

(19)

The transmission device according to (18), wherein the communication control unit uses control information of a format corresponding to a power level allocated to a signal.

(20)

The transmission device according to (18) or (19), wherein the communication control unit uses control information of a format including information indicating that an interference cancellation process is to be performed for a signal whose allocated power level is not the highest.

(21)

A reception device including:

a determination unit configured to determine that at least partially shared transmission parameters are used in a signal addressed to another communication device to which resource blocks in which frequency resources or time resources allocated to a self-addressed signal at least partially overlap are allocated; and a communication control unit configured to control an interference cancellation process on the signal addressed to the other communication device as a target based on a determination result of the determination unit.

(22)

The reception device according to (21), wherein the determination unit performs determination based on a format of control information.

(23)

The reception device according to (22), wherein the communication control unit performs the interference cancellation process when information indicating that the interference cancellation process is to be performed is included in the control information.

(24)

The reception device according to (22) or (23), wherein the determination unit performs determination based on a power level of a self-allocated data channel.

(25)

The reception device according to any one of (21) to (24), wherein the communication control unit performs the interference cancellation process on the signal addressed to the other communication device to which a higher power level than a power level of a self-allocated data channel is allocated as a target.

(26)

The reception device according to any one of (21) to (25), wherein the determination unit determines that transmission parameters at least partially shared with transmission parameters used in the self-addressed signal are used in the signal addressed to the other communication device.

(27)

The reception device according to any one of (21) to (25), wherein the determination unit determines that predetermined transmission parameters are used in the signal addressed to the other communication device.

(28)

A transmission method performed by a processor, the transmission method including: allocating at least partially shared transmission parameters to at least some of a plurality of signals to which resource blocks in which frequency resources or time resources at least partially overlap are allocated; and controlling a transmission process of the plurality of signals using the allocated shared transmission parameters.

(29)

A reception method performed by a processor, the reception method including:

determining that at least partially shared transmission parameters are used in a signal addressed to another communication device to which resource blocks in which frequency resources or time resources allocated to a self-addressed signal at least partially overlap are allocated; and controlling an interference cancellation process on the signal addressed to the other communication device as a target based on a determination result.

(30)

A program for causing a computer to function as:

an allocation unit configured to allocate at least partially shared transmission parameters to at least some of a plurality of signals to which resource blocks in which frequency resources or time resources at least partially overlap are allocated; and a communication control unit configured to control a transmission process of the plurality of signals using the shared transmission parameters allocated by the allocation unit.

(31)

A program for causing a computer to function as:

a determination unit configured to determine that at least partially shared transmission parameters are used in a signal addressed to another communication device to which resource blocks in which frequency resources or time resources allocated to a self-addressed signal at least partially overlap are allocated; and a communication control unit configured to control an interference cancellation process on the signal addressed to the other communication device as a target based on a determination result of the determination unit.

(32)

An electronic device including:

circuitry configured to allocate at least partially shared transmission parameters to at least a subset of a plurality of signals to which resource blocks are allocated, the resource blocks having at least partially overlapping frequency resources or time resources; and control a transmission process of the plurality of signals based on the shared transmission parameters.

(33)

The electronic device of (32), wherein the circuitry is configured to allocate the shared transmission parameters based on transmission parameters allocated to a signal selected from among the plurality of signals.

(34)

The electronic device of (33), wherein the circuitry is configured to select, as the selected signal, a signal having a lowest power level of a data channel among the plurality of signals.

(35)

The electronic device of any of (33) to (34), wherein the circuitry is configured to allocate transmission parameters allocated to the selected signal as the shared transmission parameters.

(36)

The electronic device of any of (33) to (35), wherein the circuitry is configured to allocate transmission parameters other than the transmission parameters allocated to the selected signal as the shared transmission parameters.

(37)

The electronic device of any of (32) to (36), wherein the circuitry is configured to allocate transmission parameters to a first signal having a first allocated power level so that a data rate or frequency usage efficiency of the first signal is the same as or lower than a data rate or frequency usage efficiency of a second signal having a second allocated power level that is less that the first allocated power level.

(38)

The electronic device of (37), wherein the circuitry is configured to allocate, to the first signal, a modulation and coding scheme (MCS) that is the same as or lower than an MCS of the second signal.

(39)

The electronic device of any of (32) to (38), wherein the circuitry is configured to control retransmission of transmission data based on an allocated power level.

(40)

The electronic device of (39), wherein the circuitry is configured to control select a data channel having a lowest allocated power level as the data channel for retransmission.

(41)

The electronic device of (39), wherein the circuitry is configured to select a data channel other than a data channel having a lowest allocated power level for retransmission.

(42)

The electronic device of any of (32) to (41), wherein the circuitry is configured to set a redundancy version (RV) used for error correction coding or rate matching of transmission data based on an allocated power level.

(43)

The electronic device of (42), wherein the circuitry is configured to use the RV at a time of first transmission or retransmission of transmission data using a data channel having a lowest allocated power level.

(44)

The electronic device of (42), wherein the circuitry is configured to uses the RV at a time of first transmission of transmission data using a data channel other than a data channel having a lowest allocated power level.

(45)

The electronic device of any of (32) to (44), wherein the circuitry is configured to allocate a same resource block as the shared transmission parameters.

(46)

The electronic device of (45), wherein
the circuitry is configured to allocate, to a first signal having a first allocated power level, a resource block including a resource block allocated to second signal having a second allocated power level that is less than the first allocated power level as the shared transmission parameters.

(47)

The electronic device of any of (32) to (46), wherein
the circuitry is configured to allocate the same spatial resources as the shared transmission parameters.

(48)

The electronic device of (47), wherein
the circuitry is configured to allocate a precoder for the same spatial resources as the shared transmission parameters.

(49)

The electronic device of any of (32) to (48), wherein
the circuitry is configured to use control information having a first format for a subset of the plurality of signals to which the shared transmission parameters are allocated, the first format being different from a second format used for signals of the plurality that are not included in the subset of the plurality of signals.

(50)

The electronic device of (49), wherein
the circuitry is configured to use control information of having a format indicating to a power level allocated to a signal.

(51)

The electronic device of (49), wherein
the first format includes an information element (IE) indicating a power layer index allocated to a signal.

(52)

The electronic device of (49), wherein
the circuitry is configured to use control information having a format indicating that an interference cancellation process is to be performed for a signal.

(53)

The electronic device of (49), wherein
the first format includes a cancellation indicator information element (IE) indicating that an interference cancellation process is to be performed for a signal.

(54)

An electronic device including:
circuitry configured to
determine that at least partially shared transmission parameters are used in a signal addressed to another electronic device to which resource blocks are allocated having frequency resources or time resources that at least partially overlap with a resource block allocated to a signal addressed to the electronic device; and
control an interference cancellation process on the signal addressed to the other electronic device as a target based on a result of the determining.

(55)

The electronic device of (54), wherein
the circuitry is configured to perform the determining based on a format of received control information.

(56)

The electronic device of (55), wherein
the circuitry is configured to performs the interference cancellation process when information indicating that the interference cancellation process is to be performed is included in the control information.

(57)

The electronic device of any of (54) to (56), wherein
the circuitry is configured to perform the determining based on a power level of a data channel allocated to the electronic device.

(58)

The electronic device of any of (54) to (57), wherein
the circuitry is configured to perform the interference cancellation process on the signal addressed to the other electronic device having a higher power level than a power level of a data channel allocated to the electronic device.

(59)

The electronic device of any of (54) to (58), wherein
the circuitry is configured to determine that transmission parameters at least partially shared with transmission parameters used in the signal addressed to the electronic device are used in the signal addressed to the other electronic device.

(60)

A transmission method performed by an electronic device, the transmission method including:
allocating at least partially shared transmission parameters to at least a subset of a plurality of signals to which resource blocks are allocated, the resource blocks having at least partially overlapping frequency resources or time resources; and
controlling a transmission process of the plurality of signals based on the shared transmission parameters.

(61)

A reception method performed by an electronic device, the reception method including:
determining that at least partially shared transmission parameters are used in a signal addressed to another electronic device to which resource blocks are allocated having frequency resources or time resources that at least partially overlap with a resource block allocated to a signal addressed to the electronic device; and
controlling an interference cancellation process on the signal addressed to the other electronic device as a target based on a result of the determining.

(62)

One or more computer computer-readable media, which when executed by an electronic device, cause the electronic device to:
allocate at least partially shared transmission parameters to at least a subset of a plurality of signals to which resource blocks are allocated, the resource blocks having at least partially overlapping frequency resources or time resources; and
control a transmission process of the plurality of signals based on the shared transmission parameters.

(63)

One or more computer computer-readable media, which when executed by an electronic device, cause the electronic device to:
determine that at least partially shared transmission parameters are used in a signal addressed to another electronic device to which resource blocks are allocated having frequency resources or time resources that at least partially overlap with a resource block allocated to a signal addressed to the electronic device; and
control an interference cancellation process on the signal addressed to the other electronic device as a target based on a result of the determining.

REFERENCE SIGNS LIST 1 system
100 base station
110 antenna unit 120 radio communication unit
130 network communication unit
140 storage unit
150 processing unit
151 allocation unit
153 communication control unit
200 terminal apparatus
210 antenna unit
220 radio communication unit
230 storage unit
240 processing unit
241 determination unit
243 communication control unit

The invention claimed is:

1. A transmission device comprising:
   circuitry configured to
   allocate at least partially shared transmission parameters to at least some of a plurality of signals to which resource blocks are allocated, the resource blocks having at least partially overlapping frequency resources or time resources;
   control a transmission process of the plurality of signals based on the shared transmission parameters; and
   generate information indicating an interference target and transmit the information as downlink control information,
   wherein the circuitry allocates the same resource block as the shared transmission parameters, and
   wherein the circuitry allocates, to a signal having a high allocated power level, a resource block including a resource block allocated to another signal having a lower allocated power level than the high allocated power level of the signal as the shared transmission parameters.

2. The transmission device according to claim 1,
   wherein the circuitry allocates the shared transmission parameters based on transmission parameters allocated to one signal selected from among the plurality of signals.

3. The transmission device according to claim 2,
   wherein the circuitry selects one signal having a lowest power level of a data channel allocated to each of the plurality of signals.

4. The transmission device according to claim 2,
   wherein the circuitry allocates same transmission parameters as the transmission parameters allocated to the selected one signal as the shared transmission parameters.

5. The transmission device according to claim 2,
   wherein the circuitry allocates predetermined transmission parameters to a signal other than the selected signal as the shared transmission parameters.

6. The transmission device according to claim 1,
   wherein the circuitry performs retransmission control of transmission data based on an allocated power level.

7. The transmission device according to claim 6,
   wherein the circuitry transmits transmission data of first transmission or retransmission using a data channel having the lowest allocated power level.

8. The transmission device according to claim 6,
   wherein the circuitry transmits transmission data of first transmission using a data channel other than a data channel having a lowest allocated power level.

9. The transmission device according to claim 1,
   wherein the circuitry allocates same spatial resources as the shared transmission parameters, and
   wherein the circuitry allocates a precoder for the same spatial multiplexing as the shared transmission parameters.

10. The transmission device according to claim 1,
    wherein, for some of the plurality of signals to which the shared transmission parameters are allocated, the circuitry uses control information of a different format from a format of the other signals.

11. The transmission device according to claim 10,
    wherein the circuitry uses control information of a format corresponding to a power level allocated to a signal.

12. A reception device including:
    circuitry configured to
    receive information indicating interference target by downlink control information;
    determine that at least partially shared transmission parameters are used in a signal addressed to another communication device to which resource blocks in which frequency resources or time resources allocated to a self-addressed signal at least partially overlap are allocated; and
    control an interference cancellation process on the signal addressed to the other communication device as a target based on a result of determination,
    wherein the circuitry is further configured to determine that at least partially shared transmission parameters are used in a signal addressed to another communication device based on a format of control information.

13. The reception device according to claim 12,
    wherein the circuitry performs the interference cancellation process under a condition that information indicating that the interference cancellation process is to be performed is included in the control information.

14. A transmission method performed by a processor, the transmission method including:
    allocating at least partially shared transmission parameters to at least some of a plurality of signals to which resource blocks are allocated, the resource blocks having at least partially overlapping frequency resources or time resources;
    controlling a transmission process of the plurality of signals using the allocated shared transmission parameters; and
    generating information indicating an interference target and transmit the information as downlink control information,
    wherein the transmission method further comprises allocating the same resource block as the shared transmission parameters, and
    wherein the transmission method further comprises allocating, to a signal having a high allocated power level, a resource block including a resource block allocated to another signal having a lower allocated power level than the high allocated power level of the signal as the shared transmission parameters.

* * * * *